United States Patent [19]

Suzuki

[11] E Patent Number: Re. 32,838

[45] Reissued Date of Patent: Jan. 24, 1989

[54] ELECTRONIC MUSICAL INSTRUMENTS

[75] Inventor: Hideo Suzuki, Kosai, Japan

[73] Assignee: Nippon Gakki Seizo Kabushiki Kaisha, Hamamatsu, Japan

[21] Appl. No.: 12,083

[22] Filed: Feb. 6, 1987

Related U.S. Patent Documents

Reissue of:

[64] Patent No.: 4,237,764
Issued: Dec. 9, 1980
Appl. No.: 807,894
Filed: Jun. 20, 1977

[30] Foreign Application Priority Data

Jun. 25, 1976 [JP] Japan ..... 51-75065
Jun. 25, 1976 [JP] Japan ..... 51-75066

[51] Int. Cl.[4] ..... G10H 1/02
[52] U.S. Cl. ..... 84/1.24; 84/1.01
[58] Field of Search ..... 84/1.01, 1.03, 1.24, 84/1.25, 1.26

[56] References Cited

U.S. PATENT DOCUMENTS

| | | | |
|---|---|---|---|
| 3,746,773 | 7/1973 | Uetrecht | 84/1.01 |
| 3,886,836 | 6/1975 | Hiyoshi | 84/1.26 |
| 3,929,053 | 12/1975 | Deutsch | 84/1.24 |
| 3,979,989 | 9/1976 | Tomisawa et al. | 84/1.01 |
| 3,979,996 | 9/1976 | Tomisawa et al. | 84/1.25 |
| 3,982,460 | 9/1976 | Obayashi et al. | 84/1.03 |
| 4,026,180 | 5/1977 | Tomisawa et al. | 84/1.25 |

*Primary Examiner*—Stanley J. Witkowski
*Attorney, Agent, or Firm*—Charles E. Pfund

[57] ABSTRACT

In an electronic musical instrument of digital processing type, key codes are stored in a memory channel by channel for respective tone productions. The stored key codes are utilized for determining pitches of respective tones to be produced. Upon depression of new keys, the formerly stored key codes are automatically added or subtracted channel by channel with the value for a certain note step toward the new key codes at a certain clock rate defining a glissando speed. Thus automatic glissando performances are easily realized.

12 Claims, 25 Drawing Sheets

FIG.3
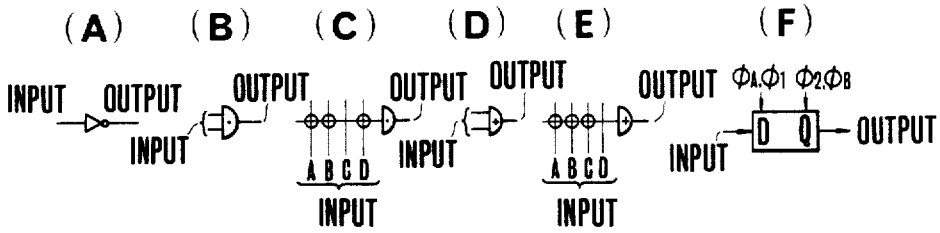
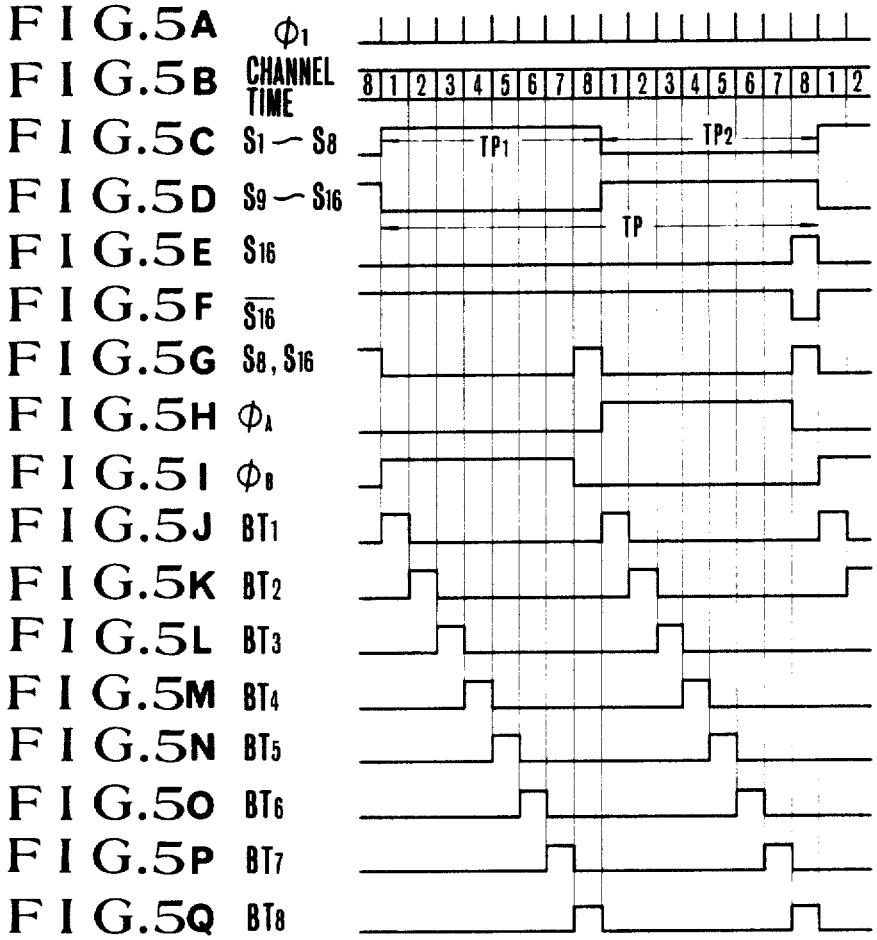

202
FROM SHIFT REGISTER 201a 201g
TO AND GATE 208 OF FIRST KEY CODE MEMORY 201
209
FROM 218
TO 222,224
TRUNGATE SIGNAL FROM COMPARATOR 260
ENABLE SIGNAL FROM TIMING SIGNAL GENERATOR 800 SHOWN IN FIG.3
KEY CODE COMPARATOR
211
EQ
212
213
214
215
216
217
218
219
220
221
TO 228
S9~S16
KC
KB2 KN4 KN2
KB3 KB1 KN3 KN1

| FIG. 14A | FIG. 14B |
|---|---|

300
304
316
FULL ADDER
CI
CO
A1
A2
A3
A4
A5
A6
A7
B1
B2
B3
B4
B5
B6
B7
S1
S2
S3
S4
S5
S6
S7
(α+N-1-β)
(N-1-β)
(β)
(α)
KN1
KN2
KN3
KN4
KB1
KB2
KB3
307a
307b
307c
307d
307e
307f
307g
317a
317b
317c
317d
317e
317f
317g
315
314
TO 328, 327
TO 335, 325, 326
TO 308a
TO 308b
TO 308c
TO 308d
TO 308e
TO 308f
TO 308g
FROM 313a
FROM 313b
FROM 313c
FROM 313d
FROM 313e
FROM 313f
FROM 313g

FULL ADDER
S/R (8/1)
SECOND KEY CODE MEMORY CIRCUIT 302
OPERATION CIRCUIT 303
PULSE WIDTH ADJUSTER 319
FROM CO TERMINAL OF FULL ADDER 316
FROM 315
TO 317a
TO 317b
TO 317c
TO 317d
TO 317e
TO 317f
TO 317g
FROM 307a
FROM 307b
FROM 307c
FROM 307d
FROM 307e
FROM 307f
FROM 307g
KN1'
KN2'
KN3'
KN4'
KB1'
KB2'
KB3'
KG'
TC
OPC

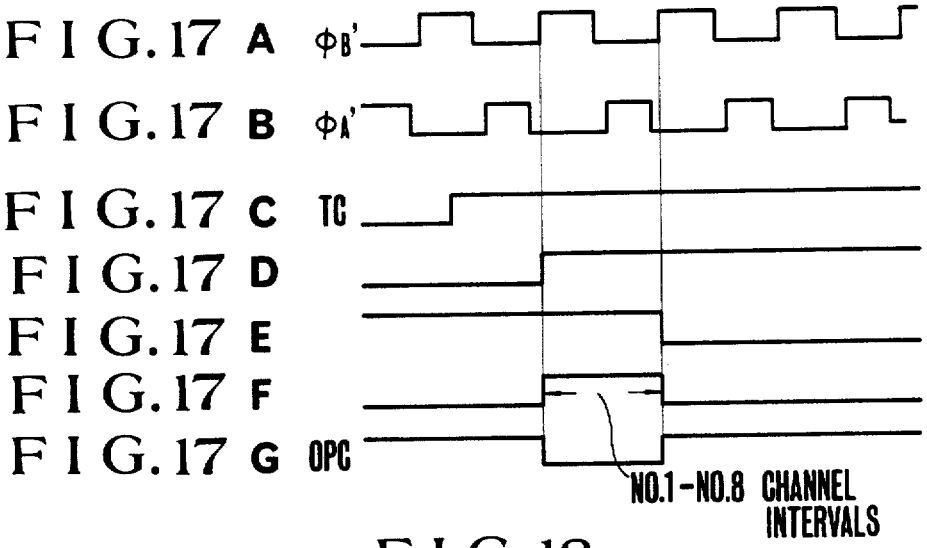
FIG.18
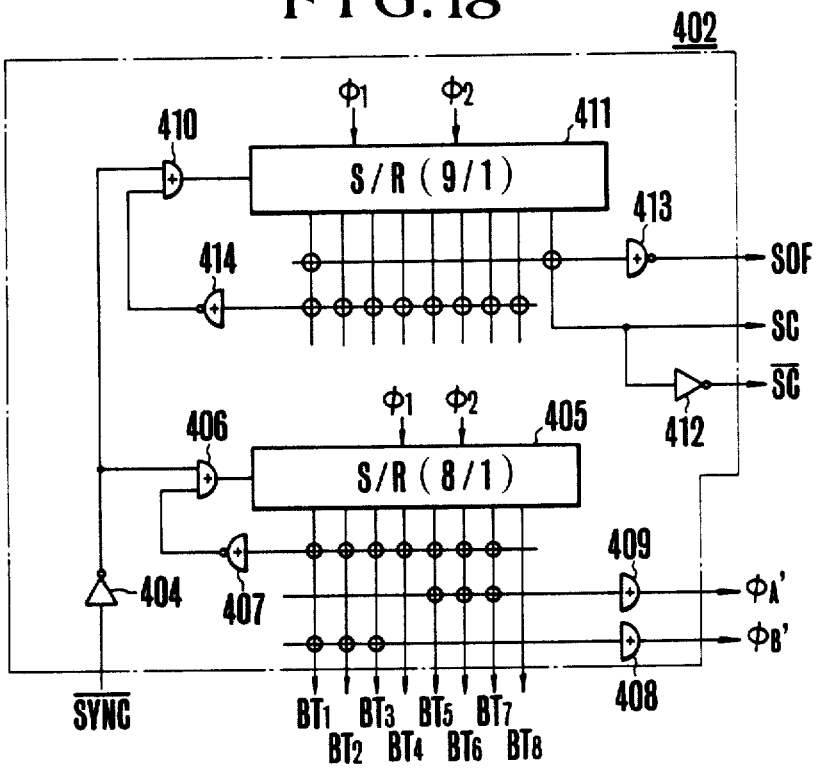

DELAY FLIP-FLOP
FROM INVERTER 417
FROM NOR GATE CIRCUIT 413 OF SAMPLING CONTROL CIRCUIT 402
403
KV
SC
SOF 1 2 3 4 5 6 7 8 1 2 3 4 5 6 7 8 1 2 3 4 5 6 7 8

FIG.20B BT1
FIG.20C BT2
FIG.20D BT3
FIG.20E BT4
FIG.20F BT5
FIG.20G BT6
FIG.20H BT7
FIG.20I BT8
FIG.20J SC
FIG.20K $\overline{SC}$

FIG.20N SOF

FIG.20Q $\phi_{A'}$
FIG.20R $\phi_{B'}$
SC1
SC2
SC3

ELECTRONIC MUSICAL INSTRUMENTS

Matter enclosed in heavy brackets [ ] appears in the original patent but forms no part of this reissue specification; matter printed in italics indicates the additions made by reissue.

BACKGROUND OF THE INVENTION

This invention relates to an electronic musical instrument of digital processing type, and more particularly to an electronic musical instrument in which a glissando effect and a portamento effect can readily be provided by conducting automatic calculations on key codes.

Various types of electronic musical instruments have recently been developed with rapid advance in electronic technique. Electronic organs, typical electronic musical instruments, are widely used because they can produce many types of tone colors and various tone effects thereby enabling versatile rich expressions of music and because they can readily be performed by even not skilled players. The electronic musical instrument of this type forms musical tones by electronic means different from such natural musical instruments as pianos and pipe organs. When classified according to the method of forming musical tones the electronic musical instruments are classified into a tone signal keying system and a synthesizer system. The tone signal keying system is applied to the conventional type electronic organ according to which tone source signals having frequencies corresponding to the tone pitches of various keys are provided, and the tone source signals of the tone pitches of the operated keys are selected by the operation of the keys of a keyboard unit and supplied to a tone coloring circuit so as to produce desired musical sounds. This system is disclosed, for example, in U.S. Pat. No. 3,744,809 issued on July 31, 1973 to Niinomi. According to the synthesizer system, as the keys are depressed, voltage signals hereinafter termed tone pitch signals corresponding to the tone pitches of the operated keys are generated which are used to drive and control voltage controlled type oscillators for producing tone signals corresponding to the tone pitches of the operated keys and a desired musical tone is produced by utilizing these tone signals. This system is disclosed, for example, in U.S. Pat. No. 3,897,709 issued on Aug. 5, 1975 to Hiyoshi et al.

As above described, the electronic musical instruments are constructed to form musical tones by electronic means so that they can produce by a simple manipulation musical tones resembling those of natural musical instruments as well as tones specific to electronical musical instruments and for this reason they have been used extensively. It has been desired strongly to construct electronic musical instruments such that they can also provide the glissando effect and the portamento effect which are used in natural musical instruments thereby improving the effect of performance.

However, if the player wishes to produce the glissando effect in which the musical scale varies stepwisely with a prior art electronic musical instrument described above he must sequentially depress the keys of a keyboard in succession at a constant speed and such performance is especially complicated. Especially when a relatively quick glissando is desired a highly skilled technique is necessary. Where a portamento effect is desired in which the tone pitch is continuously varied from one musical scale note to the other as in one type of a Hawaiian guitar, in the electronic musical instrument of the tone signal keying system described above, it is impossible to obtain the portamento effect, since the frequencies of the tone signals are fixed. For this reason, a special portamento performance device has been added to such electronic musical instruments for obtaining the portamento effect. Such portamento performance device utilizes a variable frequency type oscillator and the oscillation frequency thereof is continuously varied by continuously adjusting a variable resistor or the like for the purpose of producing the portamento effect. This system is disclosed, for example, in U.S. Pat. No. 3,669,422 issued on Oct. 17, 1972 to Yoshihara.

However, the operation of an electronic musical instrument incorporated with a portamento performance device as above described is extremely complicated so that not skilled players can not satisfactorily perform the portamento effect. More particularly, to obtain a portamento effect it is necessary to manually operate the operating element of the portamento performance device while performing a melody as well as an accompaniment on a keyboard unit. Moreover, such operation must satisfy a desired varying speed condition and must stop when the musical tone reaches a destination pitch, and therefore requires excellent skill which will not be attained by not skilled players.

SUMMARY OF THE INVENTION

Accordingly, it is the principal object of this invention to provide an improved electronic musical instrument in which the rate of change in the musical tone pitch from a note corresponding to a firstly depressed key to another note corresponding to a subsequently depressed key can be varied as desired by the use of digital processing.

Another object of this invention is to provide an improved electronic musical instrument in which by mere sequential (successive) operation of the keys of a keyboard unit the musical tone pitch can be automatically varied at a predetermined speed by a step of a semitone or a desired tone interval over a range of from a musical scale note corresponding to a firstly depressed key to a musical scale note corresponding to a subsequently depressed key thus readily producing a glissando effect.

A further object of this invention is to provide an electronic musical instrument in which by mere sequential (successive) operation of the keys of a keyboard unit the musical tone pitch can be automatically and continuously varied at a predetermined speed over a range of from a musical scale note corresponding to a firstly depressed key to a musical scale note corresponding to a subsequently depressed key thereby readily producing a desired portamento effect.

According to this invention there is provided an electronic musical instrument comprising key coder means for delivering key code signals identifying depressed keys in digital representation, key code memory means for storing the key code signals, comparator means for comparing key codes delivered from the key code memory means with newly delivered key codes, calculation means responsive to the result of comparison in the comparator means for adding to or subtracting from the content of the key code memory means a certain value defining a certain note step toward the newly supplied key code, and means for forming musical tones with successively changing tone pitches in accordance with the sequentially varying key code signals.

BRIEF DESCRIPTION OF THE DRAWINGS

Further objects and advantages of the invention can be more fully understood from the following detailed description taken in conjunction with the accompanying drawings in which:

FIGS. 3A through 3F are symbols showing various types of logical elements utilized in this invention;

FIGS. 5A through 5Q are waveforms showing various timing pulses formed by the timing signal generator shown in FIG. 4;

FIGS. 17A through 17G are waveforms of various portions useful to explain the operation of a pulse width adjusting circuit shown in FIG. 16;

FIG. 18 is a connection diagram showing the detail of one example of a sampling control circuit shown in FIG. 2;

FIGS. 20A through 20R are waveforms of various portions useful to explain the operations of the sampling control circuit, sampling circuit and the analogue-digital conversion circuit;

DESCRIPTION OF THE PREFERRED EMBODIMENT

Figure 1:
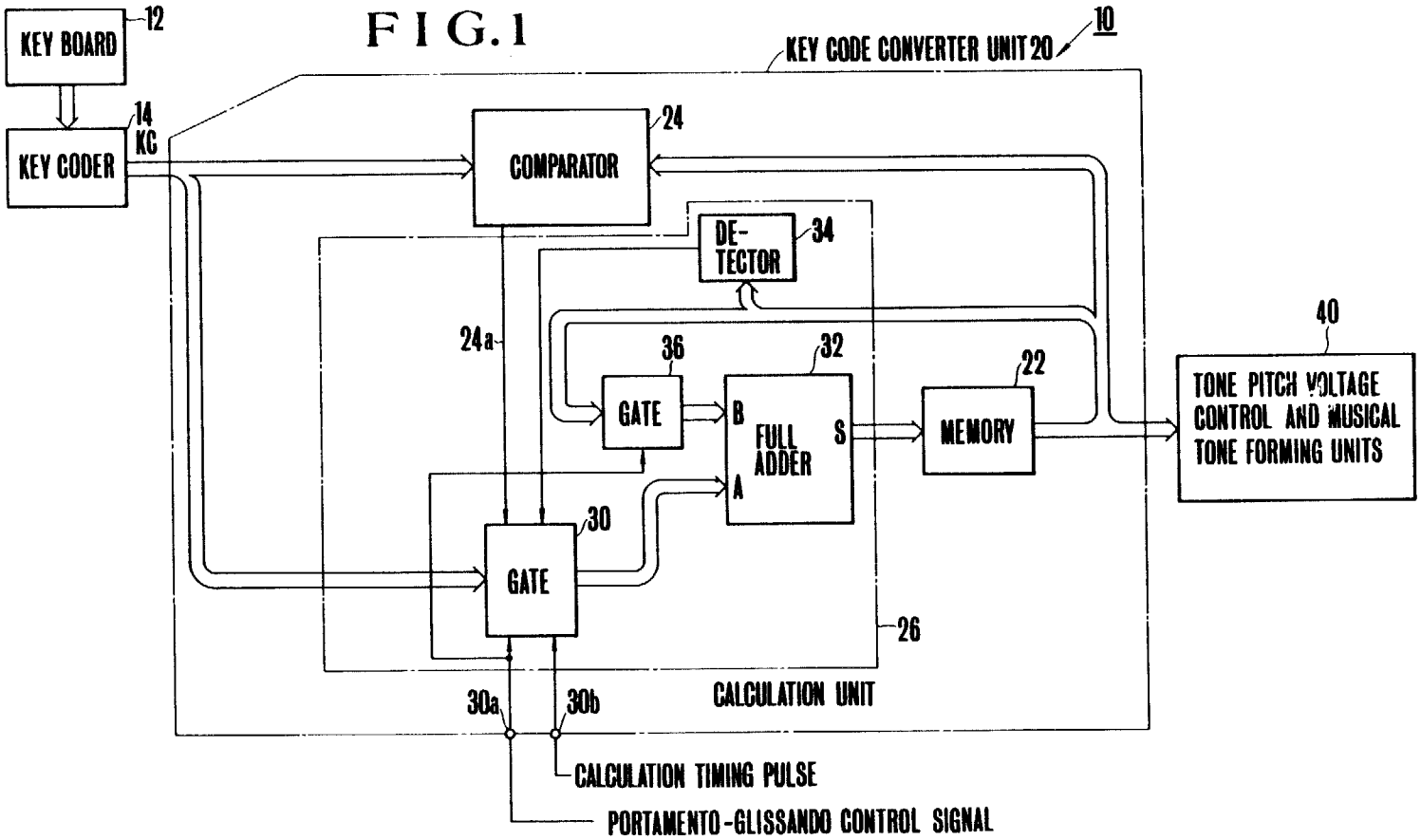
FIG. 1 is a block diagram showing the basic construction of an electronic musical instrument embodying the invention.

A preferred embodiment of this invention will now be described in detail with reference to the accompanying drawings. The electronic musical instrument 10 shown in FIG. 1 comprises a keyboard 12 provided with a plurality of keys. When the keys are depressed, a key coder 14 produces key code signals KC corresponding to the depressed keys and encoded digitally. The key codes are sent to a key code converter unit or key code converter 20 which comprises a memory circuit 22 for storing a key code corresponding to a firstly depressed key (hereinafter termed first key code signal), a comparator 24 for comparing the output of the memory circuit 22 with a key code corresponding to a subsequently depressed key (hereinafter termed second key code signal) and a calculation unit (arithmetic unit) 26 which repeatedly add or subtract a predetermined value to and from the first key code signal stored in the memory device 22 until the result of calculation comes to coincide with the second key code signal. The calculation unit 26 comprises a gate circuit 30 connected to receive the key code from the key coder 14, a full adder 32 responsive to the output of the gate circuit 30 for producing an output S, a detector 34 watching a portion of the output (key code) of the memory circuit 22 for judging whether the value to be added to or subtracted from the full adder 32 should be "1" or "2" and a gate circuit 36 which is enabled (opened) when a portamento control signal is not applied via terminal $30_a$ for applying the output of the memory device 22 to an input terminal B of the full adder 32, whereas disabled when the portamento (glissando) control signal is applied via terminal $30_a$ for preventing the output of the memory device 22 from being applied to the input terminal B of the full adder 32. The gate circuit 30 operates to send an output to the full adder 32 indicating that "1" or "2" should be added or subtracted or that any addition or subtraction is not necessary in response to the result of comparison between the first key code signal stored in the memory circuit 22 and the second key code signal newly supplied from the key coder, which is made by the comparator 24, and to a signal that discriminates whether a value to be added or subtracted is "1" or "2". The signal for effecting the addition and subtraction described above is formed by an calculation timing pulse supplied to the gate circuit 30 via a terminal $30_b$.

The output from the memory circuit 22 is sent to a tone pitch voltage controlling and musical tone forming circuit 20 to act as a note code for forming a desired musical tone.

The operation of the key code converter 20 will now be described.

The operation of a case wherein a portamento (glissando) is not performed will firstly be described. At this time, a potamento (glissando) control signal is not applied to the gate circuits 30 and 36 via the terminal $30_a$. As a consequence, the gate circuit 36 is enabled to supply the output of the key coder 14 to the full adder 32 without any modification. Accordingly, the output S from the full adder is the same as the output from the key coder and stored in the memory circuit 22, and the output thereof is sent to the tone pitch voltage controlling and musical tone forming device 40 to form a predetermined musical tone.

Next, a case in which a portamento (glissando) is performed during the course of performance will be described. At this time, the portamento (glissando) control signal is applied to the gate circuits 30 and 36 via terminal $30_a$. Then the gate circuit 36 is enabled to apply the output of the memory circuit 22 to the input terminal B of the full adder 22, whereas the gate circuit 30 prevents the output key code signal of the key coder 14 from being applied directly to the input A of the full adder 32 so as to perform the following operation in response to the outputs of the comparator 24 and the detector 34.

Suppose now that the first key code signal is being stored in the memory device 22. Under these conditions, when the key coder 14 produces the second key code signal, the comparator 24 compares the second key code signal with the first key code signal read out from the memory device 22 thereby producing on a line $24_a$ a signal indicating that which one of the key code signals is larger. When both key code signals coincide with each other the comparator produces a coincidence signal on the line $24_a$.

The detector 34 detects a signal from the output of the memory circuit 22 which discriminates that whether a step value to be added or subtracted is "1" or "2". When applied with the above described signals from the comparator 24 and the detector 34, the gate circuit 30 performs the following logical operations.

Where the first key code signal is smaller than the second key code signal, that is when the key codes are becoming higher, the gate circuit 30 judges that whether the output from the detector 34 is one of note codes C#, D, E, F, G, G#, A# and B or not, and when it is not such, the gate circuit 30 sends to the full adder 32 an output indicating that "2" should be added to the output of the memory circuit. On the other hand, when it is one of such note codes, the gate circuit 30 applies to the full adder 32 a signal indicating that "1" should be added to the output of the memory circuit.

Where the first key code signal is larger than the second key code signal, that is when the key codes are descending, the gate circuit 30 judges that whether the output from the detector 34 is one of the note codes D, D#, F, F#, G#, A, B and C or not, and when it is not such, the gate circuit 30 sends to the full adder 32 an output indicating that "2" should be added to the output from the memory circuit 22. On the other hand, when it is one of such note codes, the gate circuit 30 sends to the full adder 32 a signal indicating that "1" should be added to the output of the memory circuit.

When a signal showing the coincidence between the first and second code signals is supplied from the comparator 24 during the logical operation described above, the gate circuit 30 terminates such logical operation. At this time, the content of the memory circuit 22 is equal to the second key code signal.

The operation of this invention as applied to an actual electronic musical instrument will now be described with reference to FIGS. 2 and following drawings.

Figure 2A:
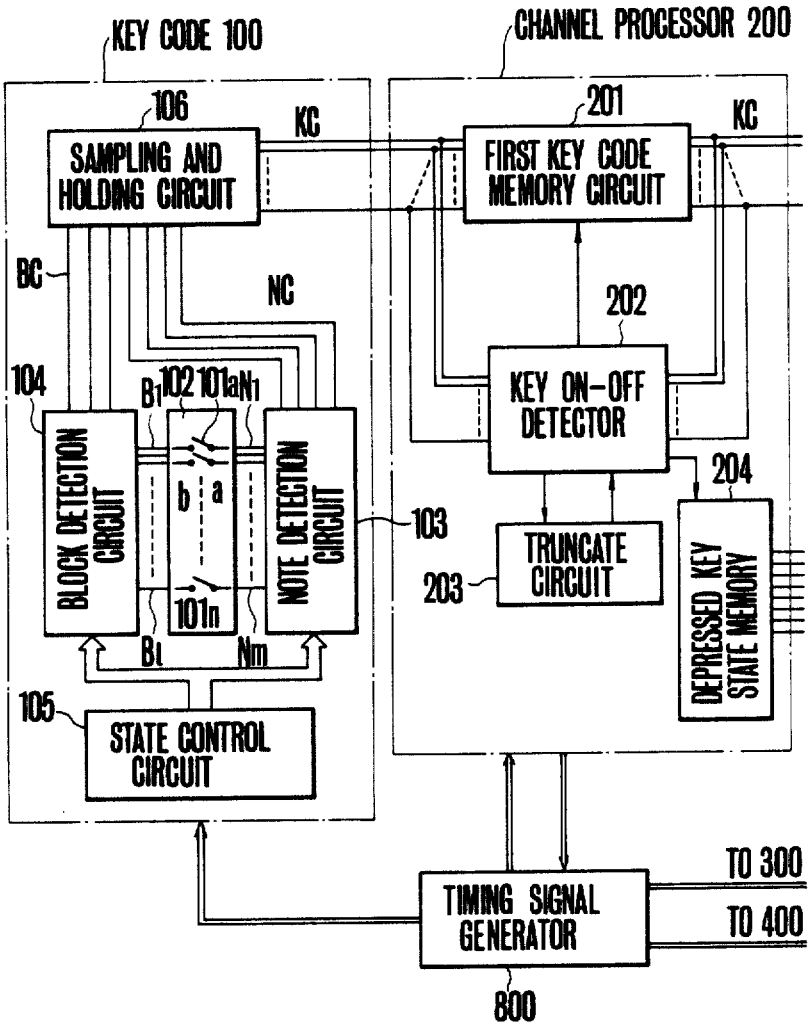
FIGS. 2A and 2B, when combined as shown in FIG. 2C, show a block diagram of one embodiment of this invention.
Figures 2B, 2C:
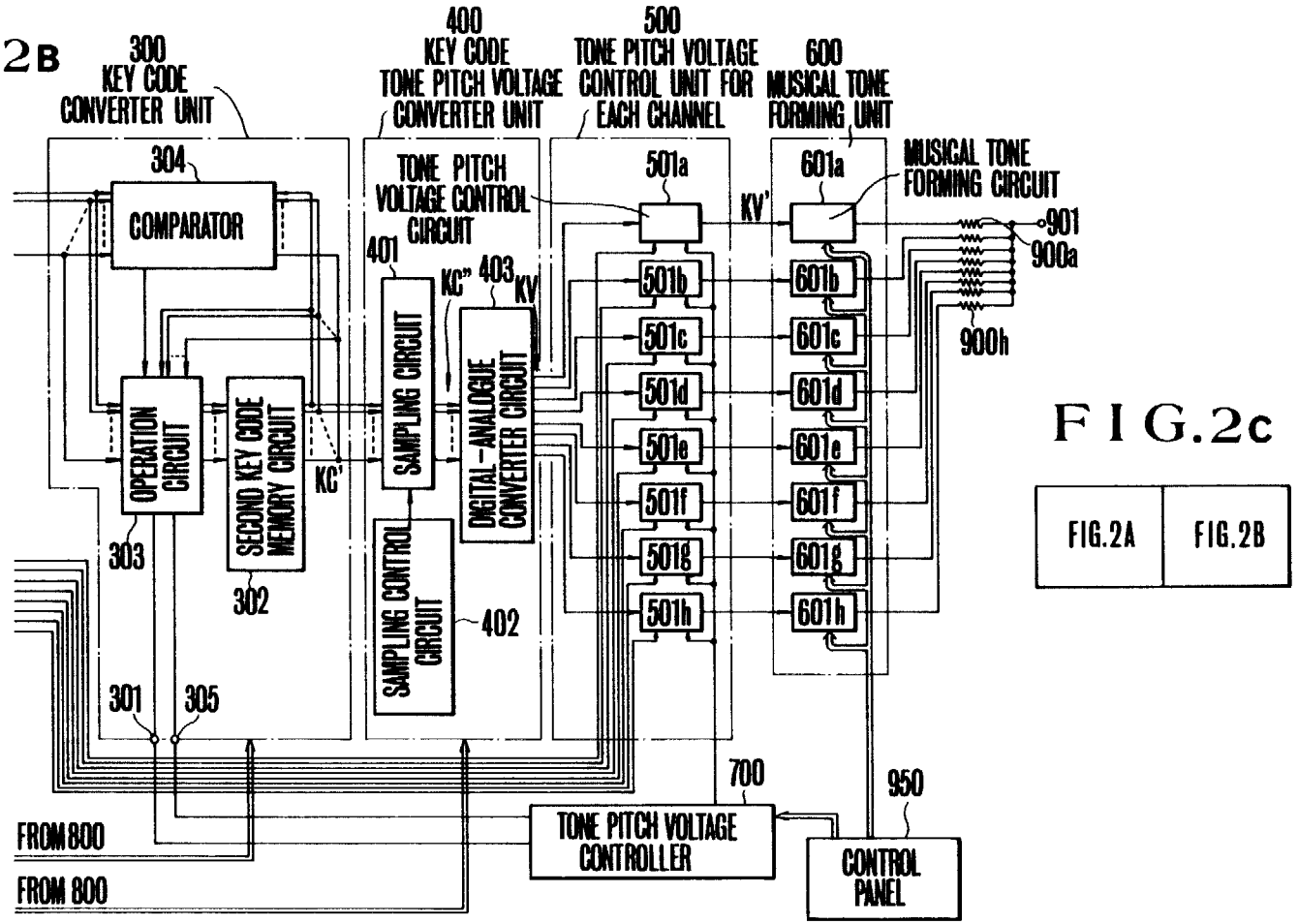

The principal elements of the embodiment of this invention shown in FIGS. 2A and 2B comprises a key coder 100 which is constructed to detect key switches operated by depressed keys (one key switch is provided for each key, and where the switch is of the make contact type, the switch is closed when associated key is depressed, whereas in the case of the break contact type, the switch is opened when the key is depressed) for producing coded signals representing the detected key switches, that is key codes KC; a channel processor 200 for assigning the key codes supplied from the key coder 100 to either one of the channels that can simultaneously produce tones (the number of the channels is much smaller than the number of keys, for example 8, which is the number of keys that can be operated simultaneously, or with a slight time difference, that is the maximum number of the keys that can be operated with both hands and one foot); a key code converter 300 which operates and processes the key codes supplied from the channel processor thereby converting them into key codes KC' utilized to obtain a glissando effect or a portamento effect; a key code-tone pitch voltage converter 400 for generating voltages KV determining the pitches of the tones corresponding to the key codes supplied from the key code converter 300; a tone pitch voltage control unit for each channel 500 responsive to the operated and released key switches which are assigned to respective channels by the channel processor 200 for controlling the tone pitch voltage KV; a musical tone forming unit 600 which produces a musical tone signal for each channel corresponding to each tone pitch voltage KV supplied from each tone pitch voltage control unit 500 a tone pitch voltage control unit 700 which controls the tone pitch voltage control unit 500 for each channel for exercising the change over between the glissando and the portamento effects and controlling the speed of the glissando and the portamento effects; a timing signal generator 800 for supplying various timing signals to various units described above, and a loudspeaker and a amplifier for generating the musical sounds corresponding to the output of the musical tone forming unit 600.

The key coder 100 is provided with a key switch circuit 102 including a plurality of key switches $101_a$–$101_n$ which are divided into a plurality of blocks (for example, groups for respective octaves). The key switches of each group are assigned to corresponding notes (for example keys for 12 notes of C, C#, D . . . B). One terminals a (movable contacts) of respective key switches $101_a$–$101_n$ of the respective blocks are commonly connected for the same named notes, and wiring lines $N_1$–$N_n$ are provided for respective notes. The other contacts b (stationary contacts) of the key switches $101_a$–$101_n$ of the same group are also commonly connected and wiring lines $B_1$–$B_l$ are provided for respective blocks. Consequently, each one of the key switches $101_a$–$101_n$ connected between column and row lines at each cross-point of a matrix circuit constituted by the block wiring lines $B_1$–$B_l$ which act as the row lines and the note wiring lines $N_1$–$N_m$ which act as the column lines. For this reason, the total number of the wiring lines derived out from key switch circuit 102, that is the sum of the number of the block wiring lines $B_1$–$B_l$ and the number of the note wiring lines, it much smaller than the number of the entire key switches $101_a$–$101_n$. For example, assuming that the total number of the key switches $101_a$–$101_n$ is equal to $(1 \times m)$ the total number of the wiring lines derived out from the key switch circuit is equal to the sum of the number of the notes m and the number of blocks 1, that is $(m+1)$. The key switches $101_a$–$101_n$ of the key switch circuit 102 constructed as above described are connected to a note detection circuit 103 via note wiring lines $N_1$–$N_m$ and to a block detection circuit 104 via block wiring lines $B_1$–$B_l$.

The detection of all operated ones of the key switches $101_a$–$101_n$ is performed by sequentially detecting the operation states (hereinafter merely termed states) of several types.

At the first state $ST_1$, a signal is applied to the movable contacts a of all key switches $101_a$–$101_m$ from the note detection circuit 103 via the note wiring lines $N_1$–$N_m$ and the signal is applied to the block wiring wires $B_1$–$B_l$ of the block to which the operated key switches belong via the stationary contacts b of only the operated key switches. The signal thus derived out is supplied to the block detection circuit 104 and stored therein. In this manner, the presence of one or more of the operated key switches of any block can be detected. During the first state, the timing of storing the signal in the block detection circuit 104 is determined by a first state signal supplied from a state control circuit 105 which operates in synchronism with the timing signal generator 500. Upon completion of the storing operation of the block detection circuit 104, the state control circuit 105 detects this condition and then controls the second state.

During the second state $ST_2$, one block is extracted according to a predetermined order of preference from one or a plurality of blocks that have been stored in the block detection circuit so as to apply a signal to the stationary contacts b of the key switches belonging to said extracted block via block wiring lines $B_1$–$B_l$ corresponding to the block extracted from the block detection circuit 104 whereby the signal is derived out from the stationary contacts a of the key switches of respective notes in said one block via note wiring lines $N_1$–$N_m$. This derived out signal is then stored in the note detection circuit 103. In this manner the signal from the block detection circuit 103 is transmitted to only note wiring lines $N_1$–$N_m$ corresponding to the operated ones of the key switches $101_a$–$101_n$ and this signal is stored in the note detection circuit 103, thereby detecting the note codes of one or a plurality of the operated key switches belonging to the extracted block. The block signal extracted by the block detection circuit 104 is converted or encoded into a block code signal (hereinafter termed a block code BC) comprising a plurality of bits (for example 3) representing the block, and the block code is stored in a sampling and holding circuit 106. The timing of extracting one block of the block detection circuit 104 during the second state and the timing of storing of the note detection circuit 103 are determined by the second state signal supplied by the state control circuit 105 in the same manner as in the first state described above. Upon completion of the storing operation of the note detection circuit 103, the state control circuit 105 detects this condition and then controls a third state.

The third state $ST_3$ is an operation state following the second state $ST_2$. In the third state, one or a plurality of states that have been stored in the note detection circuit 103 during the second state are sequentially extracted according to a predetermined order of preference and in synchronism with the clock pulse. The extracted note signal is then connected or encoded into a note code signal (hereinafter termed a note code NC) comprising a plurality of bits (in this example 4) which represents the extracted note signal, and the note codes NC are sequentially supplied to the sampling and holding circuit 106. Since the third state $ST_3$ is executed only for a note stored in the note detection circuit 103 there is not time loss. For example, where three types of the notes are stored in the note detection circuit 103 a third state regarding a specific block will terminate after three clock pulses. When all note codes stored in the note detection circuit 103 are read out the state control circuit 105 detects this state to prepared for the control of the next state. In this case, when some of the memories of the block signals still remain in the block detection circuit 104 the control returns to the control of the second or third state for executing the same in the same manner as above described. Where there is no memory of the block signal remaining in the block detection circuit 104 the control is returned again to the first state.

The sampling and holding circuit 106 stores and holds a block code BC supplied from the block detection circuit 104 during the third state and produces the block code BC in synchronism with a note code NC supplied from a note detection circuit 103. Accordingly, the sampling and holding circuit 106 produces a key code KC having 7 bits, for example, corresponding to the combination of the block code BC and the note code NC. The key code KC enables ready discrimination between operated key switches. In this manner, before completion of the detection of all operated key switches the control is proceeded stepwisely, namely the first state $ST_1$→the second state $ST_2$→the third state $ST_3$. . . . When a block code BC regarding all blocks which have been firstly stored in the block detection circuit 104 is transmitted and when the transmission of the note code NC regarding the note of the operated key switches in the last block is completed all memories in the block detection circuit 104 and the note detection circuit 103 are extracted so that no memory is remaining in the block detection circuit 104 and the note detection circuit 103, whereby the state is advanced to the fourth state $ST_0$ or the wait state. When the state control circuit 105 confirms that operations of the key switch circuit 102, the note detection circuit 103 and the block detection circuit 104 have been reset, the first state $ST_1$ is resumed. Thereafter the fourth state $ST_0$, that is the wait state, will be reached by repeating the second and third states $ST_2$ and $ST_3$ in a manner as above described during which the detection operations of all key switches are repeated once.

The key code KC sent from the sampling and holding circuit 106 of the key coder 100 is applied to the channel processor 200 in which channels for forming the musical tone signals are assigned. At this time, the key code KC sent out from the sampling and holding circuit 106 is held for a definite interval and the holding time corresponds to one operation time in which one assignment is executed in the channel processor 200.

The channel processor 200 comprises a first key code memory circuit 201, a key ON-OFF detection circuit 202, a truncate circuit 203 and a depressed key state memory circuit 204.

The first key code memory circuit 201 comprises a specific number of the memory circuits corresponding to the number of channels that can produce musical tones simultaneously when a plurality of keys are depressed simultaneously. It is advantageous to construct each memory circuit with a circulating shift register. Suppose now that the number of the channels is equal to A that the number of bits of a key code KC is equal to B, an A stage (one stage=B bits) shift register having B memory units is used, and a key code KC already stored or assigned is shifted sequentially and sent out on the time division basis by the clock pulse. The sent out key code is used as a control signal for generating a musical tone waveform and also fed back to the input side of the shift register for circulation.

The key ON-OFF detection circuit 202 compares an input key code KC supplied from the key coder 100 with the all memory key codes sequentially sent out from the first key code memory circuit 201 on the time division basis and when these key codes coincide with each other, the key ON-OFF detection circuit 202 prevents the key code from being stored in the first key code memory circuit 201, in other words, the assignment of the channels is terminated under a judgement that a key code KC which is identical to the input key code KC has already been assigned to a specific channel. In the case of a non-coincidnece, the input key code KC is stored in all vacant channels of the first key code memory circuit 201 because a new key has been depressed. Furthermore, where the respect of comparison is a non-coincidence and a key code KC has been assigned to all vacant channels, the truncate circuit 203 detects a channel to which has been assigned a tone corresponding to an already released key and has attenuated to the largest extent thereby controlling such that the key code KC stored in that channel will be forcibly rewritten as an input key code KC. Each time the key code KC is assigned, the key ON-OFF detection circuit 202 supplies the state of assignment of the inpout key code KC of respective channels to the depressed key state memory circuit 204 to store the state of assignment therein. The output from the memory circuit 204 is used to control the musical tone generation of respective channels as will be described later and to detect the released key so as to change the corresponding memory content of the depressed key state memory circuit 204 thereby terminating the musical tone generation while gradually attenuating the musical tone generated by a channel according to a predetermined condition. During the subsequent operation, vacant channels are selected in a accordance with the content stored in the depressed key memory circuit 204 for applying an input key code KC to a stage of a corresponding channel of the first key code memory circuit 201. The portions of the first key code memory circuit 201 and the depressed key state memory circuit 204 corresponding to respective channels are selected in synchronism and on the time division basis for storing the signal.

The key code coverter 300 comprises a characterizing element of the embodiment shown in FIG. 1 and corresponds to the key code converter 20. Only when a control signal is applied to the control terminal 301 (corresponding to the terminal $30_a$ shown in FIG. 1) the key code converter 300 functions to operate and process the key codes KC which are sequentially supplied from the channel processor 200 whereby the key codes are sequentially shifted including both addition and subtraction under a definite condition over a range of from a key code corresponding to an operated key to a key code KC corresponding to a subsequently depressed key thus converting the key codes KC into shifted key codes KC' which are useed to obtain a glissando effect or a portamento effect.

The key code convetr 300 comprises a key code shift control terminal 301; a second key code memory circuit 302 (corresponding to the memory circuit 22 shown in FIG. 1) constituted by a circulating shift register having a plurality of memory stages of the number equal to the number of channels and operates to sequentlially store the key codes KC supplied from the channel processor 200; an operation circuit 303 which stores again in the second key code memory circuit 302 an operated key code KC' which is formed by adding or subtracting a predetermined value to and from the output key code KC' read out from the second key code memory circuit 302 only when a control signal is applied to the key code shift control terminal 301; and a comparator 304 (corresponding to the comparator 26 shown in FIG. 1) which compares an input key code KC supplied from the channel processor 200 with an output key code KC' from the second key code memory circuit 302 and terminates the operation and processing of the operation circuit 303 which corresponds to the calculation device 26 shown in FIG. 1 when the key codes KC and KC' coincide with each other. The addition and subtraction operations of the operation circuit 303 is controlled by a signal supplied by the comparator 304 in accordance with the result of comparison. Where the output key code KC' from the second keycode memory circuit 302 is larger than the input key code KC supplied from the channel processor 200 a subtraction operation is performed, whereas when the output key code KC' is smaller than the input key code KC an addition operation is performed. In other words, when a key producing a higher tone pitch than that of a firstly operated key is subsequently operated, an addition processing is performed so that the memory in the second key code memory circuit 302 is sequentially shifted such that the output key code KC' from the second key code memory circuit will become a key code KC which produces a higher tone pitch, whereby the musical tone forming unit 600 produces a musical tone signal which increases stepwisely for obtaining a glissando effect, or a musical tone signal which increases continuously for obtaining a portamento effect. The operation period of the operation circuit 303 is determined by a speed control pulse applied to a speed control terminal which corresponds to terminal $30_b$ shown in FIG. 1 whereby the speeds of the glissando and portamento effects are controlled variably.

The key code tone pitch voltage converter unit 400 comprises a sampling circuit 401, a sampling control circuit 402 which controls the sampling period and a digital-analogue converter circuit 402. In the key code tone pitch voltage generator unit 400, the key code KC' supplied from the key code converter 300 is sampled by the sampling circuit 401 and the sampled key code KC'' is applied to the digital-analogue converter circuit 403. The sampling period of the sampling circuit 401 is determined by the output of the sampling control circuit 402 and the sampling period is equal to a time in which the number of the clock pulses necessary to shift the content of the second key code memory circuit is counted by a number equal to the number of channels plus one. Accordingly, each time one cycle of shifting of the second key code memory circuit 302 is substantially completed, the sampling circuit 401 sequentially samples key codes corresponding to different channels and continues to continuously produces the sampled key code KC' till the next sampling time thereby performing decreased speed sampling. Because, the key coder 100, the channel processor 200 and the key code converter unit 300 are required to rapidly detect the state (key depressed and key released states) of the key switches $101_a$–$101_n$ as well as the assignment to the channels whereas the portions handling the tone pitch voltage are not required to operate at a high speed because in these portions the key codes are processed parallelly and because when the tone pitch voltage of the analogue signal is processed at a high speed, it is difficult to follow up such high speed processing. More particularly, a small static capacitance of the circuit system and the wirig lines distort the waveform thus making it difficult to obtain a correct musical tone commensurate with the key code KC'. For the various reasons described above, key code KC' is sampled at a low speed and the sampled key code KC" is then converted into an analogue signal which is applied to the voltage controlled type variable frequency oscillators of respective channels to act as the tone pitch voltage KV. The digital-analogue converter circuit 403 connected to the output side of the sampling circuit 401 operates to convert the above described key code KC" into a corresponding tone pitch voltage KC. The digital-analogue converter circuit 403 is connected to receive a key code KC" which is sampled by the sampling circuit 401 at a low sampling speed and to divide the sampled key code KC" into a block code BC" and a note code NC" which are decoded separately. The decoded block code BC" is applied to a resistance potentiometer for deriving out a voltage signal corresponding to the block code. The derived out voltage signal is further divided by the decoded note code NC" in proportion to the note thereby producing a tone pitch voltage KV corresponding to the key code KC". By the control signal supplied from the sampling control circuit 402 the tone pitch voltage KV is distributed among the channels to which the key codes KC" sampled by the sampling circuit 401 are assigned. Distribution of the tone pitch voltage KV among respective channels is done in synchronism with the operation of the depressed key state memory circuit 204, and the selected channels are also the same. As above described the tone pitch voltage KV converted into an analogue voltage corresponding to the key code KC" is distributed among respective channels. However, when converting the key code KC" into the tone pitch voltage KV the building up portion of the converted tone pitch voltage KV would be smeared due to a small capacitance of the circuit system of the digital-analogue converter.

For this reason, when the tone pitch voltage KV converted in proportion to the key code KC" is applied to the musical tone forming circuit in the later stage starting from the initial portion, that is the building up portion of the converted tone pitch voltage, due to the smear caused by the building up portion, a musical tone quite different from the key code KC" would be formed and the musical tone frequency increases gradually, thereby finally producing a musical tone having a frequency corresponding to the desired key code KC". The smear at the building up portion of the tone pitch voltage KV persists only a very short time but in an ordinary musical instrument the musical tone at the time of starting the tone is also important. For this reason, the digital-analogue converter circuit 403 is constructed to distribute the tone pitch voltage among respective channels only when the digital-analogue conversion has been completed. In other words, after being blocked for a very short time (a fraction of the sampled output) after reception of the key code KC" from the sampling circuit the tone pitch voltage KV is distributed among various channels.

The tone pitch voltage control unit 500 for respective channels comprises a plurality of tone pitch voltage control circuits $501_a$–$501_h$ independently provided for respective channels. The tone pitch voltage control circuits $501_a$ through $501_h$ are constructed to independently receive the tone pitch voltage KV supplied from the digital-analogue converter circuit 403 and to enable (open) a gate circuit by a key-ON signal supplied from the depressed key state memory circuit 204 thereby storing the tone pitch voltage KV in a capacitor, the terminal voltage thereof being sent to the musical tone forming unit 600 as will be described later. The tone pitch voltage control circuits $501_g$–$501_h$ are also constructed to control the charging time constant of the capacitor when the tone pitch voltage KV is applied by a control signal supplied from a tone pitch voltage control unit 700 to be described later so as to vary the building up and building down of the output tone pitch voltage KV' thereby obtaining a glissando effect or a portamento effect.

The musical tone forming unit 600 includes a plurality of musical tone forming circuits $601_a$–$601_h$ independently provided for respective channels. Although not shown, each musical tone forming circuit comprises a voltage controlled variable frequency oscillator (VCO), a voltage controlled type variable filter (VCF), a voltage controlled type variable gain amplifier (VCA), and an envelope generator (EG) for programming the timing and the amount of controlling various component elements described above (VCO, VCF, VCA). When a tone pitch voltage KV' is applied from the tone pitch voltage control circuits $501_a$–$501_h$ voltage controlled type variable frequency oscillator VCO generates an oscillation having a frequency corresponding to the applied tone pitch voltage KV'.

The oscillation output is sent out via VCF and VCA to act as a musical tone signal and mixed with musical tone signals sent from musical tone forming circuits of the other channels by mixing resistors $900_a$–$900_h$. The mixed signal is supplied to a loudspeaker, not shown, through an output terminal. When VCO, VCF and VCA are controlled by a waveform control signal generated by an envelope generator (EG) the oscillation frequency of the VCO is varied finely in accordance with the waveform control signal whereas in the VCF, its frequency characteristic is varied to form a musical tone signal resembling the tone of a natural musical instrument. Furthermore, in the VCA, the envelope of the musical tone is controlled in accordance with the control waveform. The envelope generator EG is controlled by an adjusting lever, not shown, provided for the control panel 950 of the electronic musical instrument and its timing of starting control is determined by a key-ON signal supplied from the depressed key state memory circuit 204.

The tone pitch voltage control unit 700 supplies a control signal to each of the tone pitch voltage control circuits $501_a$–$501_h$ of the tone pitch voltage control unit 500 for respective channels so as to vary the charging time constant of the capacitor provided for respective tone pitch voltage control circuits $501_a$–$501_h$ thereby controlling the variation of the tone pitch voltage during switching between the glissando and portamento effects and during sustaining.

The switching between the glissando and portamento effects are performed by operating a transfer switch provided for the control panel 950. Furthermore, the tone pitch voltage control unit 700 is connected to apply a portamento (glissando) control signal and an addition control pulse to the terminals 301 and 305 respectively of the key code converter unit 300 described above.

The timing signal generator 800 generates various synchronizing signals by counting a reference clock signal supplied from an oscillator, not shown and supplies the synchronizing signals to various component elements described above thereby synchronizing the operations thereof.

Having described the outline of the fundamental elements and operations thereof of one embodiment of an electronic musical instrument embodying the invention the detail of the construction and operation of various elements will now be described with reference to detailed connection diagram and waveforms.

Before describing detailed circuits, symbols utilized therein will firstly be described. Thus FIG. 3A shows an inverter, FIGS. 3B and 3C AND gate circuits, FIGS. 3D and 3C OR gate circuits, and FIG. 3F a delay flip-flop circuit termed as D flip-flop. Where the number of the inputs is small, standard symbols as shown in FIGS. 3B and 3C are used. However, where there are many inputs modified symbols as shown in FIGS. 3C and 3E are used. More particularly in the cases of FIGS. 3C and 3E, a single input line is depicted on the input side and a plurality of signal lines are depicted to cross the input line, and the cross points between the used input lines and the single line are bounded by small circles. In the case of FIG. 3C, the logical equation is: Output = A·B·D whereas in the case of FIG. 3E Output = A+B+C.

Timing Pulse Generator 800

Figure 4:
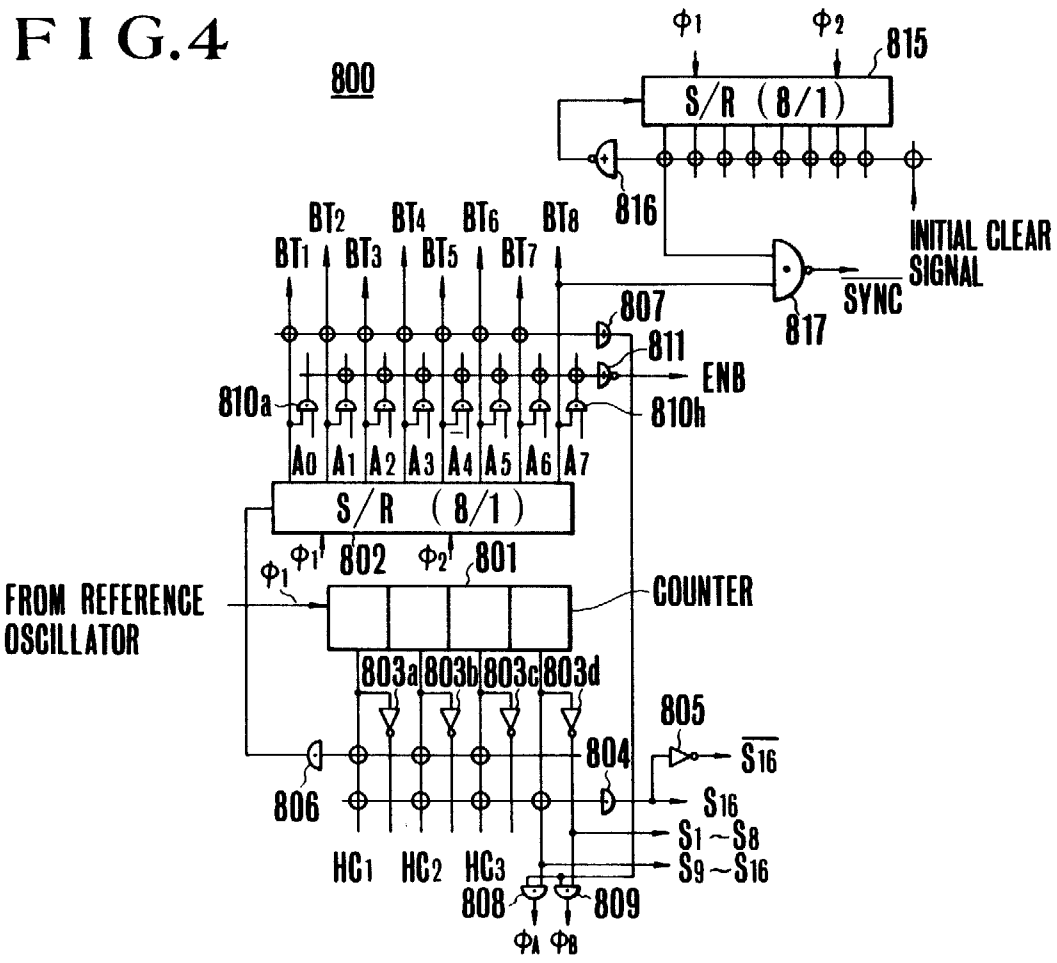
FIG. 4 is a connection diagram showing one example of the timing signal generator shown in FIG. 2.

FIG. 4 shows the detail of the timing pulse generator 800 shown in FIG. 2 which generates a reference control signal for the electronic musical instrument. For this reason, this timing pulse generator will be described at first. It comprises a four bit counter 801 constituted by four cascade connected flip-flop circuits, and a shift register 802 having a plurality of bits of the number equal to that of the channels. In this embodiment, the number of channels is 8. There is provided a reference oscillator, not shown, which produces an output pulse $\phi$. The frequency of pulse $\phi$ is reduced to obtain output pulses $\phi_1$ and $\phi_2$. The counter 801 counts the clock pulse $\phi_1$ shown in FIG. 5A. This clock pulse $\phi_1$ is an extremely high frequency pulse having a period of 1 $\mu$s, for example. In the following, the pulse period is called "a channel time". Assume now that the number of tones of the electronic musical instrument which are generated simultaneously is 8, then the number of the channels is 8 so that the time slots sequentially sectionalized by the clock pulse $\phi_1$ and having a width of 1 $\mu$s are sequentially assigned to the first to eighth channels. Because, the channel processor 200 is constructed to operate under a dynamic logic by operating various memory circuits and logic circuits on the time division bases in order to form a plurality of musical tones at the same time by depressing a plurality of keys at the same time or at slightly different times. As shown in FIG. 5B, when respective time slots are sequentially assigned to first to eighth channel times, each channel time will be repeatedly generated at each 8 channel times. More particularly, when a clock pulse $\phi_1$ is applied to the input terminal of the counter 801 from an oscillator, not shown, the counter sequentially counts the clock pulse and produces the result of count as a binary decimal code outputs comprising parallel four bits. Among these outputs, the output of the most significant flip-flop circuit is derived out through an inverter $\mathbf{803}_d$ as output pulses $S_1$–$S_8$ in a range of from the first to the eighth channel times, as shown in FIG. 5C. Also, the most significant flip-flop circuit produces not inverted pulses $S_9$–$S_{16}$ as shown in FIG. 5D. When the parallel four bit output signals of the counter 801 are simultaneously applied to the inputs of an AND gate circuit 804, this AND gate circuit is enabled to detect the full count condition, thus producing a pulse $S_{16}$ as shown in FIG. 5E at the time of the full count. This pulse $S_{16}$ is inverted by an inverter 805 to obtain a pulse $\bar{S}_{16}$. Thus, the pulse $S_{16}$ is produced at each assigned processing time (16 $\mu$s) of the channel processor 200. The processing time is equal to a time in which respective channel times circulate twice. This is because that the channel processor 200 compares the input key code KC with the memory code KC which has already been assigned in the first 8 channel times and performs a writing operation in the succeeding 8 channel times. Pulses $S_1$–$S_8$, and pulses $S_9$–$S_{10}$ shown in FIGS. 5C and 5D respectively separate the first half 8 channel times and the second half 8 channel times.

When the first to third outputs among the parallel four bit outputs from the counter 801 are simultaneously applied to the inputs of an AND gate circuit 806, this AND gate circuit is enabled to produce output pulses $S_8$ and $S_{16}$ at an interval of 8 channel times as shown in FIG. 6G. The output pulses $S_8$ and $S_{16}$ produced by the AND gate circuit 806 are applied to an 8 bit shift register 802 and sequentially shifted by the clock pulses $\phi_1$ and $\phi_2$ thereby producing pulses $BT_1$–$BT_9$ from respective bits corresponding to the sequential sampling of the first to eighth channel times as shown in FIGS. 5J through 5Q.

Consequently, the outputs from respective bits of the shift register 802 correspond to timing signals which are derived out in parallel at a spacing of eight channel times. The first to seventh bit output of the shift register 802 is taken out through an OR gate circuit 807, and an AND gate circuit 808 is enabled when the output of the OR gate circuit 807 and the output from the most significant bit of the counter 801 are simultaneously applied to its inputs thus producing a clock pulse $\phi_A$ as shown in FIG. 5H. An AND gate circuit 809 is enabled when the output of the OR gate circuit 807 and the output of the inverter $\mathbf{803}_d$ are simultaneously applied to its inputs for producing a clock pulse $\phi_B$ as shown in FIG. 5I.

On the output side of the shift register 802 are connected AND gate circuits $\mathbf{810}_a$–$\mathbf{810}_h$ which are enabled by the output of the shift register 802 and the respective outputs $A_0$–$A_7$ of the depressed key state memory circuit 204 as will be described later. The outputs of the AND gate circuit $\mathbf{810}_b$–$\mathbf{810}_h$ are applied to the inputs of a NAND gate circuit 811 for producing an enabling signal ENB which is used in the channel processor 200.

The timing pulse generator 800 further comprises a shift register 815 having channels, the number of the stages of the shift register being (in this example, 8) equal to that of the channels in the same manner as the shift register 802. The outputs of respective stages of the shift register 815 are applied to the inputs of a NOR gate circuit 816 together with an initial clear signal IC which is produced when a power switch, not shown, is closed. The output of the NOR gate circuit 816 is applied to the first stage of the shift register 815. Like shift register 802, the shift register 815 is driven and its content is shifted by two phase clock pulses $\phi_1$ and $\phi_2$ and applies its output to one input of a NAND gate circuit 817 from its first stage output. To the other input of the NAND gate circuit is applied to $BT_8$ pulse from shift register 802. For this reason, NAND gate circuit 817 produces on pulse $\overline{SYNC}$ at each 72 clock pulses.

The initial clear signal IC is produced by differentiating the voltage variation which occurs when the power switch is closed. Since the circuit for producing the initial clear signal is well known in the art, it is not shown herein.

Various circuit elements operate by using the pulse signals and the clock pulses as the timing signals. The operations of various circuit elements will be described sequentially in the following.

Key Coder 100

Figure 6:
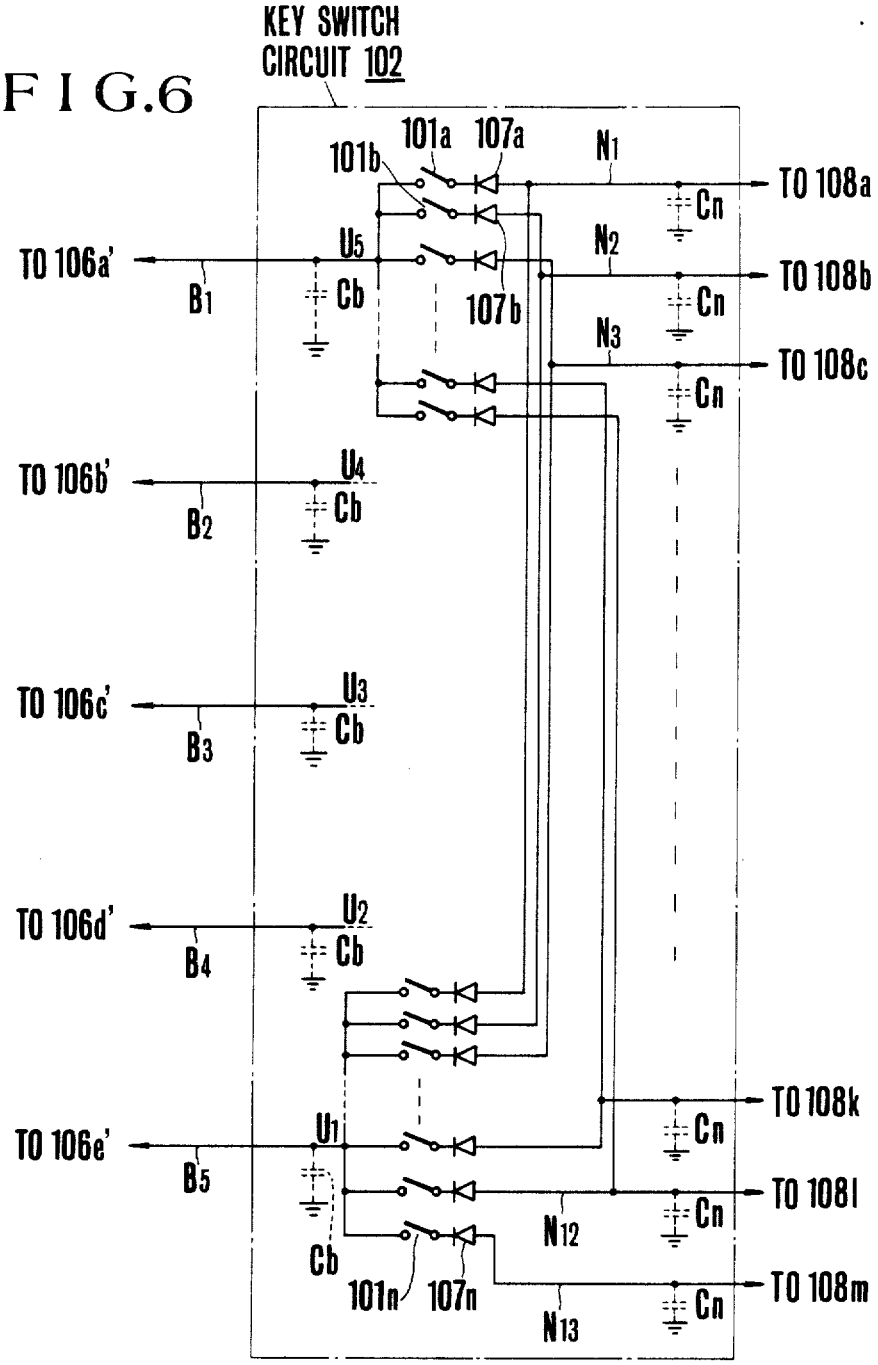
FIG. 6 is a connection diagram showing the detail of one example of the note detection circuit shown in FIG. 2.
Figure 7:
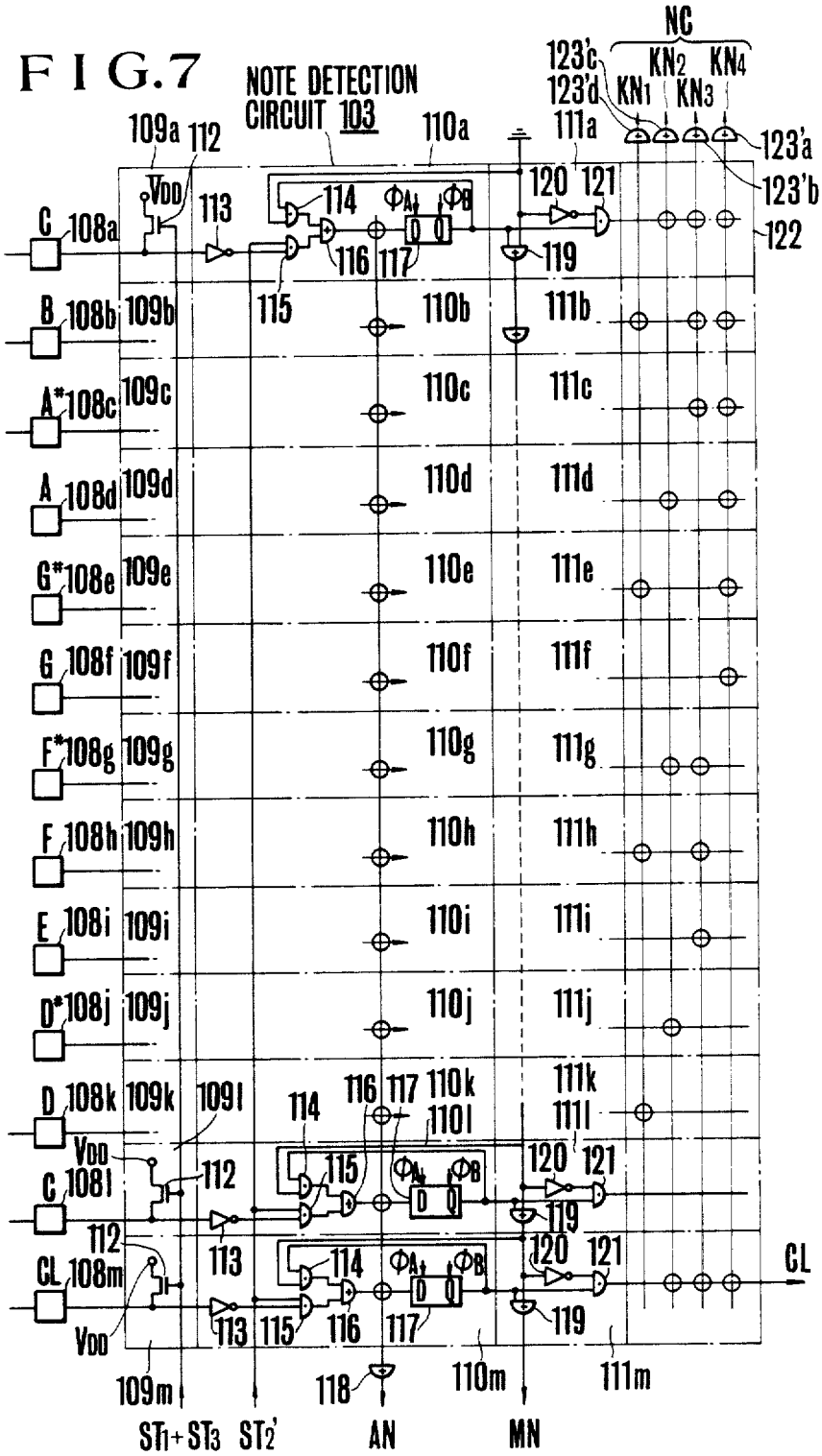
FIG. 7 is a connection diagram showing the detail of a key switch circuit.
Figure 8:
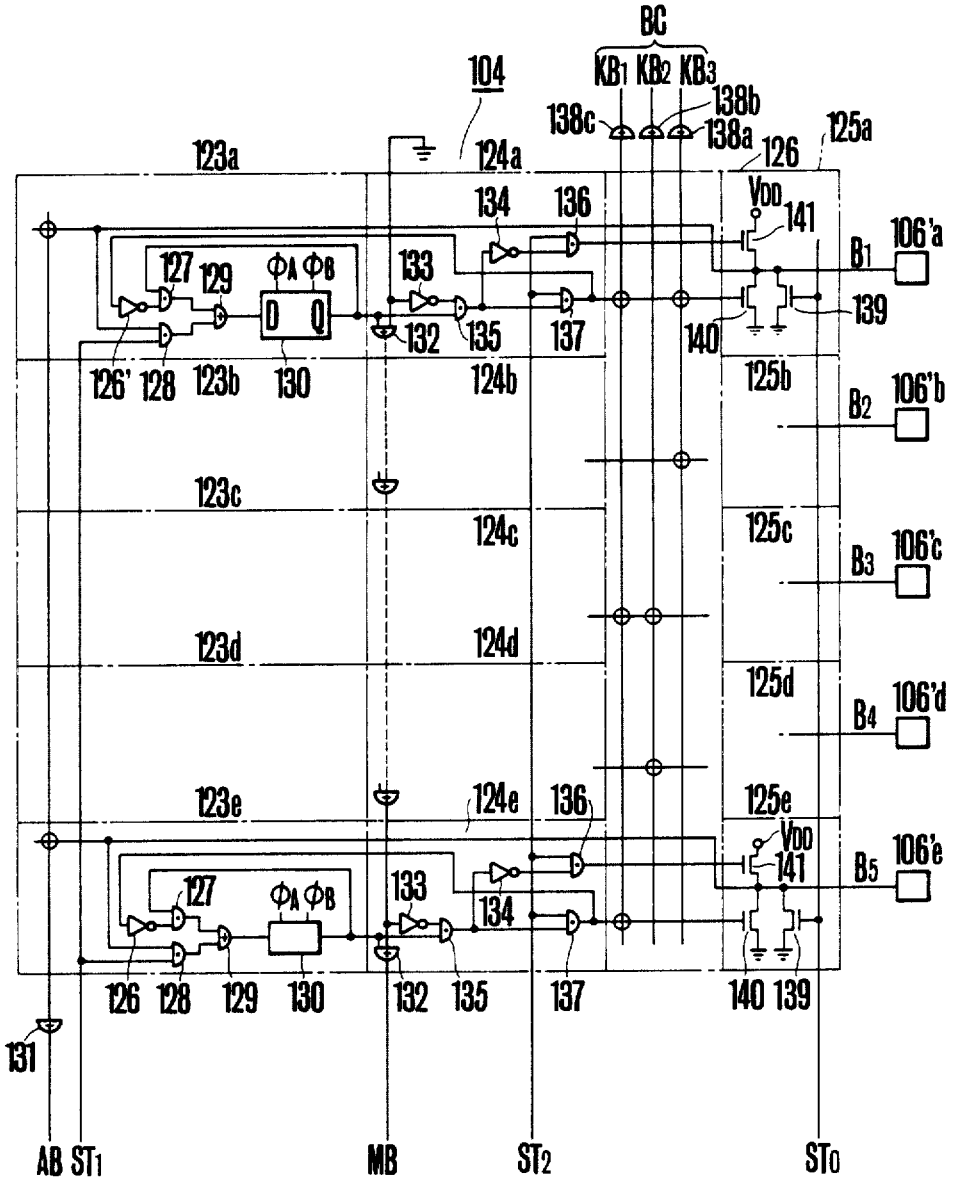
FIG. 8 is a connection diagram showing the detail of one example of the block detection circuit shown in FIG. 2.
Figure 9:
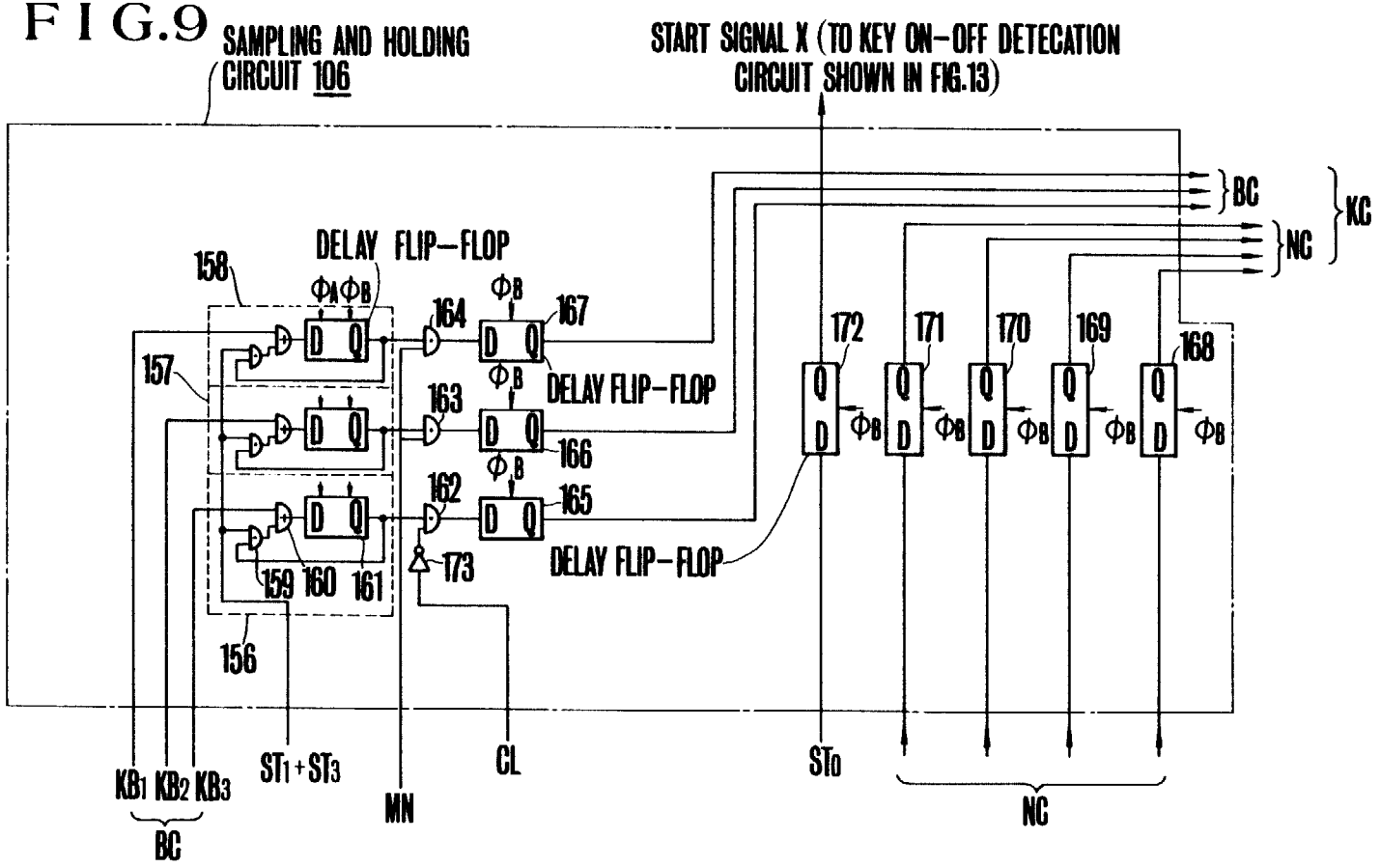
FIG. 9 is a connection diagram showing the detail of a sampling and holding circuit shown in FIG. 2.
Figure 10:
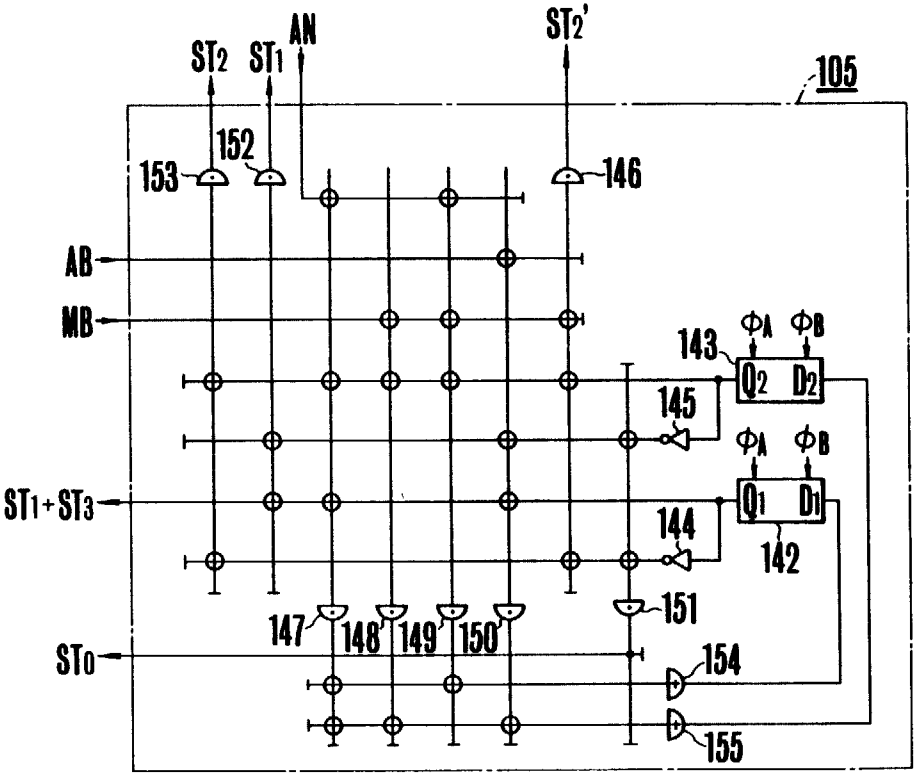
FIG. 10 is a connection diagram showing the detail of a state control circuit shown in FIG. 2.

The key switch circuit 102 is shown in FIG. 6, one example of the note detection circuit 103 is shown in FIG. 7 and one example of the block detection circuit 104 connected to the key switch circuit 102 shown in FIG. 6 is shown in FIG. 8. FIG. 9 shows one example of a sampling and holding circuit which samples the note code NC and the block code BC respectively produced by the note detection circuit 103 and the block detection circuit 104 shown in FIGS. 7 and 8 respectively for matching the timing of the note code and the block code, and FIG. 10 shows one example of the state control circuit 105 which controls the operations of the note detection circuit 103, block detection circuit 104 and the sampling and holding circuit 106 described above. As will be described hereinafter in detail, the key coder 100 is constituted by these circuit elements.

A. Key Switch Circuit 102

The key switch circuit is shown in FIG. 6 and provided with a plurality of key switches $\mathbf{101}_a$–$\mathbf{101}_n$ respectively corresponding to the keys of the keyboard of an electronic musical instrument. One of the terminals (stationary contacts) of the key switches $\mathbf{101}_a$–$\mathbf{101}_n$ are commonly connected to respective blocks $U_1$–$U_5$ and then connected to the block input/output terminals $\mathbf{106'}_a$–$\mathbf{106'}_e$ shown in FIG. 8 via block wiring lines $B_1$–$B_5$. The other terminals (movable contacts) of the key switches $\mathbf{101}_a$–$\mathbf{101}_n$ are connected respectively in series with diodes $\mathbf{107}_a$–$\mathbf{107}_n$ which are used for the purpose of preventing the current from one terminal from flowing to the other terminal. The diodes for the same named note (C#, D . . . A#, B, C) are commonly connected and then connected to note input/output terminals $\mathbf{108}_a$–$\mathbf{108}_l$ respectively through note wiring lines $N_1$–$N_{12}$. The number of keys of a two stage keyboard is generally 61. If these keys are divided into five blocks (five octaves) of $U_1$–$U_5$, the key (hereinafter called a CL note) of the lowest octave would becomes surplus. It is uneconomical to increase the number of blocks for this surplus CL note. For this reason, in the embodiment shown in FIG. 6, the CL note is included in block $U_1$ so that this block covers 13 key switches. More particularly, one terminal of the key switch $\mathbf{101}_n$ corresponding to the CL note is connected to block wiring line $B_5$, while the other terminal is connected to the note input/output terminal $\mathbf{108}_n$ via note wiring line $N_{13}$.

Since the keyboard portion (key switch circuit 102) and the electrical circuit portion (note detection circuit 103 and block detection circuit 104) are generally located remotely, the length of the wiring lines $N_1$–$N_{13}$ interconnecting the key switch circuit 102 and the note detection circuit 103 and the wiring lines interconnecting the key switch circuit 102 and the block detection circuit 104 is large thereby accompanying line capacitances $C_b$ and $C_n$. For the sake of description the capacitance of lines $B_1$–$B_5$ is denoted by $C_b$ and that of lines $N_1$–$N_{13}$ by $C_n$. Of course, line capacitances $C_b$ and $C_n$ are independent from each other but in this embodiment they are utilized efficiently.

In the note detection circuit 103 shown in FIG. 7 signal transmission circuits $\mathbf{109}_a$–$\mathbf{109}_n$, detected note memory circuits $\mathbf{110}_a$–$\mathbf{110}_m$ and note preference gate circuits $\mathbf{111}_a$–$\mathbf{111}_m$ are provided for each one of the notes C, B . . . C#, and CL. Although FIG. 7 shows the detail of only the signal transmission circuits $\mathbf{109}_a$, $\mathbf{109}_e$ and $\mathbf{109}_m$, the detected note memory circuits $\mathbf{110}_a$, $\mathbf{110}_e$ and $\mathbf{110}_m$ and the note preference gate circuits $\mathbf{111}_a$, $\mathbf{111}_e$ and $\mathbf{111}_m$ for notes C, C# and CL, and the circuits for the other notes are constructed in the same manner. Signal transmission circuits $\mathbf{109}_a$–$\mathbf{109}_m$ apply voltage $V_{DD}$ to note input/output terminals $\mathbf{108}_a$–$\mathbf{108}_m$ by the switching action of transistors 112 provided for each note to charge the line capacitance of the note wiring lines $N_1$–$N_{13}$. The signals from the note input/output terminals $\mathbf{108}_a$–$\mathbf{108}_m$ are supplied to the detected note memory circuits $\mathbf{110}_a$–$\mathbf{110}_m$ each constituted by an inverter 113, AND gate circuits 114 and 115, an OR gate circuits 116 and a delay flip-flop circuit 117 and independently stores a pulse $ST_2'$ (described to be later) supplied from the state control circuit 105. When a detected note signal is applied to either one of the detected note memory circuits $\mathbf{110}_a$–$\mathbf{110}_m$, the OR gate circuit 118 sends out a note presence signal AN. The memories read out from the detected memory circuits $\mathbf{110}_a$–$\mathbf{110}_m$ are supplied to the note preference gate circuits $\mathbf{111}_a$–$\mathbf{111}_m$ each comprising an OR gate circuit 119, an inverter 120 and an AND gate circuit 121 whereby the memory contents of the detected note memory circuits $\mathbf{110}_a$–$\mathbf{110}_m$ are read out in accordance with a predetermined order of preference and each read out memory is supplied to a note code transmission circuit 122 thus sending out through one of OR gate circuits $\mathbf{123'}_a$–$\mathbf{123'}_d$ 4 bit note code corresponding to each note code. The note preference gate circuits $\mathbf{111}_a$–$\mathbf{111}_m$ are constructed such that the memory contents of the detected note memory circuits $\mathbf{110}_a$–$\mathbf{110}_m$ are sequentially read out from the note preference gate circuit $\mathbf{111}_a$ on the upper side toward the note preference gate circuit $\mathbf{111}_m$ on the lower side whereby the read out memory contents are converted into note codes NC. Where either one of the detected note memory circuits $\mathbf{110}_a$–$\mathbf{110}_m$ is detected a memory note signal MN is sent out via OR gate circuit 119 of one note preference gate circuit.

B. Block Detection Circuit 104

As shown in FIG. 8, the block detection circuit 104 comprises detected block memory circuits $\mathbf{123}_a$–$\mathbf{123}_e$, block preference gate circuits $\mathbf{124}_a$–$\mathbf{124}_e$, signal transmission circuits $\mathbf{125}_a$–$\mathbf{125}_e$ and a block code transmission circuit 126 which are provided independently for each one of the blocks $U_1$–$U_5$. Each one of the detected block memory circuits $\mathbf{123}_a$–$\mathbf{123}_e$ is constituted by an inverter 126', AND gate circuits 127 and 128, an OR gate circuit 129 and a delay flip-flop circuit 130. When a block detection signal is supplied is either one of the detected block memory circuits $\mathbf{123}_a$–$\mathbf{123}_e$, a block presence signal AB representing that there is a block in which the operated key switch has been detected is sent out to the state control circuit 105. When supplied with a first stage signal $ST_1$ from the state control circuit 105, each one of the detected block memory circuits $\mathbf{123_a}$–$\mathbf{123_e}$ stores the block detection signal. Each one of the block preference gate circuits $\mathbf{124_a}$–$\mathbf{124_e}$ is constituted by an OR gate circuit 132, inverters 133 and 134 and AND gate circuits 135–137, and whenever a block detection signal is being stored in anyone of the detected block memory circuits $\mathbf{123_a}$–$\mathbf{123_e}$ the OR gate circuit 132 of the block preference circuit $\mathbf{124_e}$ sends to the state control circuit 105 a memory block signal MB which represents that a block detection signal is now being stored. Furthermore, each time a second state signal $ST_2$ is applied, the memory contents of the detected block memory circuits $\mathbf{132_a}$–$\mathbf{132_c}$ are sequentially read out in accordance with a predetermined order of preference (in this embodiment, from $\mathbf{124_a}$ to $\mathbf{124_e}$) and the read out block detection signal are supplied to a block code transmission circuit 126 at which these signals are encoded. Then the encoded signals are sent out via OR gate circuits $\mathbf{138_a}$–$\mathbf{138_c}$ as three bit block codes BC. Each one of the signal transmission lines $\mathbf{125_a}$–$\mathbf{125_e}$ is constituted by a transistor 139 which is turned ON by the fourth state signal $ST_0$ for discharging the line capacitance $C_b$ of the block wiring lines $B_1$–$B_5$ and two complementary transistors 140 and 141 which are connected to ground the block wiring lines $B_1$–$B_5$ only when the block detection signals are sent out from the detected block preference circuits $\mathbf{124_a}$–$\mathbf{124_e}$ but to connect the block wiring lines $B_1$–$B_5$ to a source $V_{DD}$ where the block detection signals are not sent out.

C. State Control Circuit 105

As shown in FIG. 10, the state control circuit 105 is constituted by two delay flip-flop circuits 142 and 143, inverters 144 and 145, AND gate circuits 146–153, and OR gate circuits 154 and 155, and constructed to produce control signals $ST_1$–$ST_0$ for detecting first to fourth states as shown in Table 1 thereby completing the detection of the operated key switches. The output signals $Q_1$ and $Q_2$ of the delay flip-flop circuits 142 and 143 show the operation states under execution.

TABLE 1

| State | $Q_1$, $Q_2$ | $Q_1$ | $Q_2$ |
|---|---|---|---|
| First State ($ST_1$) | | 1 | 0 |
| Second State ($ST_2$) | | 0 | 1 |
| Third State ($ST_3$) | | 1 | 1 |
| Fourth State ($ST_0$) | | 0 | 0 |

Thus, various state signals $ST_1$–$ST_0$ are generated in accordance with the outputs $Q_1$ and $Q_2$ of the delay flip-flop circuits 142 and 143. These flip-flop circuits are written with input signals by the clock pulse $\phi_B$ shown in FIG. 5I and their contents are read out by the clock pulse $\phi_A$ shown in FIG. 5H so that the minimum interval of generating state signals $ST_1$–$ST_0$ is equal to the period of the clock pulse $\phi_A$. In other words, all operations of the key coder 100 are synchronized by the clock pulse $\phi_A$.

D. Sampling and Holding Circuit 106

As shown in FIG. 9, the sampling and holding circuit 106 is constructed such that the block codes BC sent from the block code transmission circuit 126 of the block detection circuit 104 shown in FIG. 8 are respectively stored in block code temporary memory circuits 156–158 at the timings of the first and third state signals $ST_1$ and $ST_3$ supplied from the operation state control circuit 105. Each of the block code temporary memory circuits 156–158 comprises an AND gate circuit 159, an OR gate circuit 160 and a delay flip-flop circuit 161 and stores block code BC each time the first and third state signals $ST_1$ and $ST_3$ are applied. The outputs of the block code temporary memory circuits 156–158 are applied to one inputs of AND gate circuits 162–164 with the other inputs connected to receive the memory note signal MN supplied from the note detection circuit 103, so that the stored block codes BC are read out from the delay flip-flop circuits 165–167 in synchronism with the note code NC each time the memory note signal MN is applied. Reading out operations of the block codes BC from the delay flip-flop circuits 165–167 are synchronized by the clock pulse $\phi_B$. The sampling and holding circuit 106 is supplied with note code NC from the note detection circuit 103. The note code NC is written in delay flip-flop circuits 168–171 and the read out therefrom at the timing of the clock pulse $\phi_B$. Thus, after being synchronized with the block code BC, the note code is derive out as the note code. In the same manner, the fourth state signal $ST_0$ generated by the state control circuit 105 is also stored in a delay flip-flop circuit 172 and then read out at the timing of the clock pulse $\phi_B$. The purpose of an inverter 173 is to form a key code KC specific to the note signal CL in which the block code is forcibly changed to "0" "0" "0" at the time of sending out the note code CL.

E. Operation of Key Coder 100

The operation of the key coder 100 shown in FIGS. 6–10 will now be described in detail with reference to the waveforms shown in FIGS. 11A–11O. In describing the operation, it is assumed that keys corresponding to the notes B and A of block $U_5$ and the note B of block $U_3$ are operated so that their key switches are closed.

Figures 11A, 11B, 11C, 11D, 11E, 11F, 11G, 11H, 11I, 11J, 11K, 11L, 11M, 11N, 11O:
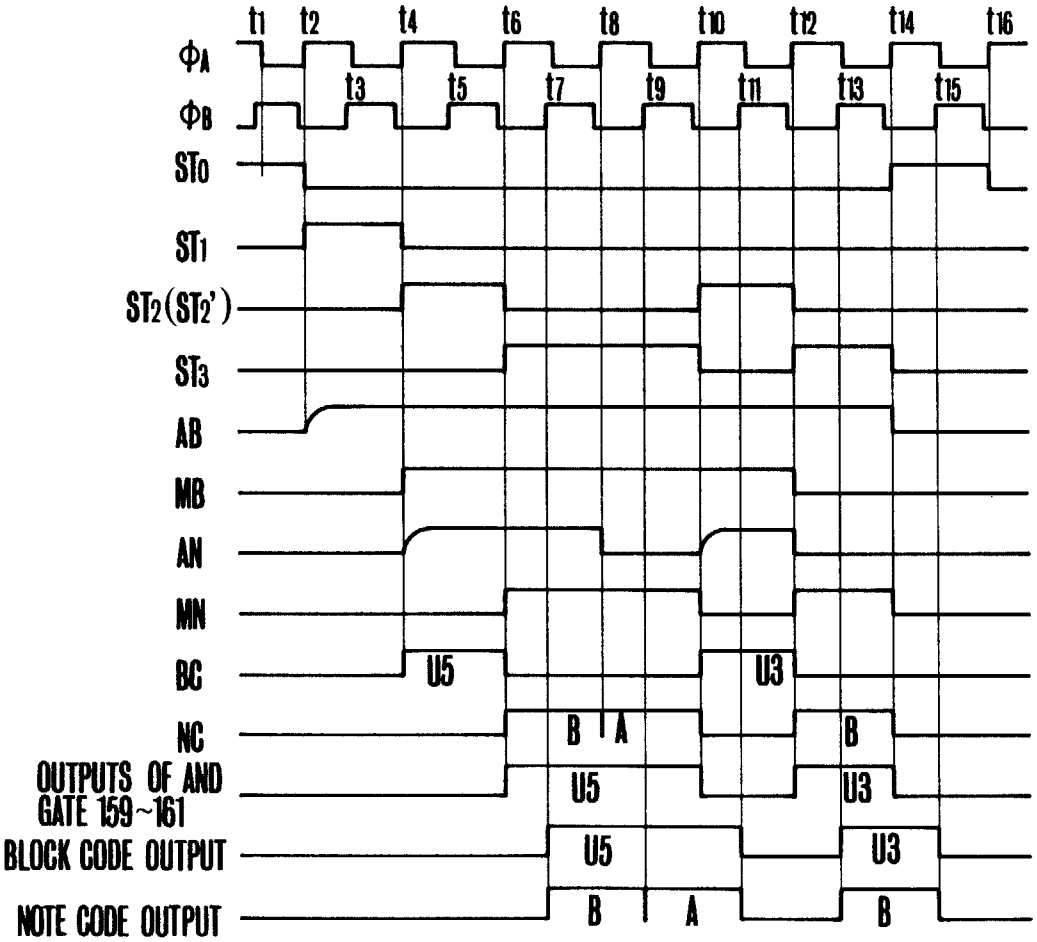
FIGS. 11A through 11O are waveforms at various portions useful to explain the operations of the note detection circuit, the block detection circuit, the state detection circuit and the sampling and holding circuit shown in FIG. 2.

As shown in FIGS. 11A and 11B when the clock pulses $\phi_A$ and $\phi_B$ shown in FIGS. 5H and 5I are applied to the delay flip-flop circuits 142 and 143 of the state control circuit 105 (FIG. 10) from the timing signal generator 800 shown in FIG. 3, these delay flip-flop circuits store the output signals from OR gate circuits 154 and 155, respectively, at the timing of the clock pulse $\phi_B$ and send out their outputs $Q_1$ and $Q_2$ at the timing of the clock pulse $\phi_A$. For example, it is assumed not that when the state control circuit 105 is in the fourth state $ST_0$, that is the waiting state at a time $t_1$ shown in FIG. 11A, then the outputs $Q_1$ and $Q_2$ from the delay flip-flop circuits 142 and 143 will be "0" and "0" respectively as shown in Table 1 so that the outputs of the inverters 144 and 145 will be "1" and "1". Accordingly, AND gate circuit 151 is enabled to produce a signal "1" which is applied to the input of the delay flip-flop circuit 142 via OR gate circuit 154. At the same time, as shown in FIG. $\mathbf{11_c}$, the fourth state signal $ST_0$ (waiting state) is sent out through AND gate circuit 151. This fourth state signal $ST_0$ is applied to respective signal transmission circuits $\mathbf{125_a}$–$\mathbf{125_e}$ of the block detection circuit 104 (FIG. 8) thereby turning ON transistors 139 of the signal transmission circuits $\mathbf{125_a}$–$\mathbf{125_e}$ with the result that the wiring line capacitances $C_b$ of respective block wiring lines $B_1$–$B_5$ are discharged.

When clock pulse $\phi_B$ is generated during times $t_1$ and $t_2$ as shown in FIG. 11A, the outputs of the OR gate circuits 154 and 155 are stored respectively in the delay flip-flop circuits 142 and 143 of the state control circuit 105 shown in FIG. 10. At this time, since the output of only OR gate circuit 154 is "1", the delay flip-flop circuits 142 and 143 store "1" and "0" respectively. When the clock pulse $\phi_A$ is generated at time $t_2$ shown in FIG. 11A, the memories stored in the delay flip-flop circuits 142 and 143 are read out. As a consequence, their outputs $Q_1$ and $Q_2$ become "1" and "0" with the result that AND gate circuit 152 produces the first state signal $ST_1$ shown in FIG. 11D which is applied to respective signal transmission lines $\mathbf{109}_a$–$\mathbf{109}_m$ of the note detection circuit 103 shown in FIG. 7 thus turning ON transistors 102 of these signal transmission lines. When transistors 112 are turned ON, voltage $V_{DD}$ is applied to key switch circuit 102 via note input/output terminals $\mathbf{108}_a$–$\mathbf{108}_m$ thus charging all capacitances $C_n$ of the note wiring lines $N_1$–$N_{13}$.

When these capacitance $C_n$ are charged, a signal is produced on the block wiring line B of block U to which an operated key switch among all key switches $\mathbf{101}_a$–$\mathbf{101}_n$ belongs to charge the capacitance $C_b$ of the block wiring line B. Thus, a block containing the operated key is detected depending upon whether the charged capacitance belongs to which block, whereby a detection signal is applied to the block input/output terminal 106' corresponding to the detected block U. This detection signal is also applied to the corresponding detected block memory circuit 123 of the block detection circuit 104 shown in FIG. 6. When a block detection signal is applied to any one of the detected block memory circuits $\mathbf{123}_a$–$\mathbf{123}_e$, a block presence signal AB shown in FIG. 11G is sent to the state control circuit 105 via OR gate circuit 131. The block presence signal AB represents that there is a block in which an operated key switch has been detected and its value increases as the wiring line capacitance $C_n$ of the note wiring line $N_1$–$N_{13}$ increases when the first state signal $ST_1$ is sent out. One inputs of the AND gate circuits 128 of the detected block memory circuits $\mathbf{123}_a$–$\mathbf{123}_e$ are connected to the block input/output terminals $\mathbf{106'}_a$–$\mathbf{106'}_e$, respectively, to receive the block detection signals while the other inputs are connected to receive the first state signal $ST_1$. Consequently, in the first state, only in the detected block memory circuit 123 corresponding to block U in which an operated key switch has been detected, signal "1" is stored in the delay flip-flop circuit 130 via AND gate circuit 128 and OR gate circuit 129. For example when the operated key switches are detected in blocks $U_5$ and $U_3$ a block detection signal "1" is stored in the delay flip-flop circuits 130 of the detected block memory circuits $\mathbf{123}_a$ and $\mathbf{123}_c$. The above described operation is executed while the clock pulse $\phi_A$ is being produced as the first state operation.

When a block presence signal AB which represents that there is an operated key switch is produced, this block presence signal AB is applied to one input of the AND gate circuit 150 of the state control circuit 105 shown in FIG. 10. When applied with the block presence signal AB, the state control circuit 105 judges that there is a block in which the presence of an operated key switch has been detected thus proceeding to the control of the second state. More particularly, when a block presence signal AB is applied, since inverters 144 and 145 producing signal "1", the AND gate circuit 150 is enabled to produce signal "1" which is applied to the delay flip-flop circuit 143 via OR gate circuit 155. As a consequence, signals "0" and "1" are stored in the delay flip-flop circuits 142 and 143 respectively at a time $t_3$ shown in FIG. 11A and signals "0" and "1" are read out at time $t_4$ by the clock pulse $\phi_A$. The "0" and "1" outputs of the delay flip-flop circuits 142 and 143 are in the second state as shown in Table 1. Then the AND gate circuit 153 of the state control circuit 105 generates the second state signal $ST_2$ as shown in FIG. 11E. At this time, the delay flip-flop circuits 130 of the delay detection circuits $\mathbf{123}_a$ and $\mathbf{123}_c$ are storing block detection signals "1" as above described so that these delay flip-flop circuits 130 apply signal "1" to one inputs of the OR gate circuits of corresponding block preference gate circuits $\mathbf{124}_a$ and $\mathbf{124}_c$. The outputs of the OR gate circuits of respective block preference gate circuits $\mathbf{124}_a$–$\mathbf{124}_e$ are connected to the inputs of the OR gate circuits of the block preference gate circuits $\mathbf{124}_b$–$\mathbf{124}_e$ sequentially at lower orders, so that so long as at least one of the detected block memory circuit $\mathbf{123}_a$–$\mathbf{123}_e$ is storing a block detection signal, the OR gate circuit 132 of the block preference gate circuit $\mathbf{124}_e$ of block $U_1$ at the lowest order of preference sends out a signal "1" shown in FIG. 11H which acts as a memory block signal MB showing that there is a memory block. This memory block signal MB is applied to one inputs of AND gate circuits 146, 148 and 149 of the state control circuit 105. Consequently, substantially concurrently with the generation of the second state signal $ST_2'$ the AND gate circuit 146 is enabled whereby another second state signal $ST_2'$ will be generated. In this manner, when signals "0" and "1" of the delay flip-flop circuits 142 and 143 are read out by the clock pulse $\phi_A$ at time $t_4$ shown in FIG. 11A, second state signals $ST_2$ and $ST_2'$ are generated thus controlling the second state.

In the second state, a single memory block among a plurality of memory blocks is extracted in accordance of an order of preference predetermined by the block preference gate circuits $\mathbf{124}_a$–$\mathbf{124}_c$. In FIG. 4, the order of preference is set in the order of blocks $U_5, U_4 \ldots, U_1$. In the block preference gate circuit $\mathbf{124}_a$ of block $U_5$ at the highest order, the output of the inverter 133 is normally "1", so that as soon as the block detection signal "1" is applied from the delay flip-flop circuit 130 of the detected block memory circuit $\mathbf{123}_a$, AND gate circuit 135 is enabled. The outputs from the delay flip-flop circuits of the detected block memory circuits $\mathbf{123}_a$–$\mathbf{123}_e$ of the blocks $U_5$–$U_1$ at higher orders are sequentially applied to the block preference gate circuits $\mathbf{124}_b$–$\mathbf{124}_e$ regarding the blocks $U_4$–$U_1$ at lower orders via OR gate circuits 132 of the block preference gate circuits $\mathbf{124}_a$–$\mathbf{124}_e$ regarding blocks $U_5$–$U_1$. Accordingly, when the detected block memory circuits $\mathbf{123}_a$–$\mathbf{123}_d$ of the blocks $U_5$–$U_2$ at upper orders store block detection signals, a signal "0" is applied to one inputs of AND gate circuits 135 via inverters 133 of the block preference gate circuits $\mathbf{124}_b$–$\mathbf{124}_e$ regarding blocks $U_4$–$U_1$ at lower orders whereby the AND gate circuits 135 are disabled to establish a preference connection. Consequently only one AND gate circuit 135 of the block preference gate circuits $\mathbf{124}_a$–$\mathbf{124}_e$ produces signal "1". Where detection of the operated key switches is memorized in blocks $U_5$ and $U_3$, signal "1" is produced from only the AND gate circuit 135 of the block preference gate circuit 124 regarding the block $U_5$ during the interval of the second state $ST_2$ shown by time $t_4$ in FIG. 11A. Since the AND gate circuit 135 of the other block preference gate circuits $\mathbf{124}_b$–$\mathbf{124}_e$ is supplied with "1" output (which is inverted by inverter 133) of the OR gate circuit 132 of the block preference gate circuit $\mathbf{124}_a$ regarding block $U_5$, due to the preferential operation on described above, the outputs of the AND gate circuits 135 of the other block preference gate circuits $124_b$–$124_e$ regarding the other blocks $U_4$–$U_1$ are all "0". The AND gate circuit 137 is enabled when the outputs of the AND gate circuits 135 of the block preference gate circuits $124_a$–$124_e$ and the second state signal $ST_2$ are applied to the inputs, and the output of the AND gate circuit 137 is applied to the transistors 140 of the signal transmission circuits $125_a$–$125_3$ and the block code transmission circuit 126. The inputs of respective AND gate circuits 136 are connected to receive the second stage signal $ST_2$ and the outputs of the AND gate circuits 135 which are inverted by inverters 134.

At time $t_4$ shown by FIG. 11A, the second state signal $ST_2$ (FIG. 11E) produced by the state control circuit 105 is applied to the inputs of the AND gate circuits 136 and 137 of respective preference gate circuits 136 and 137 while the other second stage signal $ST_2'$ is applied to the detected note memory circuits $110_a$–$110_m$ of the note detection circuit 103.

Consequently, during an interval $t_4$–$t_6$, that is the interval in which the second state signal $ST_2$ is generated, the output of only AND gate circuit 137 of the block preference gate circuit $124_a$ becomes "1" and the outputs of the AND gate circuits 137 of the other block preference gate circuit $124_b$–$124_e$ are all "0". In this manner, the memory of only block $U_5$ is read out and the read out signal is applied to the block code transmission circuit 126 and to the transistors 140 of the signal transmission circuits $125_a$. The output of the AND gate circuit 137 of the block preference gate circuit $124_a$ is inverted by the inverter 126' of the detected block memory circuit 123 and the inverted output disables the AND gate circuit 127. Accordingly, the memory of the delay flip-flop circuit 130 of the detected block memory circuit $123_a$ is erased. However, since the outputs of the AND gate circuits 137 of the other block preference gate circuits $124_b$–$124_e$ are "0" signals "1" are applied to the inputs of the AND gate circuits 127 of the detected block memory circuits $123_b$–$123_e$ through inverters 126 so that the output of the delay flip-flop circuit 130 is maintained unchanged. Thus, the memory contents of the blocks $U_4$–$U_1$ are held continuously.

The output of the AND gate circuit 135 of the block preference gate circuit $124_a$ regarding block $U_5$ is "1" and this "1" signal is applied to one input of AND gate circuit 136 via inverter 134. Accordingly, the AND gate circuit 136 will not be enabled by the "0" output of inverter 134 even when the second state signal $ST_2$ is applied to the other input. On the other hand, the AND gate circuits 136 of the other blocks $U_4$–$U_1$ are enabled by the "1" signals obtained by inverting the "0" outputs of the AND gate circuits 135 and the second state signal $ST_2$, thereby producing an outputs "1" which are used to turn ON transistors 141 of the signal transmission circuits $125_b$–$125_e$.

As above described, in the signal transmission circuit $125_a$ of block $U_5$, transistor 140 is turned ON while transistor 141 is turned OFF thus applying ground potential to the block input/output terminal $106'_a$. In the signal transmission circuits $125_b$–$125_e$ of the blocks $U_4$–$U_1$, transistors 140 are turned OFF while transistors 141 are turned ON. Accordingly, voltage $V_{DD}$ is applied to block input/output terminals $106'_b$–$106'_e$ regarding blocks $U_4$–$U_1$ via transistor 141 thus charging the capacitance $C_b$ of the block wiring lines $B_2$–$B_5$ of the key switch circuit 102 shown in FIG. 6. Then the diodes 107 connected to the key switches 101 included in blocks $U_4$–$U_1$ are reversely biased so that the key switches 101 included in the blocks $U_4$–$U_1$ will be electrically isolated from the note wiring lines $N_1$–$N_{13}$. However, since the potential of the block input/output terminal $106'_a$ of the block $U_5$ is reduced to the ground potential the capacitance $C_b$ of the block wiring wires $B_1$ will be discharged, thus rendering conductive the diode 107 connected to the operated key switch 101 of block $U_5$. At this time, key switches 101 of block $U_5$ correspond to tone notes C, B, . . . C# respectively and since the capacitances $C_n$ of respective note wiring lines $N_1$–$N_{12}$ have already been charged in the first state, the charges of the capacitances of the note wiring lines $N_1$–$N_{12}$ corresponding to the operated key switches will discharge through a circuit of diode 107 key switch 101 block input/output terminal $106'_a$ and transistor 140 of the block preference gate circuit $125_a$. In block $U_5$, for example, when it is now assumed that the key switches of notes B and A are closed, then the charges of the capacitances of the wiring lines $N_2$ and $N_4$ of notes B and A are discharged whereas the capacitances $C_n$ of the other wiring lines $N_1$, $N_3$, $N_5$–$N_{13}$ maintain their charges. Consequently, signals "0" are applied to the inputs of inverters 113 of the detected note memory circuits $110_b$ and $110_d$ from the note input/output terminals $108_b$ and $108_d$ whereas signal "1" are applied to the inputs of inverters 113 from the other note input/output terminals $108_a$, $108_c$, $108_e$–$108_m$. In this manner, signal "0" is applied from the block input/output terminal $106'_a$ of the extracted block $U_5$ to either one of the note input/output terminals $108_a$–$108_e$ corresponding to the operated key switch of the extracted block $U_5$, thus judging that the operated key switch corresponds to a specific note.

In the detected note memory circuits $110_a$–$110_m$ the signals applied through note input/output terminals $108_a$–$108_m$ are inverted by inverters 113 and then applied to one inputs of respective AND gate circuits 115. Since the other inputs of the AND gate circuits 115 and applied with the second state signal $ST_2'$ which is generated by the state control circuit 105 shown in FIG. 10, signal "1" is stored in the delay flip-flop circuits 117 via AND gate circuits 115 and OR gate circuits 116 in the detected note memory circuits $110_b$ and $110_d$ corresponding to the notes B and A which are detected when the other second state signal $ST_2'$ is executed by the operations described above.

The reason that the other second state signal $ST_2'$ is used for storing the note signal in the detected note memory circuit $110_a$–$110_m$ instead of the second state signal $ST_2$ is to positively store the detected note in the block detection circuit 104 only when a memory block is available (when the memory block signal MB is "1") and to inhibit to store a new memory in the third state as will be described later.

The second state described above completes within the period of one clock pulse ($\phi_A$), and at the next time $t_6$ (FIG. 11A) the delay flip-flop circuits 117 of the detected note memory circuits $110_b$ and $110_d$ parallelly produce signals "1" which are applied to the note preference circuits $111_b$ and $111_d$. At this time $t_6$, the third state $ST_3'$ is executed.

In the third state, signal note is derived out from the stored note signals according to a predetermined order of preference of the note preference gate circuits $111_a$–$111_m$. In the note preference gate circuits $111_a$–$111_m$ shown in FIG. 7, the order of preference is set in the order of notes C, B, . . . C# and CL. Like the block preference gate circuits $124_a$–$124_e$ described above, in the note preference gate circuits $111_a$–$111_m$, a signal "0" is normally applied to the inverter 120 of the note preference gate circuit $111_a$ of the most significant note C so that the output of the inverter 120 is normally "1". When this signal "1" is applied to the flip-flop circuit 117 of the defected note memory circuit $110_a$ the AND gate circuit 121 will be enabled at once. The outputs of the delay flip-flop circuits of the note preference gate circuits $111_a$–$111_1$ regarding the notes C - C# at the upper orders are applied to one inputs of the AND gate circuits at lower orders via OR gate circuits 119 whereas the outputs of the delay flip-flop circuits 117 of the note preference gate circuits $111_b$–$111_m$ regarding the notes B–CL at lower orders are applied to the other inputs of the AND gate circuits 121 thereby disabling the same. The outputs of the delay flip-flop circuits 117 of the detected note memory circuits $110_a$–$110_m$ are supplied to one inputs of the AND gate circuits 114 thereof whereas the outputs of the delay flip-flop circuits 117 of the detected note memory circuits $110_a$–$110_l$ regarding the notes C,C# at the higher orders of preference are sequentially applied via OR gate circuits 119 to the other inputs of the AND gate circuits 114 of the detected note memory circuits $110_b$–$110_m$ at lower orders. The AND gate circuit 114 of the detected note memory circuit $109_a$ at the highest order is normally supplied with signal "0" so as to self-hold the memory of the delay flip-flop circuit 117 of the detected note memory circuit $110_a$. The circuit is constructed such that the memories of the delay flip-flop circuits $110_b$–$110_m$ at lower orders are self-held by the signals "1" sent from the delay flip-flop circuits $110_a$ of the detected note memory circuits at higher orders.

Consequently, at time $t_6$ shown in FIG. 11A, that is at a time when the third state signal $ST_3$ is generated, the note preference gate circuit $111_b$ of note B produces an output signal "1" which is applied to the note code transmission circuit 122. At this time, the outputs of the other note preference gate circuits $111_a$, $111_c$–$111_m$ are all "0". When time $t_8$ (see FIG. 11A) is reached the memory of the detected note memory circuit $110_b$ is erased and the output of the delay flip-flop circuit 117 thereof becomes "0" with the result that the detected note memory circuit $110_d$ of note A applies signal "1" to the note code transmission circuit 122 via the note preference gate circuit $111_d$. When the next clock pulse is generated at time $t_{10}$ the memory of the detected note memory circuit $110_d$ will be erased.

As above described when the read out operations of all detected note signals are completed, the memory note signal MN produced by the OR gate circuit $111_m$ regarding the note at the lowest order changes to "0" at time $t_{12}$ as shown in FIG. 11H. This change of from "1" to "0" of the memory note signal MN means completion of the contents of the detected note memory circuits $110_a$–$110_m$.

As above described, in the third state, the memories of the notes B and A are continuously read out during an internal of clock pulses (two clock periods) corresponding to the number of notes (in this example A and B) stored in the detected note memory circuits $110_a$ through $110_m$.

Transistors 112 provided for the signal transmission circuits $109_a$–$109_m$ are connected to be turned ON when applied with either one of the first state signal $ST_1$ and the third state signal $ST_3$ so that in this embodiments the sum of the first and third state signals ($ST_1+ST_3$) is used to drive transistor 112 without preparing a specific third state signal.

Considering now the conditions contributing to the third state, it is essential that the state preceding one clock pulse is at the second state or at the third state. In the state control circuit 105 shown in FIG. 10, output signal $Q_2$ of the delay flip-flop circuit 143 is applied to one inputs of AND gate circuits 147–149. The fact that this signal $Q_2$ is "1" means that the present state is the second state or the third state as can be noted from Table 1. Under these conditions, the block detection circuit 104 applies to one input of AND gate circuit 149 a memory block signal MB which shows the presence of an available memory block, and the note detection circuit 103 applies to the other input of the AND gate circuit 149 a note presence signal AN which shows that there is a note signal required to be stored, whereby the AND gate circuit 149 is enabled to apply signal "1" to the delay flip-flop circuit 142. Whenever AND gate circuit 149 is enabled the AND gate circuit 148 is also enabled so that signal "1" is applied to the delay flip-flop circuit 142. As a result, the inputs to the delay flip-flop circuits 142 and 143 becomes "1" so that after one clock pulse both outputs $Q_1$ and $Q_2$ becomes "1" thus establishing the third state shown in Table 1. For this reason, a case wherein both outputs $Q_1$ and $Q_2$ are "1" shows that the third state is now being executed. Where the note presence signal AN is still generated after the state has changed to the third state, the output of the AND gate circuit 147 becomes "1" which is applied to the delay flip-flop circuits 142 and 143 thus changing their outputs $Q_1$ and $Q_2$ to "1" to continue reading out of the stored notes by maintaining the third state. Where the output $Q_1$ of the delay flip-flop circuit 142 is "1", the state is either the first or third state so that this signal is applied to transistor 112 of the note detection circuit 103 (FIG. 7) to act as the sum of the first and third state signals ($ST_1+ST_3$). When the AND gate circuit 148 of the state control circuit 148 of the state control circuit 105 shown in FIG. 10 is enabled whereas AND gate circuit 149 is not enabled, in other words, where the note presence signal AN from the note detection circuit 103 disappears at a time when the memory block signal MB is being supplied from the block detection circuit 104, it is judged that the extraction of the memory note of the extracted block has been completely thereby proceeding to the extraction of the next block and the note thereof. More particularly, when the output "1" of the AND gate circuit 148 is applied to the delay flip-flop circuit 143 via OR gate circuit 155 the outputs $Q_1$ and $Q_2$ of the delay flip-flop circuits 142 and 143 are changed to "0" and "1" respectively for generating the second state signal thereby proceeding to the second state.

When such control is effected, during a interval between $t_6$ to $t_{10}$ (FIG. 11A) the third state is repeatedly processed and when all memory notes of the detected note memory circuits $110_a$–$110_m$ have been extracted the note presence signal AN produced by the OR gate circuit 118 shown in FIG. 5 becomes "0". This means that the third state with reference to one block has terminated. Consequently, if any memory block is still remaining in the block detection circuit 104, (the memory block signal MB produced by the OR gate circuit 132 of the block detection circuit 104 shown in FIG. 8 is "1" the state control circuit 105 must repeat the control of the second state for extracting the next memory block thereby extracting a note corresponding to an operated key switch corresponding thereto. Accordingly, where only the AND gate circuit 148 of the state control circuit shown in FIG. 10 is enabled, the state control circuit 105 is returned to the second state by applying the output signal "1" of the AND gate circuit 148 to the delay flip-flop circuit 143 via OR gate circuit 155 whereby the second state signals $ST_2$ and $ST'_2$ are generated for controlling the second state in the same manner as above described. Since in this case the note B of block $U_3$ is not yet extracted (still remaining) the state is returned to the second state from the third state at time $t_{10}$ as shown in FIGS. 11E and 11F. As shown in FIG. 11K, the memory block $U_3$ is extracted by the second state signal $ST_2$ at times $t_{10}$ and $t_{12}$ shown in FIG. 11E. As shown in FIG. 11K, the memory block $U_3$ is extracted by the second state signal $ST_2$ at times $t_{10}$ and $t_{12}$, FIG. 11E. At the next clock pulse the state is again proceeded to the third state as shown by times $t_{12}$ and $t_{14}$ shown in FIG. 11F, thus extracting the note of the operated key switch of block $U_3$. Accordingly, note B during an interval of $t_{12}$–$t_{14}$ (FIG. 11L) is extracted. By repeating the operation described above all of the memory blocks stored in the block detection circuit 104 and the memory note stored in the note detection circuits 103 are extracted. Then, all of the clock presence signal AB, memory block signal MB, note presence signal AN, and memory note signal MN become "0". Consequently, AND gate circuits 147–151 of the state control circuit 105 shown in FIG. 10 are all disabled with the result that the signals supplied to the delay flip-flop circuits 142 and 143 become "0". Then, during the next clock cycle the outputs $Q_1$ and $Q_2$ become "0" thereby proceeding to the fourth state shown in Table 1, that is the waiting state. Consequently the fourth state signal $ST_0$ turns ON transistor 139 of the block detection circuit 104 whereby the block wiring lines $B_1$–$B_5$ are grounded to reset the key switch circuit system.

In the above described operation, when the state is switched to the second state during an interval $t_4$–$t_6$ shown in FIG. 11A, the block preference gate circuit $\mathbf{124}_a$ of the block detection circuit 104 produces signal "1" which is applied to the block code transmission circuit 126 to be converted into a block code BC which represents the block code $U_5$. More particularly, when the output signal from the block preference gate circuit $\mathbf{124}_a$ is applied to the block code transmission circuit 126, OR gate circuits $\mathbf{138}_a$–$\mathbf{138}_c$ produce signals "1", "0" and "1" respectively between $t_4$ and $t_6$ as shown in FIG. 11K which constitute the block code BC representing the block $U_5$. In this case, the circuit is constructed such that when the block preference gate circuits $\mathbf{124}_a$–$\mathbf{124}_e$ regarding blocks $U_5$–$U_1$ produce outputs the block code transmission circuit 126 produces block codes as shown in the following Table 2.

TABLE 2

| block | block code (BC) |
|---|---|
| $U_5$ | 101 |
| $U_4$ | 100 |
| $U_3$ | 011 |
| $U_2$ | 010 |
| $U_1$ | 001 |

In the foregoing description, notes B and A included in the block $U_5$ were sequentially extracted between $t_6$ and $t_{10}$ as shown in FIG. 11F. The extraction signal of note B at a higher order of preference is firstly applied to the note code transmission circuit 122 from the note preference gate circuit $\mathbf{111}_b$ of the note code detection circuit 103, shown in FIG. 7 as signal "1". In response to this signal, OR gate circuits $\mathbf{123}_a$–$\mathbf{123}_d$ produce signals "1", "1", "0" and "1" respectively between $t_6$ and $t_8$ as shown in FIG. 11L which constitute the note code NC representing note B. When the note preference gate circuit $\mathbf{111}_d$ applies its output signal to the note code transmission circuit 122 at the next clock pulse, OR gate circuits $\mathbf{123}_a$–$\mathbf{123}_d$ produce outputs "1", "0", "1" and "0" respectively between $t_8$ and $t_{10}$ as shown in FIG. 11L which constitute a note code NC representing note A.

Similar to the block code transmission circuit 126 of the block detection circuit 104 described above when the note preference gate circuits $\mathbf{111}_a$–$\mathbf{111}_m$ of the note detection circuit 103 produce outputs, the note code transmission circuit 122 will produce note codes NC as shown in the following Table 3.

TABLE 3

| note | note code (NC) |
|---|---|
| C | 1110 |
| B | 1101 |
| A# | 1100 |
| A | 1010 |
| G# | 1001 |
| G | 1000 |
| F# | 0110 |
| F | 0101 |
| E | 0100 |
| D# | 0010 |
| D | 0001 |
| C# | 0000 |
| CL | 1110 |

As shown in FIGS. 11K and 11L, the block detection circuit 104 and the note detection circuit 103 extract an encoded memory block at the highest order of preference (in this example block $U_5$) at the second state thereby proceeding to the third state at the next clock pulse $\phi_A$. At the third state, the stored notes (that is notes B and A) included in the previously extracted block $U_5$ are sequentially encoded and extracted. When the extraction of the stored notes completes, the state proceeds to the fourth state (waiting state) or returns to the second state. The fourth and second states are selected in accordance with the presence or absence of the memory block. Where the memory block $U_3$ is still remaining as above described, the state is returned to the second state thus extracting block $U_3$ as shown in FIG. 11K. When block $U_3$ is extracted the state is again proceeded to the third state by the next clock pulse $\phi_A$, thus extracting the memory note B as shown in FIG. 11L. These operations are repeated until all of the memory blocks and the memory notes are extracted, and when such extraction is completed the state is advanced to the fourth state (waiting state). By repeating these operations (first to fourth states) blocks and notes containing operated key switches are sequentially encoded and extracted.

However, the block code BC and the note codes NC produced by the block detection circuit 104 and the note detection circuit 103 are generated at different times as shown in FIGS. 11K and 11L, so that if they are applied to the circuits on the later stages without any modification difficulties would be resulted. For this reason, the block codes BC and the note codes NC are supplied to the sampling and holding circuit 106 shown in FIG. 9 so as to match their generating timings for combining them into a key code which is supplied to the circuits on the later stages. The sampling and holding circuit 106 also functions to form a special block code BC for the note CL.

The detail of the sampling and holding circuit 106 will be described hereunder with reference to FIG. 9.

When the block code transmission circuit 126 shown in FIG. 6 produces a block code BC consisting of three bits $KB_1$, $KB_2$ and $KB_3$ and representing the block $U_5$ at time $t_4$ as shown in FIG. 11K, respective bits $KB_1$–$KB_3$ of the block code BC are applied to the block code temporary memory circuits 156, 157 and 158 of the sampling and holding circuit 106. Respective block code temporary memory circuits 156–158 store respective bits $KB_1$–$KB_3$ in the delay flip-flop circuits 161 via OR gate circuits 160 at the timing of the clock pulse $\phi_B$. When the next clock pulse $\phi_A$ is supplied, the memory contents of the delay flip-flop circuits 161 are read out and supplied to one inputs of AND gate circuits 162–164. The output signals of respective delay flip-flop circuits 161 are applied to the inputs thereof via AND gate circuits 159 and OR gate circuits 160.

During an interval in which the AND gate circuits 159 are enabled, that is under the first and third states, the outputs of the delay flip-flop circuits 161 are applied to the inputs thereof. Writing by clock pulse $\phi_A$ and reading out of the stored signals by clock pulse $\phi_B$, one clock later than $\phi_B$, are continued to self-hold the memories. In this manner, the bits $KB_1$, $KB_2$ and $KB_3$ of the block code BC are stored in block code temporary memory circuits 156, 157 and 158, respectively. Accordingly, the block code BC which represents block $U_5$ is held during the third state. Each output signal of the block code temporary memory circuits 156, 157, 158 is applied to each of inputs of AND gate circuits 162–164, so that when the memory note signal MN is applied to the other inputs from the note detection circuit 103, AND gate circuits 162–164 are enabled. In other words, when the memory note signal MN that represents that the note detection circuit 103 contains a memory note is applied, the AND gate circuits 162–164 acting as the block code output gate circuits produce the memory output signals of the block code temporary memory circuits 156–158 and these output signals are applied to the delay flip-flop circuits 165–167. As a consequence, AND gate circuits 162–164 acting as the block code output gate circuits continue to produce the block code BC of the block $U_5$ as shown in FIG. 11M only during the interval in which the memory notes contained in block $U_5$ are extracted. Consequently, block codes BC are obtained during the interval of generating the note codes NC shown in FIG. 11L and the codes NC and BC are generated synchronously. When extraction of the memory notes B and A contained in block $U_5$ is completed, the memory note signal MN becomes "0" so that AND gate circuits 162–164 are disabled thus interrupting the sending out of the block code BC representing the block $U_5$ which is stored in the block code temporary memory circuits 156–158. When the memory note signal MN becomes "0" when the memory block signal MB is "1" or under a condition in which a memory block presents the state control circuit 105 shown in FIG. 10 returns to the second state. As a consequence, AND gate circuits 159 are disabled to clear the contents of the block code temporary memory circuits 156–158. The block codes BC sent out from AND gate circuits 162 through 164 are applied to the delay flip-flop circuits 165–167 respectively and send out therefrom as block codes BC at the timing of clock pulse $\phi_B$ as shown in FIG. 11N. The note codes NC produced by the note code transmission circuit 122 are applied to respective delay flip-flop circuits 168–171 from which they are sent out as note code outputs NC at the timing of the clock pulse $\phi_B$ as shown in FIG. 11D. Consequently, the block code outputs BC produced by the sampling and holding circuit 106 and representing block $U_5$, and the note code outputs NC representing the notes B and A contained in this block are produced at the same timing or synchronously. Each three bit block code BC and four bit note code NC are combined to form a key code KC of the parallel seven bits construction. For this reason, each seven bit key code KC represents one of the operated key switches. Where keys corresponding to note B of block $U_5$ are operated, as can be noted from Tables 2 and 3, block code BC is expressed by "101" whereas the note code NC by "1101" and the seven bit key code KC obtained by combining them is expressed by a code "101 1101". The sampling and holding circuit 106 sequentially performs contained in this block is extracted and supplied to respective delay flip-flop circuits of the sampling and holding circuits 168–171 and then sent out therefrom at the timing of clock pulse $\phi_B$. The block codes BC stored in the block code temporary memory circuit 156–158 are supplied to respective delay flip-flop circuits 165–167 by the memory note signal MN and then produced therefrom at the timing of clock pulse $\phi_B$ thus synchronized with the note code NC. Accordingly, the sampling and holding circuit 106 produces a seven bit key code "011 1101" representing the note B of block $U_3$. When the operations described above are completed the signals of all operated key switches (in this examples three key switches) are converted into corresponding key codes KC which are detectable digitally.

In addition to the operation of forming the seven bit key codes KC in synchronism with the generation of the block codes BC and the note codes NC, the sampling and holding circuit 106 also forms a special block code BC for note CL.

Inherently the note CL is contained in a block different from block $U_1$, but for the convenience of grouping the key switch circuit 101, the note CL is included in block $U_1$. For this reason, it is necessary to make block code BC of note CL to be different from the block code BC of block $U_1$. For the reason described above, where a signal is obtained from note CL, a special block code BC is purposely generated for forming a key code KC representing note CL. This special block code BC is generated in the following manner. More particularly, when a key switch corresponding to the note CL is depressed, since it is included in block $U_1$, the block code transmission circuit 126 produces a block code "001" that represents block $U_1$ which is stored in the block code temporary memory circuit 158 of the sampling and holding circuit 106. On the other hand, in the note detection circuit 103, AND gate circuit 121 of the note preference gate circuit $111_m$ produces an output signal at the third state. This output signal is converted into a note code "1110" representing note CL in the note code transmission circuit 122. The signal CL produced at this time by the AND gate circuit 121 of the note preference gate circuit $111_m$ is inverted by inverter 173 of the sampling and holding circuit 106 and the output of the inverter disables the AND gate circuit 162. As a consequence the "1" signal of above described block code "001" representing block $U_1$ is inhibited by AND gate circuit 162 so that the block code "001" is forcibly converted into "000". In this example, since a code "000" is not assigned to blocks $U_1$–$U_5$ this code "000" becomes the sixth block code BC, which is sent out only when key switch $101_m$ corresponding to note CL is operated so that this block code BC serves to discriminate the note C from note CL which are assigned in duplicate to note C. The flip-flop circuit 172 provided for the sampling and holding circuit 106 is used to produce a start signal X, one clock pulse delayed, by producing signal $ST_O$ by the state control circuit 105 at the timing of clock pulse $\phi_B$, and to supply the start signal X to a key ON-OFF detection circuit 202 to be described later.

Above description regards the detail of the operation of key coder 100 which detects operated keys and generates key codes KC corresponding thereto.

Channel Processor 200

The detail of the construction and operation of the channel processor 200 will now be described with reference to FIGS. 12–15 which are connection diagrams showing one examples of first key code memory circuit 201, key ON-OFF detection circuit 202, truncate circuit 203 and depressed key state memory circuit 204 which constitute the channel processor 200.

A. Key Code Memory Circuit 201

Figure 12:
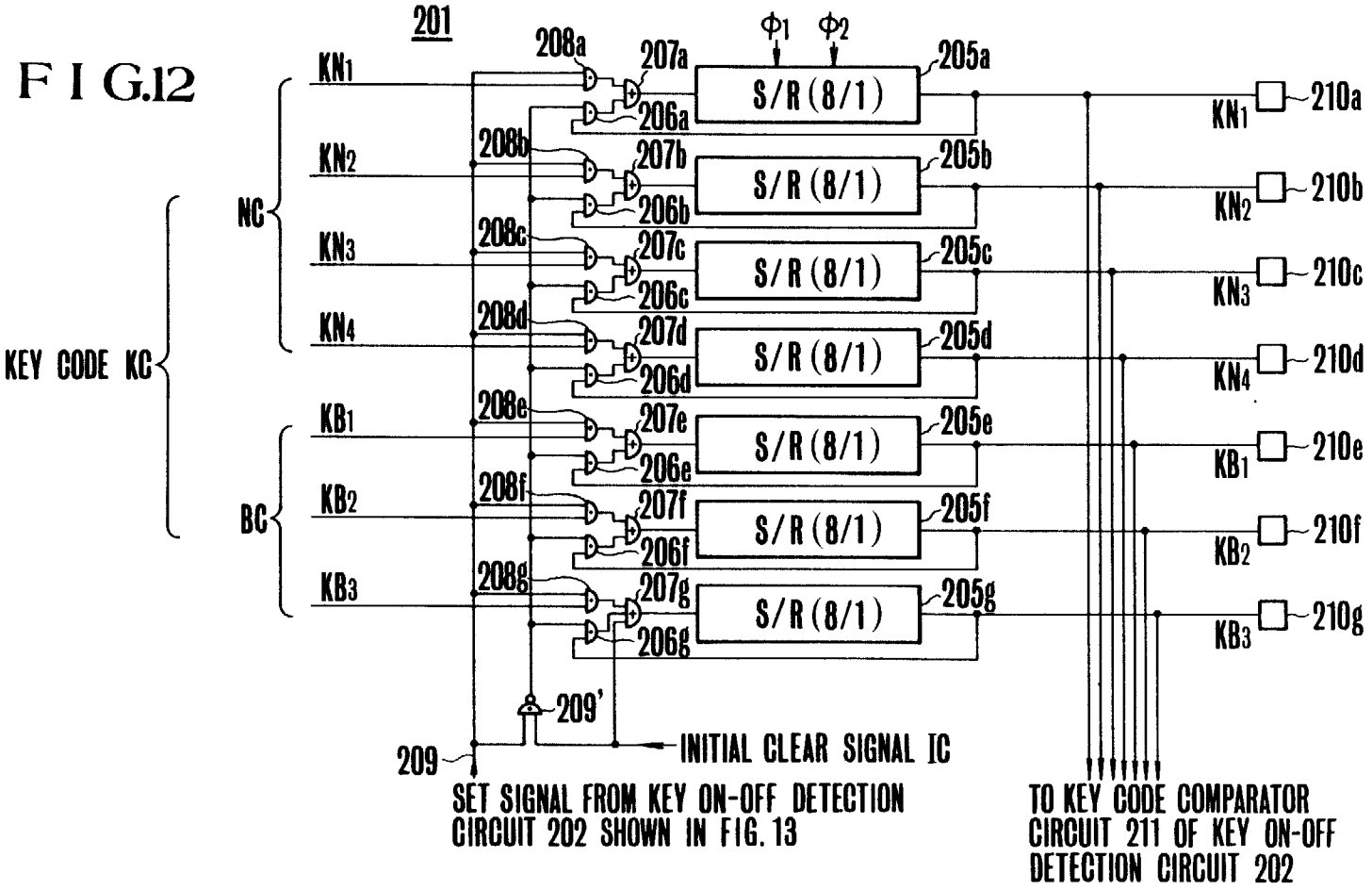
FIG. 12 is a connection diagram showing the detail of one example of a first key code memory circuit.

The first key code memory circuit 201 shown in FIG. 12 comprises a plurality of shift registers $205_a$–$205_g$ for respective bits $KN_1$–$KB_3$ of a key code KC, the number of the stages (memory positions) of each shift register being equal to the number of the musical tones that can be produced at the same time, that is the number of channels (in this embodiment, 8 channels). These shift registers $205_a$–$205_g$ are driven by a two phase clock pulse comprising a clock pulse $\phi_1$ shown in FIG. 5A and a clock pulse $\phi_2$ having an opposite phase with respect to the clock pulse $\phi_1$ so as to sequentially shift their contents. The outputs produced by the last stages of the shift registers are fed back to their inputs through AND gate circuits $206_a$–$206_g$ and OR gate circuits $207_a$–$207_g$ respectively. For this reason, these shift registers cooperate to constitute a 8 stage 7 bit circulating shift register having a number of stages capable of storing key codes of the same number as the channels, and comprising parallel bits. To the inputs of respective shift registers are applied key codes KC each consisting of bits [$KN_1$–$NB_3$] $KN_1$–$K[N]B_3$ via AND gate circuits $208_a$–$208_g$ and OR gate circuits $207_a$–$207_g$. Consequently, each time a set signal which is produced corresponding to channels not yet assigned with key codes is impressed upon line 209 from key ON-OFF detection circuit 202, the AND gate circuits $208_a$–$208_g$ are enabled to apply respective bit signals $KN_1$–$KB_3$ of the key codes KC in the shift registers $205_a$–$205_g$ and the same key code KC is written and held in the stages of respective shift registers corresponding to the channels not yet assigned with the key codes. The fact that which key code KC($KN_1$–$KB_3$) is assigned to which channel can be judged by the output timings of the shift registers driven by clock pulses $\phi_1$ and $\phi_2$ because clock pulses $\phi_1$ and $\phi_2$, and channels which are assigned with the key codes on the time division basis are synchronous. Accordingly, the stored key codes KC assigned to respective channels are derived out sequentially on the time division basis at each channel time shown in FIG. 5B, and the derived out key codes are sequentially applied to a key code converter 300 (to be described later) via output terminals $210_a$–$210_g$ and are also fed back to the inputs of respective shift registers to be feld therein. An initial clear signal IC is supplied to one input of the OR gate circuit $207_g$ to write signal "1" in the shift registers at the timing of the initial clear signal IC. To the other inputs of the AND gate circuits $206_a$–$206_g$ are applied the output of a NAND gate circuit 209'. The inputs of this NAND gate circuit 209' are connected to receive a set signal supplied from the key ON-OFF detection circuit 202 to be described later via line 209 and the initial clear signal IC.

B. Key ON-OFF Detection Circuit 202

Figures 13A, 13B, 13C:
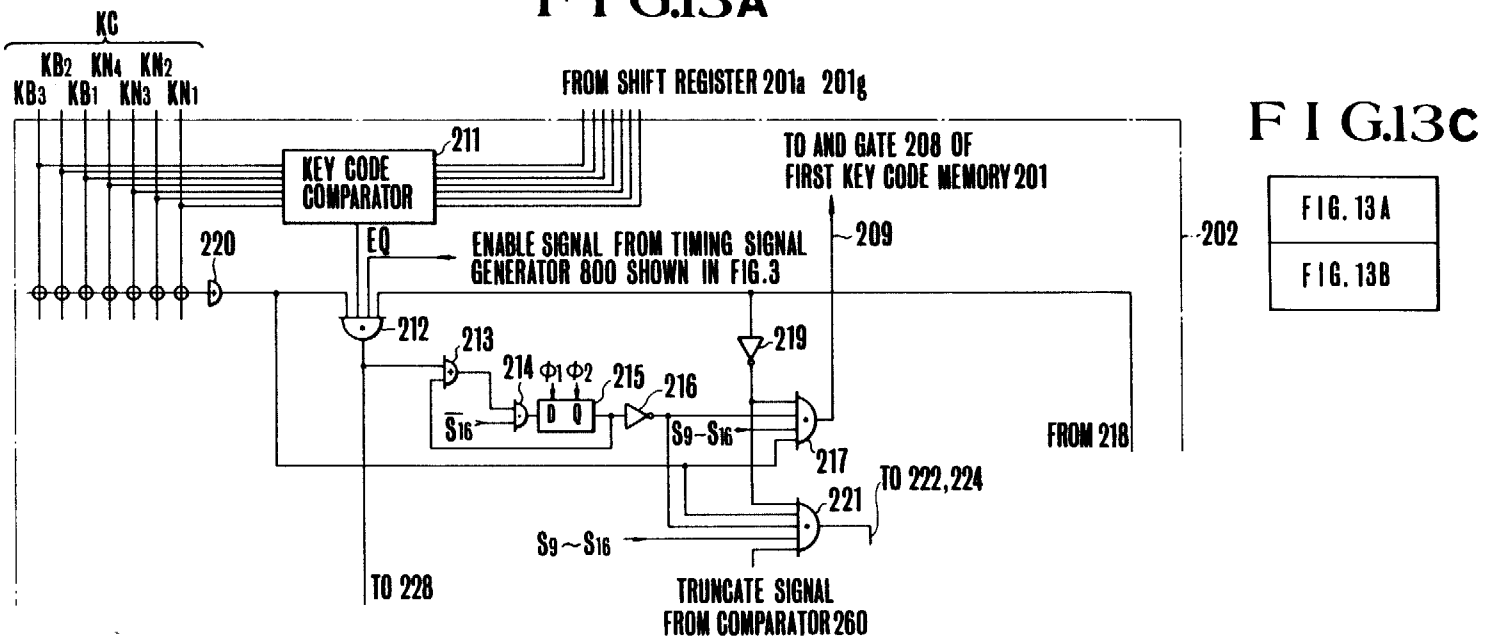
FIGS. 13A and 13B, when combined as shown in FIG. 13C, show a connection diagram show the detail of one example of the key ON-OFF detection circuit shown in FIG. 2.
Figure 13B:
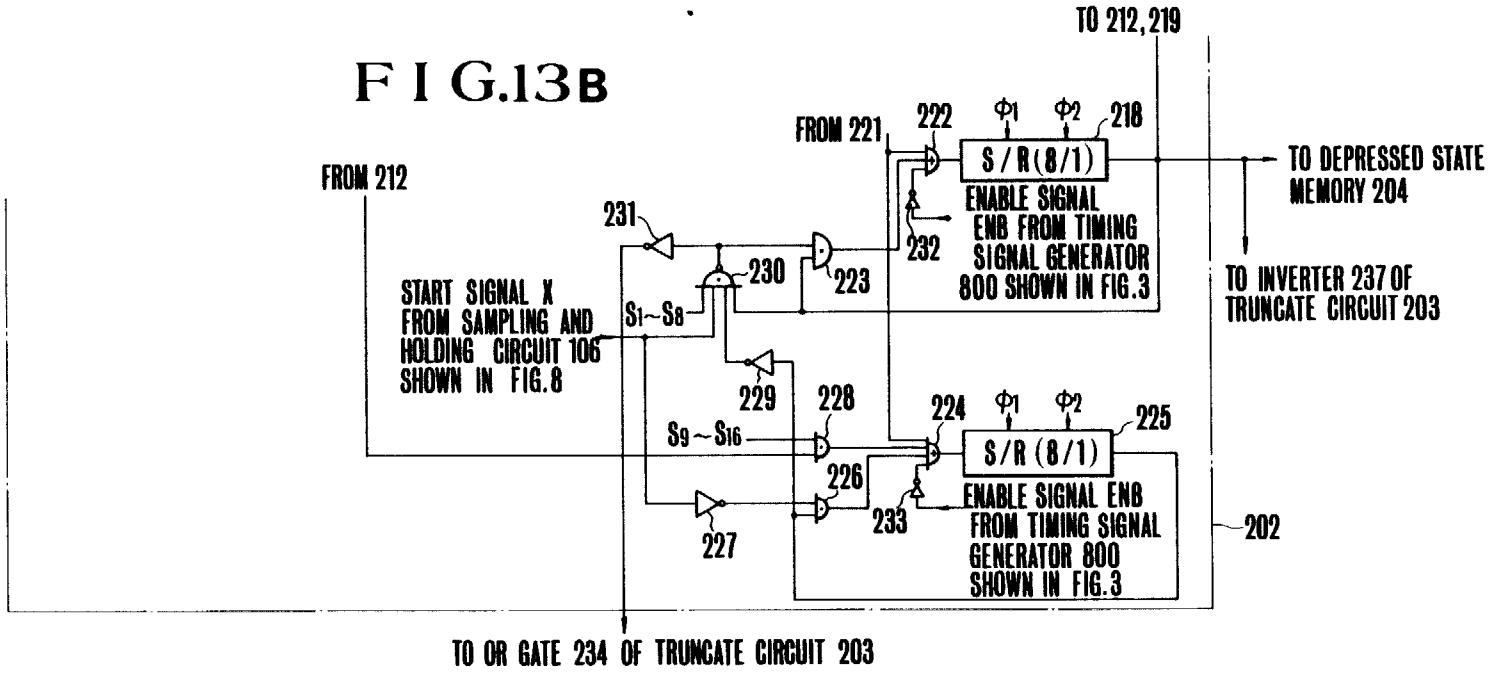

The key ON-OFF detection circuit 202 shown in FIGS. 13A and 13B comprises a key code comparator circuit 211 which compares the stored key codes KC derived out from shift registers $205_a$–$205_g$ of the first key code memory circuit 211 with key codes KC newly applied to the shift registers. The stored key codes corresponding to respective channels and supplied to the key code comparator circuit 211 circulate twice during one assignment period TP shown in FIG. 5D. More particularly, during the first half assignment period $TP_1$ (FIG. 5C) channel times 1 to 8 circulate once, and during the second half assignment period $TP_2$, channel times 1 to 8 circulate once again. In contrast, since the key code KC produced by the sampling and holding circuit 106 is read out by the clock pulse $\phi_B$ shown in FIG. 5I, the content of this key code KC does not vary during one assignment period TP. Consequently, with this circuit construction, the contents of respective shift registers $205_a$–$205_g$ are circulated twice and then derived out during one assignment period $TP_1$ the key code comparator circuit 211 compares two key codes to determine that whether the key codes KC now being produced by the key coder 100 during the first half of the assignment period $TP_1$ have already been stored in the shift registers or not, that is assigned to specific channels, and to make assignment during the second half of the assignment period $TP_2$ based on the result of comparison effected during the first half of the assignment period $TP_1$. The coincidence detection signal EQ produced by the key code comparator circuit 211 is "1" when there is a coincidence, whereas "0" when there is no coincidence. The coincidence between the detected key code KC and the key code KC assigned to a specific channel is judged by the channel time in which the coincidence detection signal EQ is "1". When, at the end of the first half assignment period $TP_1$, for example, the key code comparator circuit 211 produces a "0" signal as the coincidence detection signal EQ (this shows that the input key code KC is not yet assigned to any channel) the output of the AND gate circuit 212 is also "0". As a consequence, this output signal "0" from the AND gate circuit 212 is stored in delay flip-flop circuit 215 via OR gate circuit 213 and AND gate circuit 214. Since the pulse signal $S_{16}$ shown in FIG. 5F is applied to one input of the AND gate circuit 214, the memory content of the delay flip-flop circuit 215 is held until one assignment period elapses. The output signal "0" from the delay flip-flop circuit 215 is inverted by an inverter 216 and then applied to one input of an AND gate circuit 217. There is provided a shift register 218 having the same number of the memory stages as the channels (in this embodiment, 8) and is driven by clock pulses $\phi_1$ and $\phi_2$ in synchronism with respective channel times. The assignment states of respective channels are written in this shift register such that idle channels are represented by "0" and assigned channels by "1" and these data are shifted sequentially. Thus idle channels can be designated by discriminating the outputs of the shift register and by judging that the "0" outputs were generated in what channel times. When a "0" output representing an idle channel is produced by the shift register 218 during the second or latter half assignment period $TP_2$, the "0" signal is applied to one input of an AND gate circuit 217. The other three inputs of this AND gate circuit are connected to receive signals "1" applied through inverter 216, pulses $S_9$–$S_{16}$ shown in FIG. 5D and signal "1" produced by an OR gate circuit 220 which detects the key code KC and since the output of inverter 219 becomes "1" each time register 218 produces signal "0" corresponding to an idle channel, and the AND gate circuit 217 is enabled to supply signal "1" to line 209 of the first key code memory circuit 201 to act as a set signal. In response to this set signal the frist key code memory circuit 201 shown in FIG. 12 stores the input key code KC at a stage corresponding to an idle channel as described above. Since shift register 218 produces signals "0" at channel times corresponding to all idle channels, the same input key code KC is written in the stages corresponding to the idle channels of the first key code memory circuit. The AND gate circuit 221 (FIG. 13A) is applied to its inputs with a truncate signal in addition to the same inputs as the AND gate circuit 217. As will be described later, the truncate signal is generated in a channel time corresponding to a channel for a key which was released firstly, and the circuit is so constructed that one truncate signal will be generated in a channel time corresponding to the second half assignment period $TP_2$. Consequently the AND gate circuit 217 produces signal "1" in a channel time corresponding to a channel for a key which was released firstly among a plurality of channels corresponding to the stages of the shift register in which the input key code KC has been written by the set signal sent out from the AND gate circuit 217. The output "1" from AND gate circuit 221 is written in a corresponding stage of the shift register 218 shown in FIG. 13B via an OR gate circuit 222. In other words, signal "1" representing that assignment has been completed is written in a memory stage of the shift register 218 which corresponds to a channel corresponding to a stage in which an input key code KC has been written by the set signal produced by the AND gate circuit 217.

Consider now a case wherein an input key code KC has already been assigned to a channel which is stored in the first key code memory circuit 201. Where the input key code has already been assigned to certain channel, the coincidence detection signal EQ of the key code comparator circuit 211 is "1" which is applied to one input of an AND gate circuit 212. The inputs of this AND gate circuit receive "1" signals except the output from shift register 218. Accordingly, when the coincidence detection signal EQ is "1" and when the output of the shift register 218 is also "1", AND gate circuit 212 is enabled to produce signal "1" which is applied to the input of a delay flip-flop circuit 215 via an OR gate circuit 213 and an AND gate circuit 214 and held therein until one assignment period TP (FIG. 4E) elapses in the same maner as above described. However, since an inverter 216 is connected on the output side of the delay flip-flop circuit 215 it is impossible to obtain signals "1" from the AND gate circuits 217 and 221 when the coincidence detection signal EQ of the key code comparator circuit 211 is "1" with the result that no assignment is made. At this time, the output from the shift register 218 is fed back to the input via and AND gate circuit 223 and an OR gate circuit 222 thus preserving the original state. Under these condition, the other input of the AND gate circuit 223 receives signal "1" unless key is released.

The operation described above refers to the channel assignment operation of the input key code of the key ON-OFF detection circuit 202.

The released key detection operation of the key ON-OFF detection circuit 202 will now be described. In the channel assignment operation described above, the AND gate circuit 221 produces a signal "1" in a channel time corresponding to a channel which was assigned by the AND gate circuit 221 and this signal "1" is written in a stage of the shift register 218 corresponding to said channel thereby showing that the assignment to that channel has already been made. For this reason, the shift register 218 stores the state of assignment of respective channels, and the memory informations of the shift register are sequentially shifted by the clock pulses $\phi_1$ and $\phi_2$ corresponding to the channel times and then sequentially derived out from the last stage to be supplied to a depressed key state memory circuit 204 which will be described later with reference to FIGS. 14A and 14B and also fed back to the input of the shift register 218 via AND gate circuit 223 and OR gate circuit 222 for holding the memories by circulation.

The signal produced by the AND gate circuit 221 and showing the assigned channel is sequentially written and stored in a 8 stage shift register 225 having the same construction as the shift register 218. Accordingly, the contents of the shift registers 218 and 225 are the same at this time. The contents of the shift register 225 are also sequentially shifted by clock pulses $\phi_1$ and $\phi_2$, and the output from the last stage of this shift register 225 is fed back to its input via an AND gate circuit 226 and an OR gate circuit 224 for holding the memory contents.

Each time when a start signal X is produced by the delay flip-flop circuit 172 of the sampling and holding circuit 106 shown in FIG. 9 by the clock pulse $\phi_B$, that is each time signal X is produced at the timing of the clock pulse $\phi_B$ when all operated key signals are converted into corresponding key codes KC for establishing the fourth state, the signal X is applied to one input of an AND gate circuit 226 via an inverter 227, whereby the AND gate circuit 226 is disabled thus clearing all memory contents of the shift register 225. When thus cleared, the output from the AND gate circuit 221 and then output from the AND gate circuit 212 (via OR gate circuit 228) are written in the shift register 225. By this operation signal "1" is written in a stage of the shift register corresponding to a channel which is assigned with a key switch operated after the fourth state (waiting state) and the written signal is held until the next start signal X is generated.

On the other hand, since shift register 218 is not cleared or reset, even when keys are subsequently released signals "1" of the channels thereof are continuously written in corresponding stages of the shift register 218. Under these conditions, when the state again becomes the fourth state and a start signal X is supplied, the output signal of the shift register 225 would no more be fed back to the input side thereof but would be applied to one input of a NAND gate circuit 230 via an inverter 229. The other inputs of the NAND gate circuit 230 are supplied with pulse signals $S_1$–$S_8$ shown in FIG. 5C, a start signal X, the inverted output signal of the shift register 225 and the output signal of the shift register 218. Consequently, the outputs of the shift registers 218 and 225 are compared only under the fourth state and only during an interval between pulse signals $S_1$–$S_8$ (the first half assignment period $TP_1$). When the output of the shift register 218 is "1", and the output of the shift register 225 is "0", that is subsequent to the latest fourth state, where the key codes KC are not continuously supplied to corresponding channels (that is when the keys are released), the output of the inverter 229 becomes "1" so that the output of the NAND gate circuit 230 becomes "0" for detecting the channels of the released keys. Accordingly, by the judgement of the channel time of the signal "0" produced by the NAND gate circuit 230 the released keys of specific channels can be determined. Since the output "0" of the NAND gate circuit 230 disables AND gate circuit 223 it becomes impossible to feed back the output signal "1" of the shift register 218 to the input thereof so that the signals "1" of the stage corresponding to the channels regarding already released keys are changed to "0".

An inverter 231 is provided for inverting the output of the NAND gate circuit 230 which represents that a channel corresponding to a depressed key has been detected for applying the inverted signal to the truncate signal to be described later, and inverters 232 and 233 are provided for writing signal "1" in the shift registers 218 and 225 by an enabling signal ENB.

C. Truncate Circuit 203

Figures 14A, 14C:
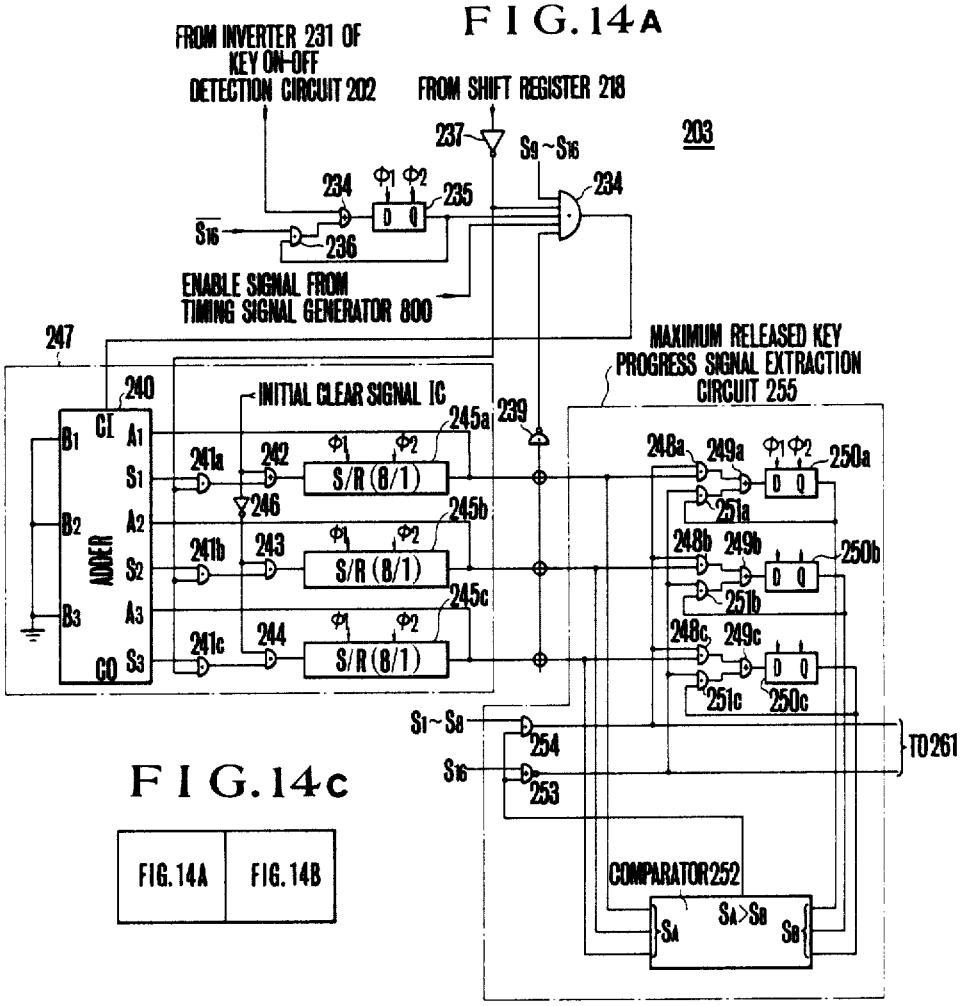
FIGS. 14A and 14B, when combined as shown in FIG. 14C, show a connection diagram of one example of a truncate circuit shown in FIG. 1.
Figure 14B:
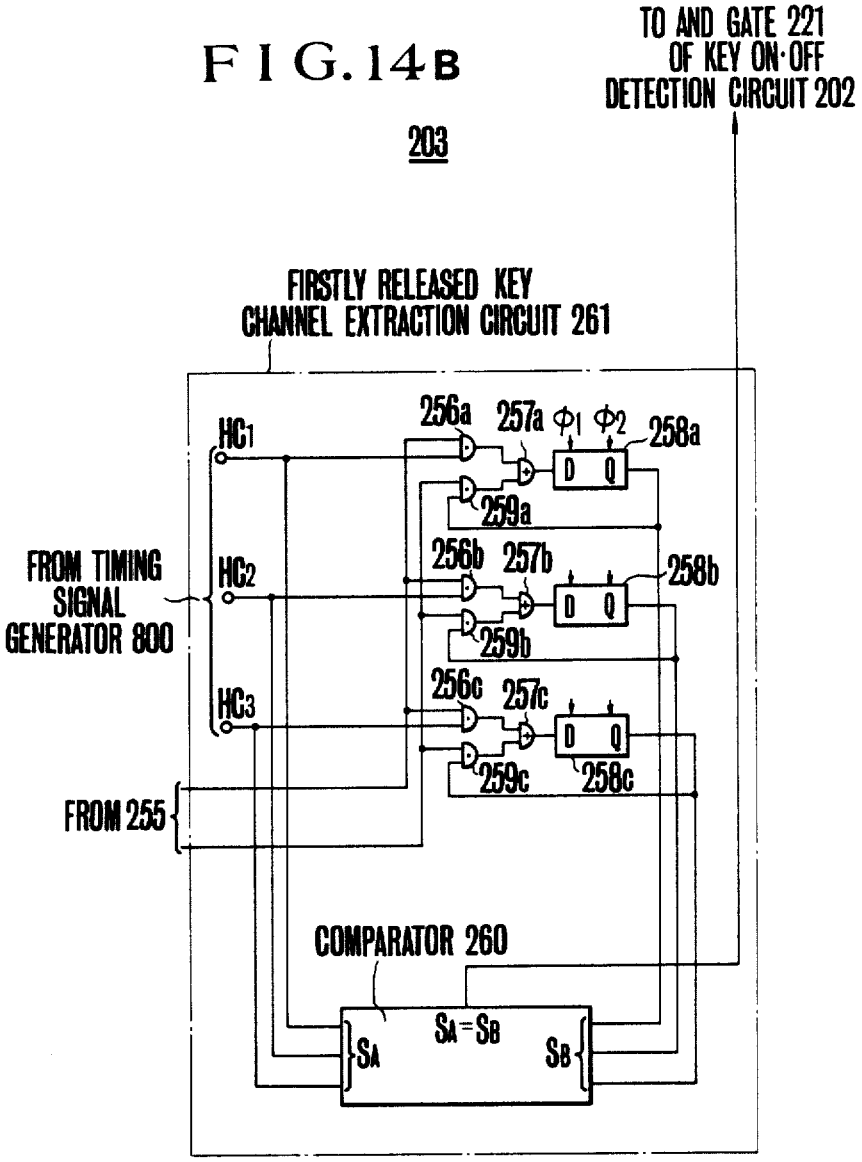

An example of the truncate circuit 203 is shown in FIGS. 14A and 14B. When the NAND gate circuit 230 of the key ON-OFF detection circuit 202 described above detects a channel of a released channel, the released key channel detection signal is inverted into signal "1" by an inverter 231 and then stored in a delay flip-flop circuit 235 via an OR gate circuit 234. The output of the delay flip-flop circuit 235 is fed back to its input side via an AND gate circuit 236 and an OR gate circuit 234 and held in the delay flip-flop circuit. To the other input of the AND gate circuit 236 included in the feed back circuit of the delay flip-flop circuit 235 is applied a pulse signal $\bar{S}_{16}$ shown in FIG. 5F, the delay flip-flop circuit 235 holds the fed back signal until the assigned period TP terminates and then resets. When the shift register 218 of the key ON-OFF detection circuit 202 produces an output under these conditions during a channel time corresponding to a channel not assigned during the second half assigning period (pulses $S_9$–$S_{16}$), signal "1" is applied from the inverter 237 so that AND gate circuit 238 is enabled to produce a pulse signal corresponding to the output "0" of the shift register 218. As will be described hereinbelow, in this case, the output of the NAND gate circuit 239 and the enabling signal ENB are "1". The output signal of the AND gate circuit 238 is applied to the input terminal CI of an adder 240 so as to add [1] to three bit signals applied to input terminals $A_1$–$A_3$ of the adder and the results of addition are produced from output terminals $S_1$–$S_3$ as three bit signals. These outputs are applied to one inputs of respective AND gate circuits $\mathbf{241}_a$ and $\mathbf{241}_b$ with the other inputs connected to receive the output of the inverter 27 so that the AND gate circuits $\mathbf{241}_a$–$\mathbf{241}_b$ are enabled only when signal "1" is produced by the inverter 237 or only during the channel time corresponding to a channel for which assignment has not been made thus supplying the outputs of the AND gate circuits $\mathbf{241}_a$–$\mathbf{241}_b$ to input terminals of shift registers $\mathbf{245}_a$–$\mathbf{245}_c$ respectively through OR gate circuit 242 and AND gate circuits 243 and 244. The AND gate circuits 243 and 244 are enabled by signal "1" supplied to their one inputs through an inverter 246 (in this case, the initial clear signal IC is not produced). Each one of the shift registers $\mathbf{245}_a$–$\mathbf{245}_c$ comprises a shift register having memory stages of the equal to the number of the channels (in this embodiment 8) and its content is sequentially shifted by clock pulses $\phi_1$ and $\phi_2$ synchronized with the channel time for producing an output from the last stage. The outputs from the shift registers $\mathbf{245}_a$–$\mathbf{245}_c$ are applied to input terminals $A_1$–$A_3$ of the adder 240. Accordingly, these circuit elements constitute a released key channel progress memory circuit 247 which sequentially adds [1] to the present count at a stage corresponding to an idle channel of the shift register 218 among various stages of shift registers $\mathbf{245}_a$–$\mathbf{245}_c$, each time the key OF-OFF detection circuit 202 detects a released key. Since the released key channel progress memory circuit 247 employs three parallelly connected shift registers $\mathbf{245}_a$–$\mathbf{245}_c$ each having 8 stages, parallel three bit released key progress signals applied to respective channels are sequentially shifted at each channel time so that the largest released key progress signal will be produced as a three bit signal (binary code) at a channel time corresponding to the firstly released key. Since the released key channel progress memory circuit 247 is of a 3 bit construction the maximum value of its output is "7" (111) so that by adding [1] the output becomes "0" (000). In other words there is a defect that the firstly released key channel is mistaken for the lastly released key channel. For this reason, on the output sides of the shift registors $\mathbf{245}_a$–$\mathbf{245}_c$ is provided a NAND gate circuit 239 for the purpose of detecting the coincidence of the three bit signals. The output of the NAND gate circuit 239 is applied to one input of the AND gate circuit 238 for disabling the same. Thus, further addition operation is inhibited for that channel thereby obviating the disadvantage described above. By the operation described above, it is possible to sequentially assign by using a circuit to be described later, starting from the channel whose key has been firstly released. Such assignment operation is necessary because, where the number of the depressed keys is large due to application of sustain after key release, it is necessary to assign a new key code by discriminating the firstly released key. The three bit released key progress signals produced by the released key channel progress memory circuit 247 at respective channel times are applied to and stored in respective delay flip-flop circuit $\mathbf{250}_a$–$\mathbf{250}_c$ for respective bits via AND gate circuits $\mathbf{248}_a$–$\mathbf{248}_c$ and OR gate circuits $\mathbf{249}_a$–$\mathbf{249}_c$. The three bit signals stored in respective delay flip-flop circuits $\mathbf{250}_a$–$\mathbf{250}_c$ are written by the clock pulse $\phi_1$ and read out by the clock pulse $\phi_2$ so that their outputs are delayed by one clock pulse period. The outputs are fed back to the inputs of the delay flip-flop circuits $\mathbf{250}_a$–$\mathbf{250}_c$ respectively via AND gate circuits $\mathbf{251}_a$–$\mathbf{251}_c$ and OR gate circuits $\mathbf{249}_a$–$\mathbf{249}_c$ to be stored. In other words, the delay flip-flop circuits $\mathbf{250}_a$–$\mathbf{250}_c$ act as the memory circuits for storing the three bit signals. The outputs from the delay flip-flop circuits $\mathbf{250}_a$–$\mathbf{250}_c$ are applied to a comparator 252 to act as three bit released key progress signals. The comparator 252 is constructed to compare released key progress signals $S_B$ which is delayed one clock period and supplied by the delay flip-flop circuits $250_a$–$250_c$ with newly released key progress signals from the released key channel progress memory circuit 247 so as to produce an output "1" only when $S_A > S_B$. Since this signal "1" is applied to one inputs of AND gate circuits $241_a$–$241_c$ via NOR gate circuit 253 as signal "0", feeding back of the outputs of respective delay flip-flop circuit $250_a$–$250_c$ to their inputs is inhibited. Also the signal "1" produced by the comparator 250 is applied to one input of an AND gate circuit 254 so that this AND gate circuit is enabled at the timing of producing the output from the comparator 252 during the first half assignment period $TP_1$. Thus, AND gate circuits $248_a$–$248_c$ are enabled to store respective bit signals of a newly released key progress signal $S_A$ produced by the memory circuit 247 in respective delay flip-flop circuits $250_a$–$250_c$. For the reason described above, these circuit elements constitute a maximum released key progress signal extraction circuit 255 which extracts or detects the maximum one of the released key progress signals of respective channels, and at the end of the first half assignment period $TP_1$, only the maximum released key progress signal is stored in one of the delay flip-flop circuits $250_a$–$250_c$ and these flip-flop circuits are reset by a pulse signal $S_{16}$ (FIG. 5E) at the end of one assignment period TP. The output of the AND gate circuit 254 which is produced during the first half assignment period $TP_1$ is applied to one inputs of AND gate circuits $256_a$–$256_c$, so that 3 bit encoded signals for respective channels and produced by the timing signal generator 800 shown in FIG. 4 that is the channel code signals $HC_1$–$HC_3$ (channel times encoded into binary signals) are stored in respective delay flip-flop circuits $258_a$–$258_c$ via OR gate circuits $257_a$–$257_c$ respectively. Like the maximum key release progress signal extraction circuit 255, the outputs of the delay flip-flop circuits $258_a$–$258_c$ are applied to the inputs of AND gate circuits $259_a$–$259_c$ together with the output of the NOR gate circuit 253, so that the channel code signals $HC_1$–$HC_3$ representing a channel in which the maximum released key progress signal is produced during the first half assignment period $TP_1$ are stored in the delay flip-flop circuits $258_a$–$258_c$. The channel code signals $HC_1$–$HC_3$ stored in these flip-flop circuits and representing the channels in which the maximum released key progress signal have been produced are held until one assignment period TP terminates. The delay flip-flop circuits $258_a$–$258_c$ are reset by a pulse signal $S_{16}$ (FIG. 5E) supplied thereto via NOR gate circuit 253. The channel code signals $HC_1$–$HC_3$ produced by the delay flip-flop circuits $258_a$–$258_c$ are applied to a compartor 260 to be compared with the input channel code signals $HC_1$–$HC_3$.

When both channel code signals coincide with each other, a coincidence signal "1" is produced which is applied to the key ON-OFF detection circuit 202 as a truncate signal. Since the channel code signals $HC_1$–$HC_3$ circulate twice during one assignment period TP, the writing of the signals into the delay flip-flop circuits $258_a$–$258_c$ is performed during the first circulation (the first half assignment period $TP_1$), the coincidence signal will be produced only once by the comparator 260 during a specific time in the second half assignment period $TP_2$. For this reason, these circuit elements constitute a firstly released key channel extraction or detection circuit 261 which produces a pulse signal utilized as the truncate signal in a channel time corresponding to the firstly released key channel (a channel in which truncate progresses to the largest extent) in each second half assignment period $TP_2$, whereby a channel is positively designated only once to which new key code KC is to be assigned for the key ON-OFF detection circuit 202. The reason that an inital clear signal IC is written in the shift register $245_a$ alone of the released key channel progress memory circuit 247 through the OR gate circuit 242 is to write signal "1" in all stages of the first shift register 245 thereby assuring the truncate operation at the initial state. More specifically, when all contents of the shift registers $245_a$–$245_c$ were reset, signal "1" (which is produced by the comparator 252 when $S_A > S_B$) would not be produced by the comparator 252 of the maximum released key progress signal extraction circuit 255. Consequently, the channel code signals $HC_1$–$HC_3$ would not be stored in the delay flip-flop circuits $258_a$–$258_c$ of the firstly released key channel extraction circuit 261 so that the delay flip-flop circuits $258_a$–$258_c$ will continue their reset states obtained by the pulse signal $S_{16}$ (FIG. 5E) applied through the NOR gate circuit 164. As a consequence, a condition of coincidence $S_A = S_B$ can not be obtained in the comparator 260 so that no truncate signal is produced and it would be impossible to assign the firstly produced key code KC. To obviate this difficulty, signal "1" is written in all stages of the shift registers 245 by using the initial clear signal IC.

The writing of signal "1" effected by the initial clear signal IC is not limited to the shift register $245_a$ so that it is sufficient to construct the circuit such that signal "1" is written in at least one of the three shift registers $245_a$–$245_c$. The above description relates to the operation of a truncate circuit 203 which designates one channel in the progress of advancing the truncate to the highest extent.

D. Depressed Key State Memory Circuit 204

Figure 15:
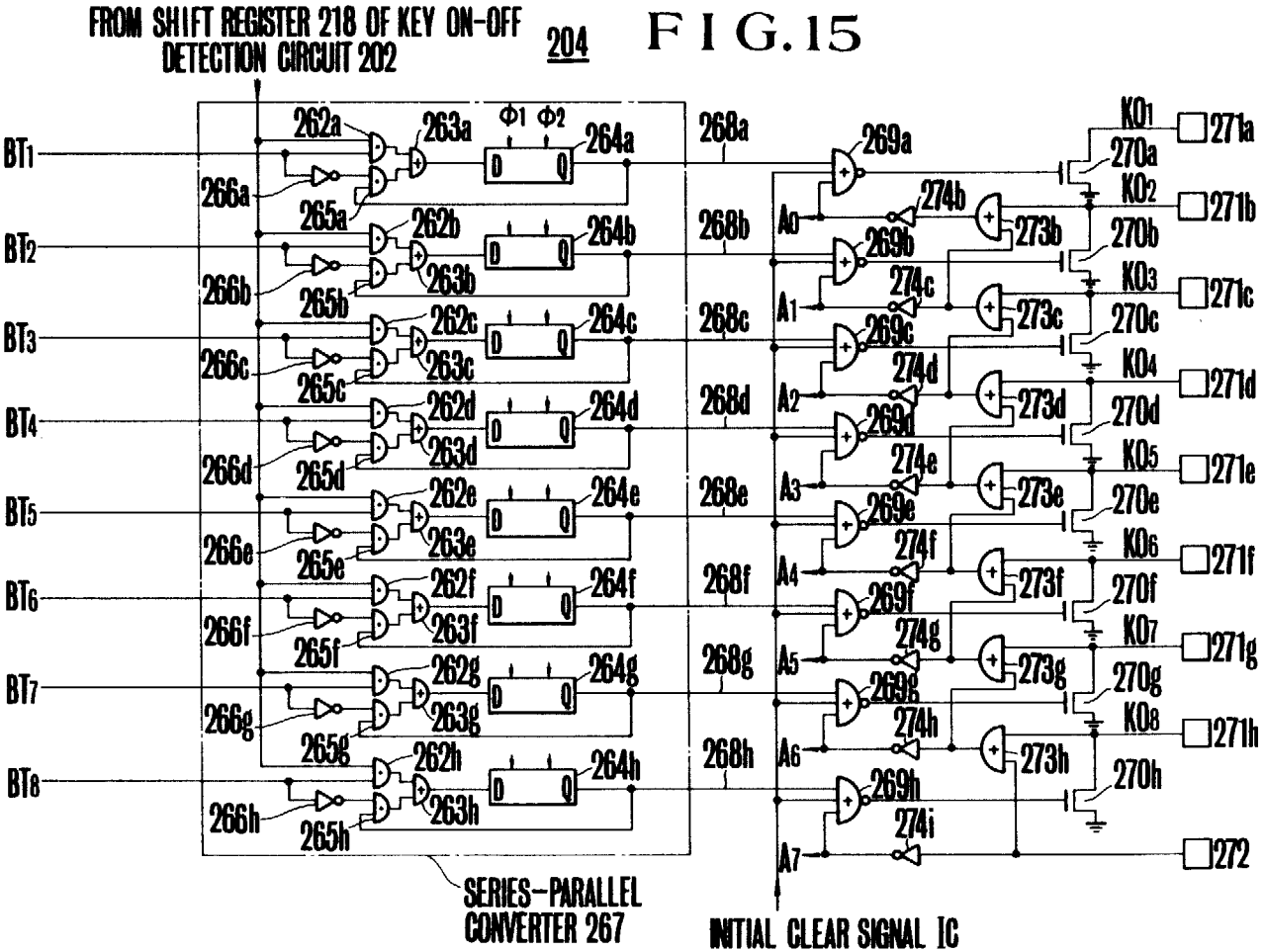
FIG. 15 is a connection diagram showing the detail of one example of a depressed key state memory circuit.

The detail of the depressed key state memory circuit 204 will now be described with reference to FIG. 15 in which the output from the shift register 218 of the key ON-OFF detection circuit 202 described above is sequentially applied to one inputs of AND gate circuits $262_a$–$262_h$ respectively. As described hereinabove the signal "1" has been written in only the stage corresponding to a channel assigned with the key code KC, and signal "0" has been written in a stage corresponding to the channel for a released key. Accordingly, the signal produced, on the time division basis, from the shift register at each channel time represents the present stage of a key assigned to each channel. The signals stored in the shift register in the above described manner are sequentially shifted by clock pulses $\phi_1$ and $\phi_2$ and finally produced from the shift register 218 and applied to the depressed key state memory circuit 204. When the output of the shift register is "1" that is during the channel time in which the key corresponding to the assigned key code is being depressed, some of the AND gate circuit $262_a$–$262_h$ in which some of the channel signals $BT_1$–$BT_3$ which are applied sequentially on the time division basis as shown in FIGS. 5J–5Q to respective channels from the timing signal generator 800 shown in FIG. 4, and having the same timing are enabled and the outputs "1" from the some of the AND gate circuits are stored in delay flip-flop circuits $264_a$–$264_h$ via OR gate circuits $263_a$–$263_h$. The outputs of the delay flip-flop circuits $264_a$–$264_h$ are fed back to their inputs via AND gate circuits $265_a$–$265_h$ and OR gate circuits $263_a$–$263_h$ and held in respective delay flip-flop circuits. Accordingly, signals "1" supplied from the shift register 218 shown in FIG. 13 and representing the depressed key channel are stored in only the stages of the delay flip-flop circuits $264_a$–$264_h$ which are provided for corresponding channels, and the signals "1" stored in the delay flip-flop circuits $264_a$–$264_h$ are held therein until subsequent channel signals $BT_1$–$BT_8$ which are produced on the time division basis disable AND gate circuits $265_a$–$265_h$ via inverters $266_a$–$266_h$. For example, when the shift register 218 (FIG. 13) produces signal "1" during the third channel time shown in FIG. 5, the channel signal generated in the third channel time is only the channel signal $BT_3$ shown in FIG. 5L. Consequently, only the AND gate circuit $262_c$ is enabled and its output signal is written in the delay shift register $264_c$ via OR gate circuit $263_c$. These circuit elements constitute a series-parallel converter 267 which converts signals which are produced serially on the time division basis in accordance with channel times and representing the depressed key channels of the shift register 218 into parallel signals for 8 channels. Consequently, respective delay flip-flop circuits $264_a$–$264_h$ of the series-parallel converter 267 are sequentially written with the output signals produced from the shift register 218 (FIG. 13) and representing the depressed key states of respective channels in accordance with the channel signals $BT_1$–$BT_8$. Thus, the series-parallel converter 267 produces signal "1" on some of the output lines $268_a$–$268_h$ for respective channels which are assigned with key codes KC and in which keys corresponding to the key codes are depressed. For example, as above described when a key of the third channel is depressed signal "1" will be produced on line $268_c$. The signals "1" produced in this manner corresponding to the depressed key channels are applied to the gate electrodes of field effect transistors $263_a$–$263_h$ via NOR gate circuits $269_a$–$269_h$ respectively whereby these field effect transistors are turned OFF to apply signals "1" to input/output terminals $271_a$–$271_h$ corresponding to the first to eight channels. For example, when the third channel is designated as above described, the delay flip-flop circuit $264_c$ applies signal "1" to one input of a NOR gate gate circuit $269_c$ via line $268_c$ and transistor $270_c$ alone is turned OFF by the output "0" from the NOR gate circuit $269_c$. As a result, only the input/output terminal $271_c$ is applied with signal "1" whereas the other input/output terminals $271_a$, $271_b$, $271_d$–$271_h$ with signals "0". Accordingly, the terminal supplied with signal "1" among the input/output terminals $271_a$–$271_h$ shows that the key of the corresponding channel is depressed. These signals "1" that is the key ON signals KO controls corresponding tone pitch voltage control circuits $501_a$–$501_h$ of the tone pitch control unit 500 for different channels to be described later.

The depressed key state memory circuit 204 is also provided with a mode terminal 272 for switching the number of tone generating channels. Since such switching is not related to this stage of description it is assumed now that the mode terminal 272 is supplied with signal "1". Accordingly, all inverters $274_i$–$274_b$ produce signal "0" at their outputs.

Key Code Converting Unit 300

Figures 16A, 16B, 16C:
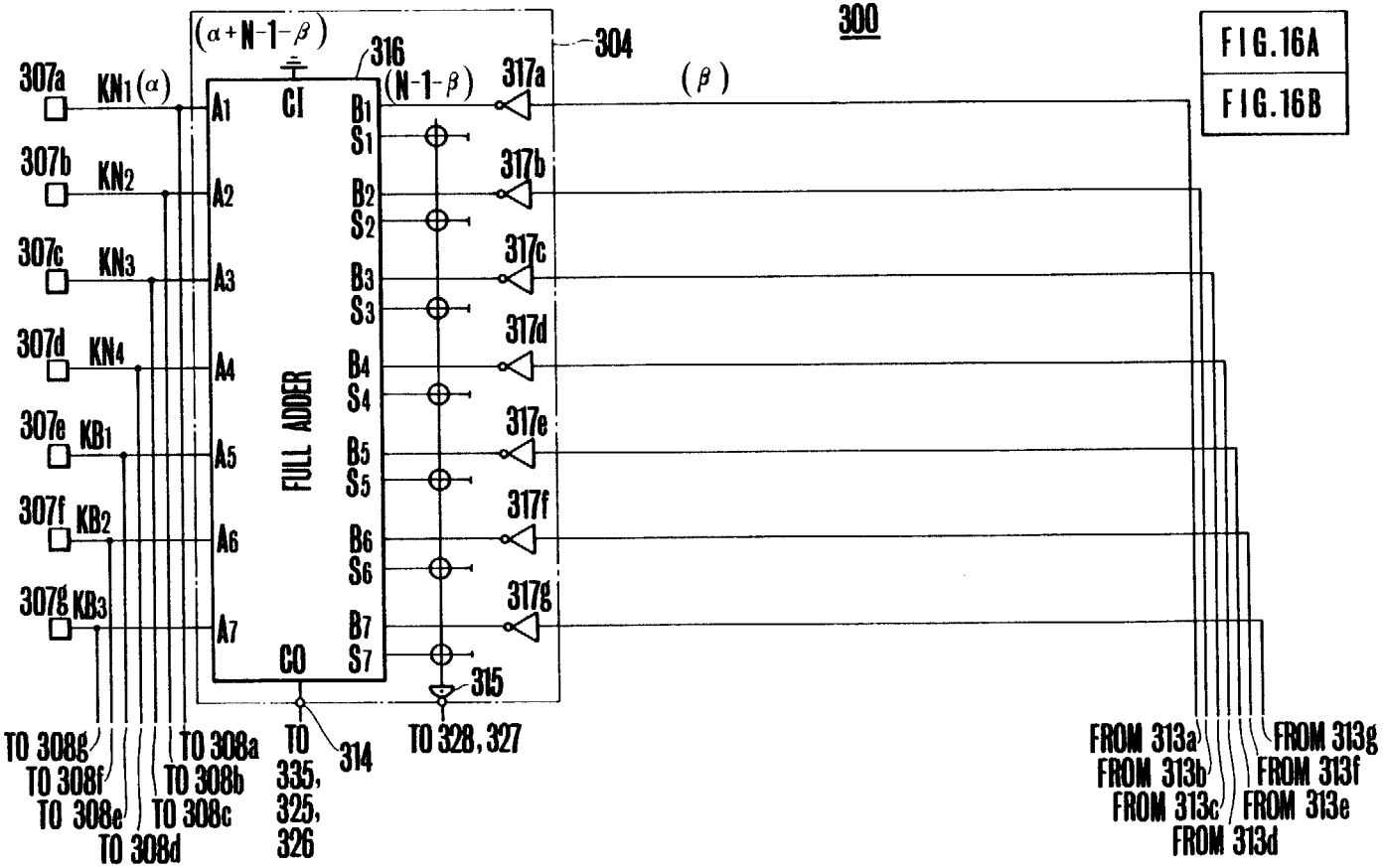
FIGS. 16A and 16B, when combined as shown in FIG. 16C, show examples of a comparator circuit, a calculating circuit and a second key code memory circuit shown in FIG. 2.
Figure 16B:
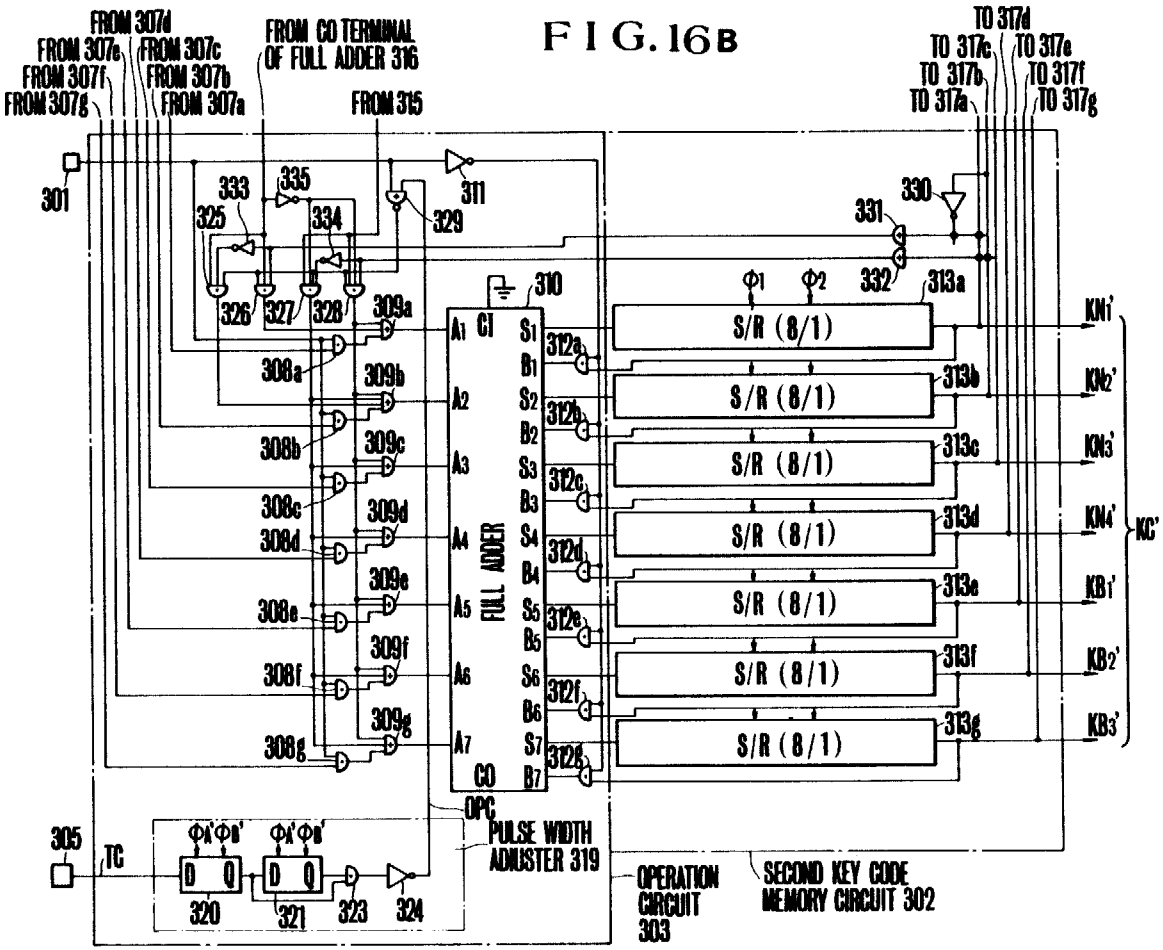

The detail of the key code converting unit 300 will be described hereunder with reference to FIGS. 16A and 16B which show one example of the key code converting unit 300 shown in FIG. 2. As shown, the key code converting unit comprises a second key code memory circuit 302, an operation circuit 303 and a comparator circuit 304.

A. Operation circuit 303

A key code shift control terminal 301 is provided for supplying to the operation circuit 303 a tone pitch variable control signal which detects presence or absence of a tone pitch variable control (glissando effect or portamento effect). A signal "1" is applied to this terminal 301 to produce a normal performance musical tone whereas a signal "0" is applied for effecting a tone pitch changing control. At first the normal operation will be described. When signal "1" is applied to the key code shift control terminal 301, this signal is applied to one inputs of AND gate circuits $308_a$–$308_g$ provided for the operation circuit 303 so as to pass respective bit signals $KN_1$–$KB_3$ from the first key code memory circuit 201 which are supplied through input terminals $307_a$–$307_g$ of the key code converting unit 300, and the bit signals $KN_1$–$KN_4$, $KB_1$–$KB_3$ of the key code signal KC are respectively applied to 7 bit input terminals $A_1$–$A_7$ of a full adder 310 via AND gate circuits $308_a$–$308_g$ and OR gate circuit $309_a$–$309_g$ respectively. The signal "1" applied to the key code shift control terminal 301 is inverted into signal "0" by an inverter 311 thereby disabling AND gate circuits $312_a$–$312_g$. Accordingly, the output signals produced by the last stages of shift registers $313_a$–$313_g$ of a second key code memory circuit 302 to be described later and connected to the 7 bit sum output terminals $S_1$–$S_7$ of the adder 310 are inhibited from returning and applied to the input terminals $B_1$–$B_7$ of the full adder 310. Each one of the shift registers $313_a$–$313_g$ has memory stages of the number same as the number of channels (in this embodiment 8). These memory stages are provided for respective bits $KN_1$–$KN_4$, $KB_1$–$KB_3$ of the key code KC, and the memories in the shift registers are shifted sequentially by clock pulses $\phi_1$ and $\phi_2$. Similar to the shift registers $205_a$–$205_g$ (see FIG. 12) of the first key code memory circuit 201 described above, the shift registers $313_a$–$313_g$ constitute a memory circuit which stores 7 bit key codes KC of the number equal to the number of the channels and sequentially shift the stored key codes. The full adder 310 operates to add input key code signals KC supplied to respective input terminals $A_1$–$A_7$ to the signals applied to respective input terminals $B_1$–$B_7$ for producing sum signals on the output terminals $S_1$–$S_7$. However, as the input signals applied to the input terminals $B_1$–$B_7$ of the adder 310 are inhibited by the output of the inverter 311, the input key codes KC will be produced of the output terminals $S_1$–$S_7$ of the adder 310 without any modification. The respective bits $KN_1$–$KN_4$ and $KB_1$–$KB_3$ of the parallel 7 bit key code signals KC appearing at the output terminals $S_1$–$S_7$ of the full adder 310 are parallelly stored in shift registers $313_a$–$313_g$ respectively. Consequently, these seven stage shift registers $313_a$ through $313_g$ store key codes KC of 8 channels and the stored key codes are sequentially shifted by clock pulses $\phi_1$ and $\phi_2$ and finally produced sequentially from the last stages as parallel seven bit signals. The key code signals KC' comprising parallel 7 bit output signals $KN_1'$–$KN_4'$ and $KB_1'$–$KB_3'$ are converted into corresponding tone pitch voltages by the key code tone pitch voltages converting unit 400 to be described hereinafter and then supplied to the musical tone forming unit 600. Accordingly, during the normal operation in which signal "1" is supplied to the key code shift control terminal 301, the seven bit key codes KC sequentially supplied from the first key code memory circuit 201 are sequentially produced without any change thus producing normal performance musical tones.

When signal "0" is applied to the key code shift control terminal 301, AND gate circuits $308_a$–$308_g$ on the input side of the full adder 310 are disabled thereby inhibiting all key codes KC from the first key code memory circuit 201 from being applied to the adder 310. When signal "0" is applied to the key code shift control terminal 301 the output of the inverter 311 becomes "0" with the result that AND gate circuits $312_a$–$312_g$ are enabled to apply the output signals of the shift registers $313_a$–$313_g$ to the input terminals $B_1$–$B_7$ of the adder 310. At this time, since the key codes KC supplied to input terminals $A_1$–$A_7$ of the full adder 310 from the first key code memory circuit 201 are inhibited by the AND gate circuits $308_a$–$308_g$, signals applied to input terminals $B_1$–$B_7$ of the adder 310 from respective shift registers $313_a$–$313_g$ will appear on the output terminals $S_1$–$S_7$ of the adder 310 without any change and then fed back to the inputs of respective shift registers $313_a$–$313_g$ to be held therein. Under these conditions, when a new key code NKC is generated by the depression of a key, the new key code NKC supplied by the first key code memory circuit 201 is compared with the key codes KC' produced by respective shift registers $313_a$–$313_g$ by comparator 304 shown in FIG. 16A. When the value of $A(A_1$–$A_7)$ is larger than that of $B(B_1$–$B_7)$, that is $A>B$, signal "1" appears on terminal 314, whereas in the opposite case signal "0" appears on terminal 314. Where $A=B$, the output of a NAND gate circuit becomes "0". In this case, the comparator 304 operates on the 2's complement logic by utilizing an adder 316. More particularly, bit signals $KN_1$–$KN_4$ and $KB_1$–$KB_3$ of the new key code NKC supplied from the first key code memory circuit 201 are applied to the input terminals $A_1$–$A_7$ of the adder 316, whereas the output signals from the second key code memory circuits 302 are applied to the other input terminals of the adder 316 respectively through inverters $317_a$–$317_g$. The sum output terminals $S_1$–$S_7$ of the adder 316 are supplied with coincidence signals obtained by the NAND gate circuit 315. When the sum of A $(A_1$–$A_7)$ and B $(B_1$–$B_7)$ exceeds the number of the output bits (in this embodiment 7), the adder 316 produces a carry signal $N=1$ from a carry producing terminal CO. The comparison is performed in the following manner. Let us denote the value of the new code NKC applied to input terminals $A_1$–$A_7$ by $\alpha$, and the value of the output key code KC' produced by the second key code memory circuit 302 by $\beta$. Under these states, the value of the signals applied to input terminals $B_1$–$B_7$ is equal to a value N minus "1" at which the carry signal is produced, that is a value corresponding to $(N-1)$ at which signals applied to input terminals $B_1$–$B_7$ are all "1", minus the values of $\beta$ inverted by inverters $317_a$–$371_g$, that is $(N-1-\alpha)$. Consequently, the sum of $\alpha$ applied to input terminals $A_1$–$A_7$ and $(N-1-\beta)$ applied to input terminals $B_1$–$B_7$, that is $(\alpha+N-1-\beta)$ appears on the carry producing terminal CO and output terminals $S_1$–$S_7$ which produce the result of addition of the adder 316. Where $\alpha>\beta$, a carry signal $N=$"1" appears on the carry signal producing terminal CO. On the other hand, where $\alpha\leqq\beta$, the carry signal produced by the carry signal producing terminal CO is "0". When $\alpha=\beta$, the signal becomes $(N-1)$ so that all signals appearing on output terminals $S_1$–$S_7$ are "1" thus changing the output from the NAND gate circuit 315 to "0".

A speed control pulse TC for controlling the speed of a tone pitch change and having a relatively long period is applied to a speed control terminal 305 shown in FIG. 16B from an oscillator to be described later. The speed control pulse TC is shaped by a pulse width adjuster 319 into a calculation control pulse having a pulse width corresponding to 8 channel times. This operation will be described as follows. The pulse width adjuster 319 comprises delay flip-flop circuit 320 and 321 which are driven by a clock pulse $\phi_B'$ produced during the first to third channel times as shown in FIG. 17A and by a clock pulse $\phi_A$ produced during the fifth to seventh channel times as shown in FIG. 17B, and AND gate circuit 323 and an inverter 324. When the pulse width adjuster 319 is supplied with a speed control pulse TC having longer period than clock pulses $\phi_A'$ and $\phi_B'$ as shown in FIG. 17C, the speed control pulse is written in the delay flip-flop circuit 320 by the clock pulse $\phi_A'$, and produces a signal shown in FIG. 17D in accordance with clock pulse $\phi_B'$. The output from the delay flip-flop circuit 320 is applied to the input of the delay flip-flop circuit 321 to be written therein by the clock pulse $\phi_A'$. The signal stored in the delay flip-flop circuit 321 is taken out as a $\overline{Q}$ output shown in FIG. 17E by the clock pulse $\phi_B$. When applied with the outputs of both delay flip-flop circuits 320 and 321, the AND gate circuit 323 is enabled to produce a pulse signal as shown by FIG. 17F. In this manner, the AND gate circuit 323 produces an output at each building up portion of the speed control signal TC and the pulse width of the output is equal to a width covering the first to eighth channel times. The output of the AND gate circuit 323 is inverted by inverter 324 and the output of this inverter is used as an operation control signal OPC shown in FIG. 17G.

Under these states, when a key code KC having a larger $\alpha$ than the output key codes KC' of the shift registers $313_a$–$319_g$ is supplied from the first key code memory circuit 201, the carry signal producing terminal CO of the adder 316 produces signal "1" as above described which is applied to one inputs of AND gate circuits 325 and 326. When applied with the speed control signal TC shown in FIG. 17C from the oscillator to be described later, the pulse width adjuster 319 produces an operation control signal OPC shown in FIG. 17G which is applied to one inputs of AND gate circuits 325–328 via the NOR gate circuit 329. At this time, the note code NC sent from the note code transmission circuit 122 of the note detection circuit shown in FIG. 7 comprises binary codes (BCD) in which note C# is taken as the reference and a semitone is used as one unit. For example, binary codes are assigned such that [0] to note C#, [1] to note D, [2] to note D#, [4] to note E, [5] to note F, [6] to note F#, [8] to note G, [9] to note G#, [10] to note A, [12] to note A#, [13] to note B, and [14] to note C skipping [3], [7], [11] and [15]. With such assignment, it is possible to discriminate whether the increasing or decreasing increment to the next step is [1] or [2] by judging the least two bits $KN_1$ and $KN_2$ of the note code. To realize an ascending chromatic scale, a value "1" should be added when the bits $KN_1$ and $KN_2$ exhibits "00" or "10", whereas a value [2] should be added in the other cases. To realize a descending chromatic scale, a value [1] should be subtracted when the bits $KN_1$ and $KN_2$ exhibits "10" or "01", and a value [2] when "00". Accordingly, when an OR gate circuit 331 applied with the output from a shift register $313_a$ and the output of a shift register $313_b$ inverted by an inverter 330 produces signal is "1", it means that [1] is to be added, whereas when an OR gate circuit 332 applied with the outputs of shift registers $313_a$ and $313_b$ produces signal "1", it means that [1] is to be subtracted. For example, when the bit signals $KN_1$–$KN_4$ produced by shift registers $313_a$–$313_d$ are "1000" which represents note D, OR gate circuit 331 and 332 produce signals "1" respectively. These signals "1" are applied to one inputs of AND gate circuits 326 and 328 whereas AND gate circuits 325 and 327 are disabled by the outputs "0" of inverters 333 and 334. As a consequence, only AND gate circuit 326 is enabled to produce signal "1". This signal "1" is applied to only terminal $A_1$ of the adder 310 via OR gate circuit $309_a$ to add [1] to the key codes supplied to input terminals $B_1$–$B_7$, that is the key codes utilized to judge a portion of the notes by the OR gate circuits 331 and 332, and the result of addition is applied to the inputs of shift registers $313_a$–$313_g$ via output terminals $S_1$–$S_7$ and stored in these shift registers. When the note codes $KN_1'$–$KN_4'$ produced by the shift register $313_a$–$313_d$ are "0100" which represents a note D#, the output of the OR gate circuit 331 becomes "0" which is inverted by inverter 333 to obtain signal "1". By this signal "1" AND gate circuit 325 alone is enabled. The output signal "1" of this AND gate circuit is applied to the input terminal $A_2$ alone via a OR gate circuit $309_b$ so that a key code KC' produced by adding [2] to the output key code KC' of shift registers $313_a$–$313_g$ is supplied and stored in these shift registers. Accordingly, where the output key code KC' of the second key code memory circuit 302 is smaller than the input key code KC, [1] or [2] is sequentially added depending upon the note codes $KN_1'$–$KN_4'$ and the sum is stored again in the second key code memory circuit 302. Since the operation control signal OPC (FIG. 17G) is a single pulse which is generated for an interval of from the first to speed control pulse TC is supplied, the operation described above terminates when the contents of shift registers $313_a$–$313_g$ are shifted one cycle by clock pulses $\phi_1$ and $\phi_2$. As a result, each time the speed control signal TC is supplied, an addition operation is made for the key code KC' of each channel. When the key code KC' added with [1] or [2] is read out in the next cycle, the key code KC' of each channel is changed to a code representing a note of one order higher. Upon application of the next speed control pulse TC, [1] or [2] is added by an operation similar to that described above for producing a key code KC' representing a note of higher order.

In this manner, each time a speed control pulse TC is applied, the key code signal of each channel is stepwisely increased until the value $\alpha$ of the input key code KC coincides with the value $\beta$ of the key code KC' produced by the second key code memory circuit 302 at which the carry signal produced from the carry signal terminal CO of the adder 316 becomes "0" with the result that AND gate circuits 325 and 326 utilized to control the addition of [1] or [2] are disabled to terminate the operational processing.

The key codes KC' corresponding to respective channels of the second key code memory circuit 302 do not coincide each other in many cases. In such cases, the addition operations are sequentially completed in channels in which a condition $\alpha=\beta$ holds. When the addition operations of all channels are completed the key codes KC' corresponding to all channels of the second key code memory circuit 302 coincide with the input key codes KC. The repetition frequency of the addition operation is controlled by the period of the speed control pulse TC, and therefore the speed of the stepwise increase of the key code KC' for each channel can be varied by varying the period of the speed control pulse TC thus changing the speed of the portamento or glissando performance as will be described later. Since the circulation time of each one of the shift registers $313_a$–$313_g$ is extremely short, when an operation control signal having a pulse width larger than one circulation time is used a key code signal at several higher orders will be formed in an extremely short time whereby it is impossible to produce a portamento effect or a glissando effect having a desired speed. The pulse width adjusting circuit 319 is provided to obviate this difficulty.

The operation described above performs a key code conversion necessary to obtain a gradually rising portamento or glissando effect.

When a key code KC having a value $\alpha$ smaller than the key code KC' produced by the second key code memory circuit 302 is supplied from the channel processor 200, the NAND gate 315 of the comparator 304 produces a signal "1" while the carry signal producing terminal CO of the adder 316 produces signal "0". Consequently, opposite to that described above, the output "1" of the inverter 335 is applied to each one of inputs of the AND gate circuits 327 and 328. Then, only the AND gate circuit 328 is enabled when OR gate circuit 321 produces signal "1" that designates a subtraction, and the output of the AND gate circuit 328 is applied to all input terminals $A_1$–$A_7$ of the adder 310, which means that $(N-1)$ is to be added as above described. The result of addition becomes $(N-1+\beta)$ corresponding to the sum of a carry signal N and $(\beta-1)$ appears on the output terminals $S_1$–$S_7$ meaning that [1] was subtracted. When the output of the OR gate circuit 332 becomes "0", the AND gate circuit 327 alone is enabled by the output signal "1" of the inverter 334 to produce a signal "1" which is applied to the input terminals $A_2$–$A_7$ of the adder 310. Thus, by the input terminals except terminal $A_1$, $(N-2)$ is added. As a consequence, the result of addition becomes $(N-2+\beta)$ consisting of a carry signal N and $(\beta-2)$, the latter being applied to output terminals $S_1$–$S_7$ showing that [2] was subtracted.

By repeating the operation each time a speed control pulse TC is applied, the number of key codes KC corresponding to respective channels and stored in the second key code memory circuit 302 gradually decreases thereby obtaining portamento and glissando effects in which the tone pitch decreases gradually. When the value $\beta$ of the output key code KC' of the second key code memory circuit 302 coincides with the value $\alpha$ of the input key code, all signals appearing on the output terminals $S_1$–$S_7$ of the adder 316 become "1" and the output signal of the NAND gate circuit 315 becomes "0". As a consequence, AND gate circuits 327 and 328 are disabled to terminate the subtraction operation.

With the key code converting unit constructed as above described, as a new key code NKC is applied, the key codes KC' stored in the second key code memory circuit 302 and corresponding to respective channel are sequentially calculated until the key code KC' stored in the second key code memory circuit 302 and corresponding to each channel comes to coincide with a new key code NKC, thereby producing gradually varying key code KC' which is applied to the musical tone forming unit 600 to be described later. Thus, it is possible to obtain a portamento or glissando effect which varies at any speed from a musical scale corresponding to a previously operated key to a musical scale corresponding to a newly operated key.

Key Code Tone Pitch Voltage Converting Unit 400

The detail of the key code tone pitch voltage converting unit 400 will now be described with reference to FIGS. 18 and 19. The key code tone pitch voltage converting unit 400 comprises a sampling control circuit 402 shown in FIG. 18, a sampling circuit 401 and a digital-analogue converter 403 shown in FIGS. 19A and 19B. At first, the sampling control circuit 402 which produces a reference timing signal and a control signal will be described.

A. Sampling Control Circuit 402

The detail of one example of this circuit 402 is shown in FIG. 18 in which a synchronizing signal $\overline{SYNC}$ is applied to an inverter 404 via the timing signal generating unit 800 shown in FIG. 4. Consequently, signal "1" is written in the first stage of an 8-stage/1-bit shift register 405 driven by clock pulses $\phi_1$ and $\phi_2$ by applying the output signal SYNC from the inverter 404 via an OR gate circuit 406 and the stored signal "1" is shifted sequentially by the clock pulses $\phi_1$ and $\phi_2$. Channel signals $BT_1$–$BT_8$ (FIGS. 20B–20H) the same as the channel signals $BT_1$–$BT_8$ shown in FIG. 4 are produced by respective stages of the shift register 405. As a signal "1" written in the first stage of the shift register 405 is shifted up to the last stage thereof, a NOR gate circuit 407 produces a signal "1" thus again a signal "1" is written in the first stage. Consequently, shift register 405 is driven synchronously with the shift register 802 shown in FIG. 4. The reason that two shift registers are synchronously driven for obtaining the same channel signals $BT_1$–$BT_8$ is that where the circuit is assembled by a plurality of integrated circuit blocks or where the shift registers are remotely located, it is possible to readily obtain eight synchronized channel signals $BT_1$–$BT_8$ by using a single synchronizing line. The first to third outputs of the shift register 405 is taken out as a clock pulse $\phi_B'$ shown in FIG. 20Q through an OR gate circuit 408, whereas the fifth to seventh outputs are taken out as a clock pulse $\phi_A'$ shown in FIG. 20R via an OR gate circuit 409. These clock pulses $\phi_A'$ and $\phi_B'$ are applied to the delay flip-flop circuits 320 and 321 shown in FIG. 16B. The output signal of the inverter 404 is also applied to the input of 9-stage/1-bit shift register 411 driven by the clock pulses $\phi_1$ and $\phi_2$. The respective stage outputs of this shift register are applied to one input of the OR gate circuit 410 via a NOR gate circuit 414. Consequently, the last stage of the shift register 411 produces a pulse signal SC at each nineth count of the clock pulses $\phi_1$ and $\phi_2$. The inverter 412 produces an inverted signal $\overline{SC}$ of the pulse signal SC as shown in FIG. 20F. The outputs from the first and last stages of the shift register 411 are applied to the NOR gate circuit 413 for producing a pulse signal SOF which is "0" when thenineth and first bits are produced as shown in FIG. 20H.

Various pulse signals produced by the sampling control circuit 402 are utilized in the sampling circuit 401 in a manner to be described later.

B. Sampling Circuit 401 and Digital-Analogue Converting Circuit 403

Figures 19A, 19B, 19C:
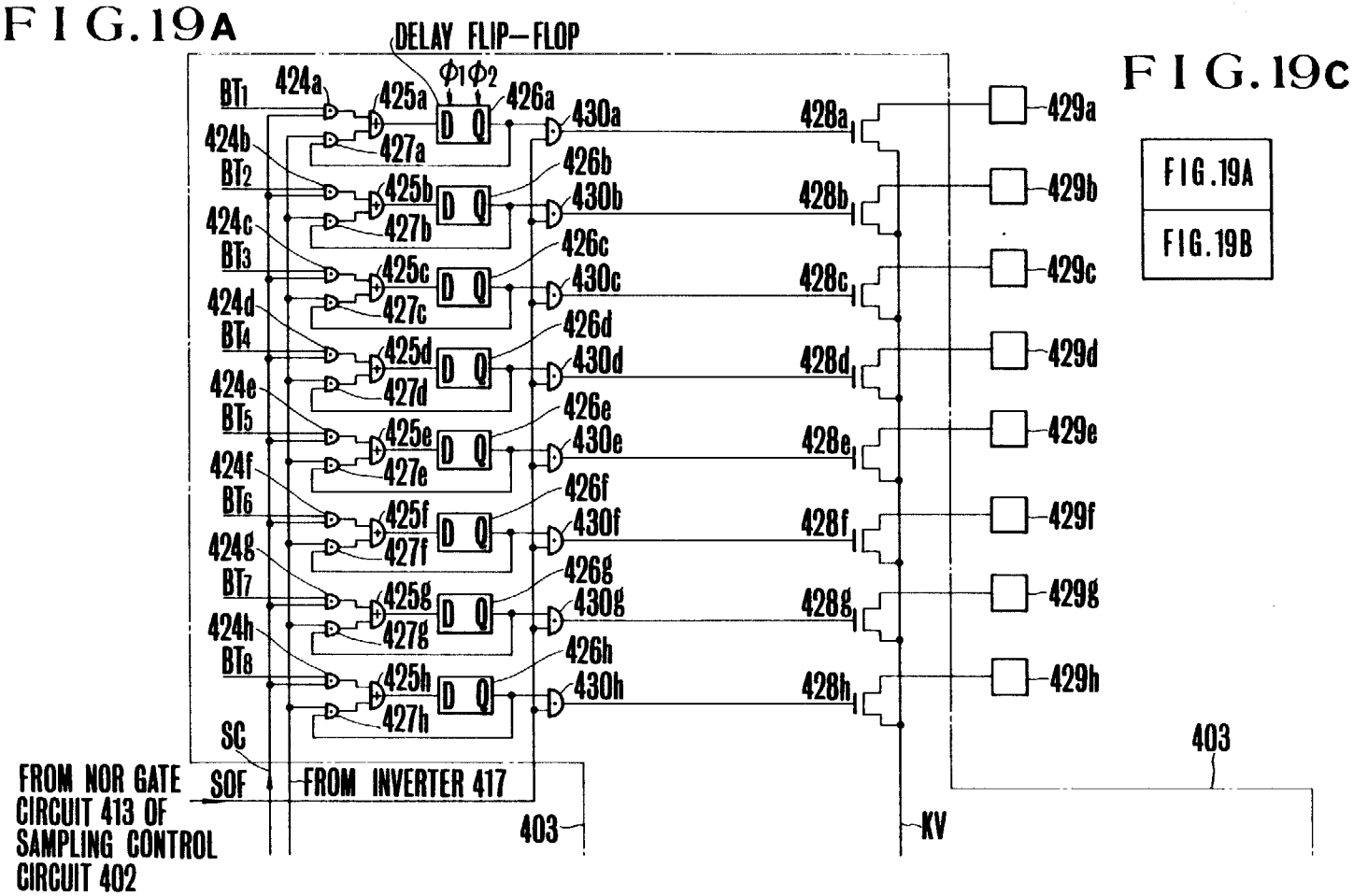
FIGS. 19A and 19B, when combined as shown in FIG. 19C, show a connection diagram showing the detail of one examples of a sampling circuit and an analogue-digital conversion circuit shown in FIG. 2.
Figure 19B:
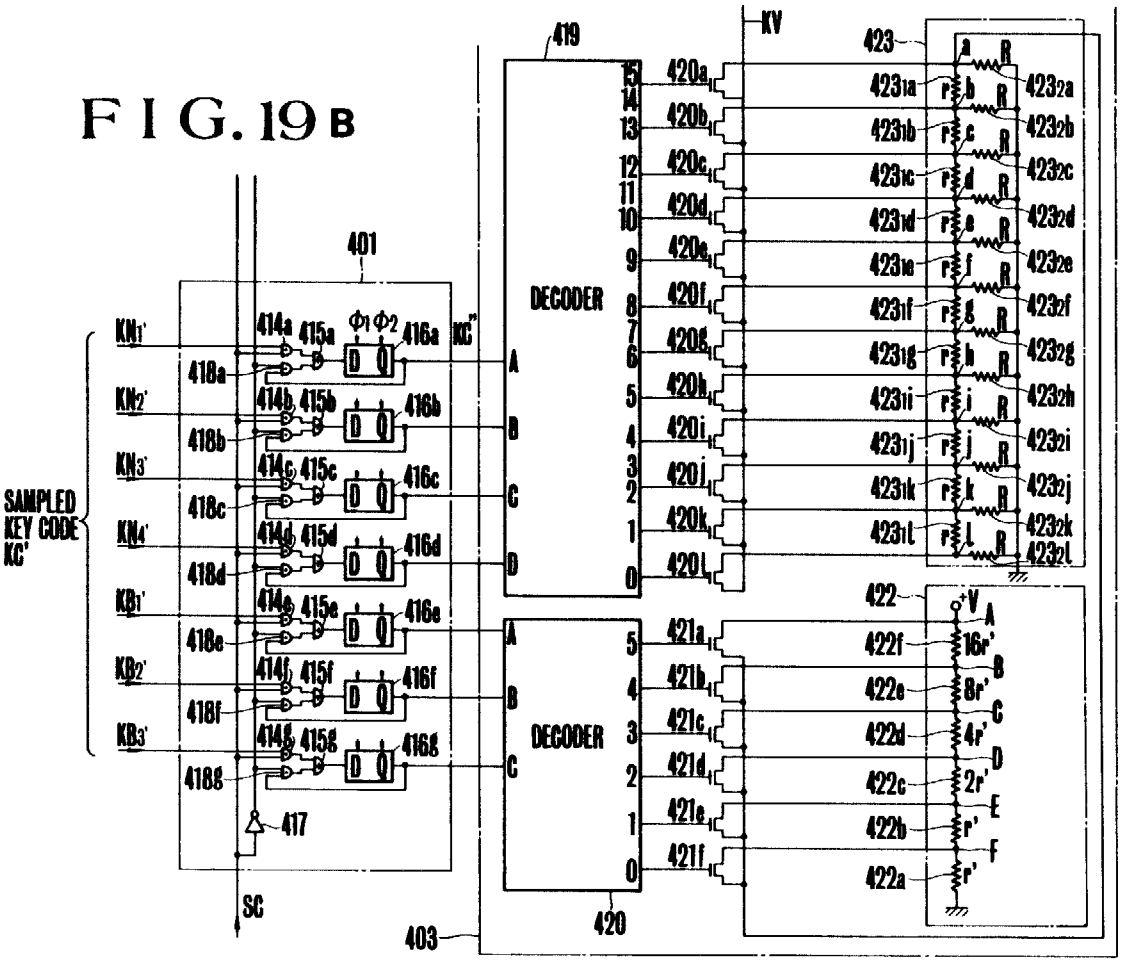

FIGS. 19A and 19B show the detail of one example of the sampling circuit 401 and the digital-analogue converting circuit 403. The respective signal bits $KN'_1$–$KB'_3$ of the outputs key code KC' of the second key code memory circuit shown in FIG. 16B are supplied and stored in delay flip-flop circuits $416_a$–$416_g$ respectively via AND gate circuits $414_a$$414_g$ and OR gate circuits $415_a$–$415_g$ respectively. The stored informations (or key codes) are held until the next pulse signal SC is supplied to inverter 417, and AND gate circuits $418_a$–$418_g$ are disabled by the "0" output from the inverter 417. Since the shift register 411 has 9 stages which is larger by one then the number of channels, the pulse signal produced by the shift register 411 is synchronous with the channel time which varies sequentially each time the channel time circulates. Thus, by sampling the output signal of the second key code memory circuit 302 with a pulse signal produced from the last stage of the shift register 411 it is possible to sample the key codes KC' at different channel times. More particularly, as shown in FIG. 20J, the pulse signal $SC_1$ samples a key code KC' corresponding to the second channel times $BT_2$ for storing the sampled key code KC' in the delay flip-flop circuits $416_a$–$416_g$. Accordingly, this sampling corresponds to successive sampling of the output key code KC' of the second key code memory each channel, and the memory of the sampled key code KC'' is held until the next sampling. Such reduced speed sampling is effected for the reason that the digital-analogue converting circuit 403 to be described later can not follow a high speed operation and that since the succeeding circuit systems are constructed to parallelly process the informations for respective channels, they are not required to operate at a high speed as key code 100 and channel processor 200. Thus, the circuit elements described above constitute the sampling circuit 401 which sequentially samples the key codes KC' of respective samples at reduced speeds.

The key codes KC'' sampled at a low speed by the pulse signal SC of the sampling circuit 401 and stored in the delay flip-flop circuits $416_a$–$416_g$ are divided into note codes $KN_1''$–$KN_4''$ and block codes $KB_1''$–$KB_3''$ which are supplied to decoders 419 and 420 respectively where the codes are converted into parallel decimal signals thus producing signals "1" only at the output terminals corresponding to the codes. For example, when a key code KC'' representing the note B of block $U_5$ is applied, a signal "1011" is applied to the input terminals A–D of the decoder 419, while a signal "101" to the input terminals A–C of the decoder 420. Consequently, the decoder 420 which converts block codes $KB_1''$–$KB_3''$ produce signal "1" at its output terminal 5 alone. The decoder 419 which converts the note codes $KN_1'$–$KN_4''$ produces signal "1" only at its output terminal 13. Consequently, among transistors $420_a$–$420_b$ and $421_a$–$421_f$ respectively connected to the output terminals of decoders 419 and 420, only transistors $420_b$ and $421_a$ respectively connected to terminals 13 and 15 at which signal "1" appears are turned on. Accordingly, the voltage appearing at point A of a first potentiometer circuit constituted by resistors $422_a$–$422_f$ (the values of these resistors are selected to be r'–16r') and serving to divide a source voltage +V is supplied to point a of a second potentiometer circuit 423 comprising a plurality of resistors $423_{1a}$–$423_{1b}$ (having a resistance value r) and resistors $423_{2a}$–$423_{2n}$ (having a resistance value R), through conducting transistor $421_a$. When transistor $420_b$ is turned on by the output of the decoder 419 the potential at point b will be derived out. Since the potential of point a is the output of the first potentiometer 422 selected to correspond to the block codes $KB_1''$–$KB_3''$, the output signal of transistor $420_b$ will have a voltage value corresponding to the block codes $KB_1''$–$KB_3''$ and the note codes $KN_1''$–$KN_4''$ and used as the tone pitch voltage KV which controls the voltage controlled type variable frequency oscillator to be described later. The key code KC' supplied from the key code converting unit 300 is sampled at a low speed and then supplied to decoders 419 and 420 so that it is held for one period of the low speed sampling and then produced as an output signal. When converting a digital signal into a tone pitch voltage KV, due to the electrostatic capacitance of transistors $420_a$–$420_l$, and $421_a$–$421_f$ connected on the output side of decoders 419 and 420 and due to the stray capacitance of the circuit system, the rate of build up of the converted output signal (tone pitch voltage KV) is influenced by a CR time constant so that the output can not increase sharply. However, this difficulty can be obviated at the time of assigning the tone pitch voltage KV to respective channels as will be described in the following.

The pulse signal SC generated by the sampling control circuit 402 is also applied to one inputs of AND gate circuits $424_a$–$424_g$ of the digital-analogue converting circuit 403. The other inputs of these AND gate circuits are connected to receive channel signals $BT_1$–$BT_8$ respectively shown in FIGS. 20A–20I so that only the AND gate circuit 424 which is supplied with a channel signal synchronous with the pulse signal SC (FIG. 20J) is enabled, and the output of this AND gate circuit 424 is stored in the delay flip-flop circuits $426_a$–$426_h$ via OR gate circuits $425_a$–$425_h$. As described above, since the pulse signal supplied to one inputs of the AND gate circuits $424_a$–$424_h$ is the output produced from the last stage of the shift register 411 which has counted clock pulses of the number equal to the number of the channels plus one so that the pulse signal SC coincides with one of the channel signals sequentially shifted by one from channel signals $BT_1$–$BT_8$. Consequently, this pulse signal SC samples channel signals $BT_1$–$BT_3$ at a reduced speed of $\frac{1}{8}$, and each one of the sampled channel signals $BT'_1$–$BT'_8$ is stored in either one of the delay flip-flop circuits $426_a$–$426_g$ and held therein until the AND gate circuit $427_a$–$427_h$ are disabled by the output of the inverter 417.

Figures 20A, 20L, 20M, 20O, 20P:
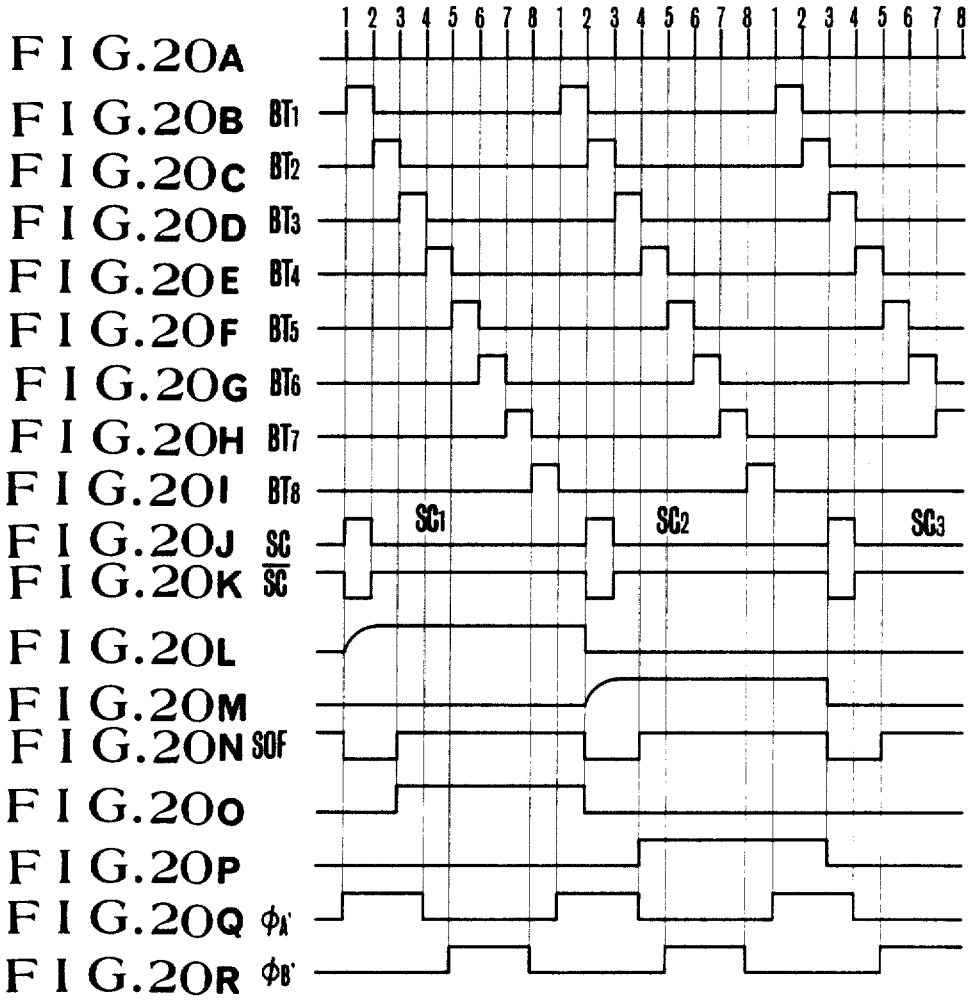

Low speed sampling of channel signals $BT_1$–$BT_8$ and key code KC' are made by the same signal, that is pulse signal SC and the key code KC' supplied to the key code tone pitch voltage converting unit 400 is supplied at a channel time corresponding to a channel assigned with said key code. As above described, the tone pitch voltage KV produced by converting the key code KC sampled by the sampling circuit 401 into an analogue signal is supplied to a channel whose signal "1" is stored and held in the delay flip-flop circuits $426_a$–$426_h$ by the pulse signal SC. Accordingly, by turning ON transistors $428_a$–$428_h$ connected on the output side of the delay flip-flop circuits $426_a$–$426_h$ by the output signal thereof it is possible to supply tone pitch voltages KV to any desired channels which are assigned by the channel processor 200 through output terminals $429_a$–$429_h$. The outputs of the delay flip-flop circuits $426_a$–$426_h$ are connected to one inputs of AND gate circuits $430_a$–$430_h$ and the other inputs of these AND gate circuits are connected to receive a pulse SOF (FIG. 20N) produced by the NOR gate circuit 413 of the sampling control circuit 402 shown in FIG. 18. Since the inputs of the NOR gate circuit 413 are connected to the first and last stages of the shift register 411, the pulse signal SOF is a rectangular wave followed by zero period of two channel times as shown in 20N. As shown in FIGS. 20O and 20P, initial portions corresponding to two channel times of the tone pitch voltages which are supplied to respective channels from the digital-analogue converting circuit 403 are inhibited such that inaccurate building up portions of the tone pitch voltages are cut off thus stabilizing the same.

As above described, the digital-analogue converting circuit 403, comprises a sampling circuit 401 which samples at a low speed the key codes KC' supplied from the second key code memory circuit 302 and sequentially stores the sampled key codes for respective channels, and a digital-analogue converter which converts the sampled key codes KC'' into corresponding tone pitch voltages KV and supplies the tone pitch voltages KV to channels which are assigned with the key codes.

Tone Pitch Voltage Control Unit for Respective Channels 500, Musical Tone Forming Unit 600 and Tone Pitch Voltage Control Unit 700

Figure 21:
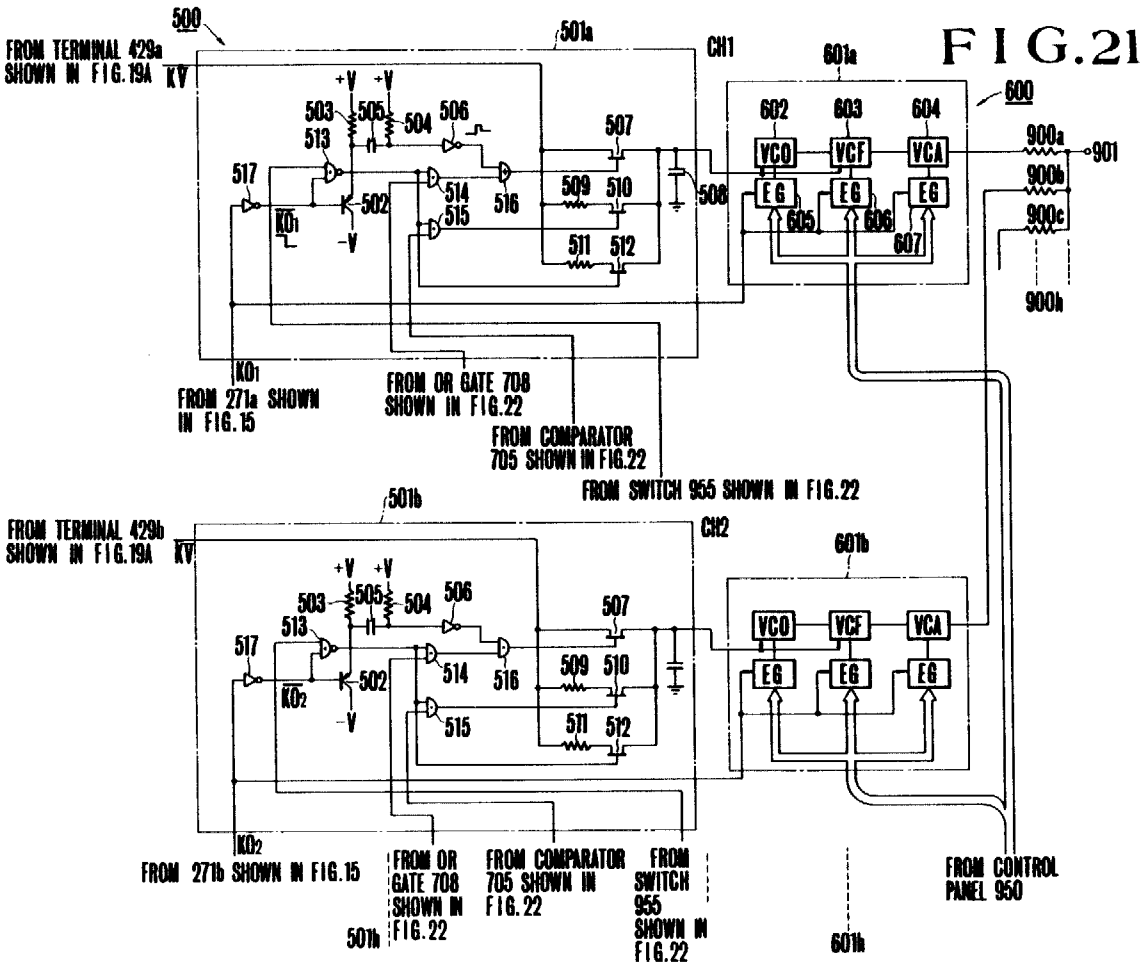
FIG. 21 is a connection diagram showing the detail of one examples of the tone pitch voltage controllers for respective channels, and the musical tone forming unit.
Figure 22:
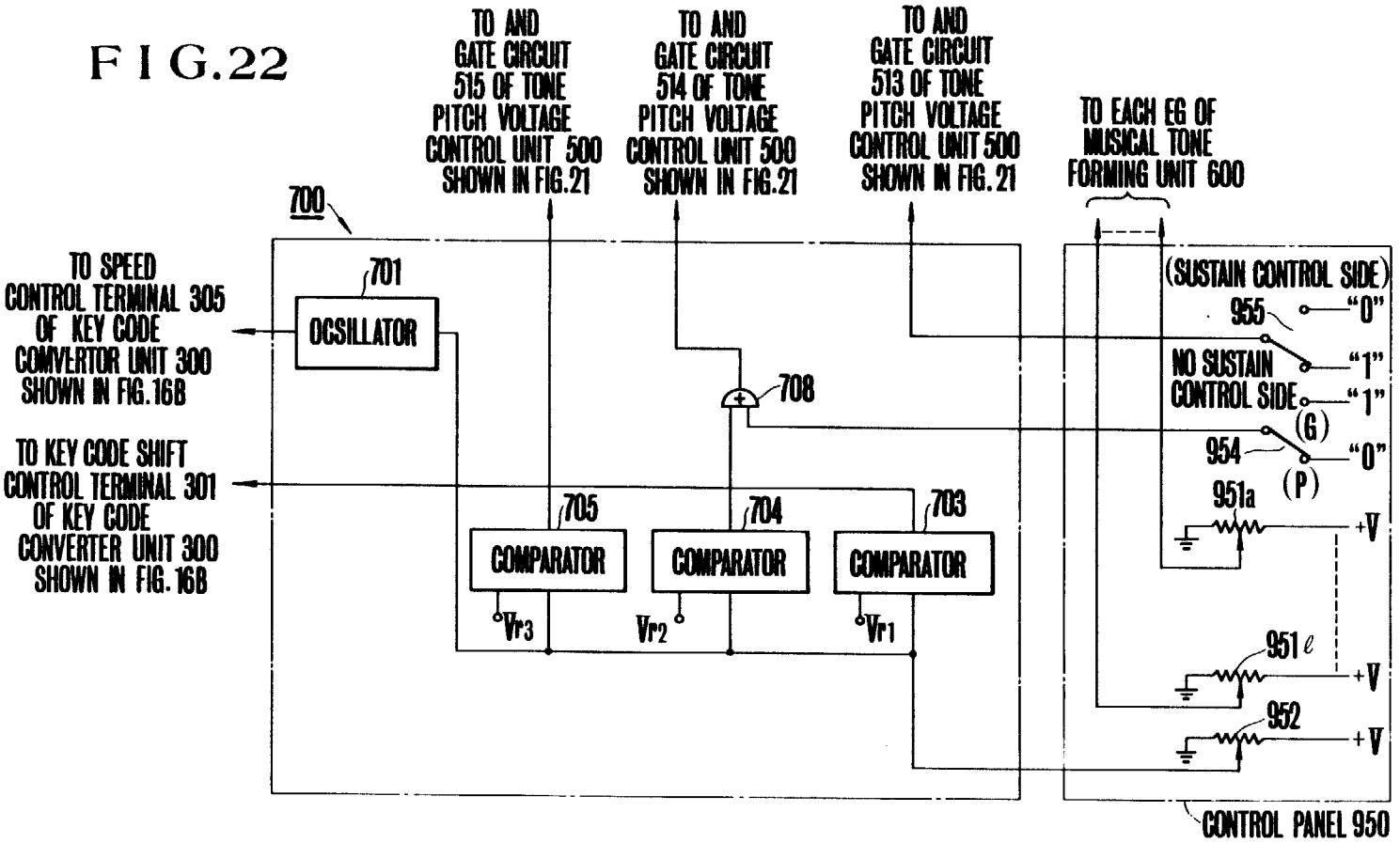
FIG. 22 is a connection diagram showing the detail of one examples of a tone pitch voltage controller and the control panel shown in FIG. 2.

The tone pitch voltage control unit for respective channels 500, the musical tone forming unit 600 and the tone pitch voltage control unit 700 will now be described. FIG. 21 shows the detail of one examples of the tone pitch voltage control unit for respective channels 500 and the musical tone forming unit 600 and FIG. 22 shows the detail of one example of the tone pitch voltage control unit 700.

A. Tone pitch Voltage Control Unit for Respective Channels 500

As shown in FIG. 21, the tone pitch voltage control unit for respective channels 500 comprises tone pitch voltage control circuits $501_a$–$501_h$ for respective channels. The tone pitch voltage control circuit $501_a$ in charge of the first channel comprises a transistor 502 with its base electrode connected to receive a key ON signal $KO_1$ produced by the input/output terminal $271_a$ of the depressed key state memory circuit $501_a$ via an inverter 517 so that transistor 502 turns ON when the key ON signal $KO_1$ is "1" (that is when the key of the first channel is depressed). When a key ON signal $KO_1$ is at "1" level, a tone pitch voltage KV corresponding to a key code KC assigned to the first channel is supplied to the tone pitch voltage control circuit $501_a$ from the digital-analogue converting circuit 403. When transistor 502 is turned on by the inverted key ON signal $\overline{KO_1}$ a differentiating circuit constituted by resistors 503 and 504 and a capacitor 505 and connected to the emitter electrode of the transistor produces a differentiated output which is derived out as a positive pulse via an inverter 506. The output of the inverter 506 turns ON a transistor 507 via an OR gate circuit 516 for rapidly charging a capacitor 508. Across the transistor 507 are connected a first series circuit including a resistor 509 having a medium resistance value and a transistor 510, and a second series circuit including a resistor 511 having a large resistance value and a transistor 512, so that by selectively turning ON the transistors 510 and 512 while the transistor 507 is OFF it is possible to select the charging time constant of the capacitor 508 charged by the tone pitch voltage KV. NAND gate circuit 513, AND gate circuits 514 and 515 and OR gate circuit 516 are provided for the purpose of controlling the tone pitch signal KV' utilized to charge the capacitor 508 in accordance with the output signal from the tone pitch voltage control unit 700 as will be described later in more detail. Tone pitch voltage control circuits $501_b$–$501_h$ in charge of the other channels are constructed identical to the tone pitch voltage control circuit $501_a$ described above in charge of the first channel.

B. Musical Tone Forming Unit 600

The musical tone forming unit 600 comprises a plurality of musical tone forming circuits $601_a$–$601_h$ provided for respective channels. The musical tone forming circuit $601_a$ in charge of the first channel comprises a oscillator VCO 602 controlled by the terminal voltage KV' of the capacitor 508 provided for the tone pitch voltage control circuit $501_c$ and charged by the tone pitch voltage KV for producing a source signal having a frequency corresponding to the voltage KV, a tone color forming circuit VCF 603 which controls the pass frequency of the source signal, and an amplitude level adjuster VCA 604 for adjusting the level of the musical tone signal of the musical tone forming circuit $601_a$ for the first channel $CH_1$ is applied to the output terminal 901 via mixing resistor $900_a$ and then applied to a loudspeaker through an amplifier, not shown, for producing a desired musical tone, in the same manner as the conventional musical tone forming circuit. The musical tone forming circuits $601_b$–$601_h$ in charge of the other channels are constructed similarly. The outputs of the other musical tone forming circuits are also supplied to the output terminals 901 via mixing resistors $900_b$–$900_h$.

C. Tone Pitch Control Unit 700

The tone pitch control unit 700 is provided for the purpose of controlling the speed of the portamento or glissando effect, switching between the portamento and glissando effects, and detecting the level change of the musical tone signal during sustain. There is provided a voltage controlled variable frequency oscillator 701 for producing on the terminal 305 shown in FIG. 16B a speed control pulse TC having a relatively long period corresponding to the output voltage of a variable resistor 952 mounted on the control panel 950. The output voltage of the variable resistor 952 is also supplied to comparators 703, 704 and 705 to be compared with reference voltages $V_{r1}$–$V_{r3}$, having values expressed by an equation $V_{r1} > V_{r2} > V_{r3}$. The output of the comparator 703 is applied to the key code shift control terminal 301 shown in FIG. 16B to act as a tone pitch voltage variable control signal. An OR gate 708 is provided to apply the output of the comparator 703 and the output of a switch 954 of the control panel 950 to the input of the AND gate circuit 514 of the tone pitch voltage control unit 500. The output of the comparator 705 is applied to one input of the AND gate circuit 515 of the control unit 500 shown in FIG. 2. The switching between the portamento effect P and the glissando effect G is made by a transfer switch 954. The control panel 950 is also provided with a transfer switch 955 for switching between the presence and absence of the tone pitch change of the musical tone signal (that is glissando or portamento) and the output of the transfer switch 955 is applied to the input of the NAND gate circuit 513 of the control unit 500 shown in FIG. 21.

D. The Operations of Tone Pitch Voltage Control Unit 500 for Respective Channels, Musical Forming Unit 600 and Tone Pitch Voltage Control Unit 700

These units operate as follows. The operation wherein the transfer switch 954 of the control panel 950 is switched to the portamento side (shown in the drawing) and the transfer switch 955 is switched to the no sustain control side (shown in the drawing) will firstly be described. Under these conditions, when the sliding arm of the variable resistor 952 is moved toward the grounded terminal a voltage lower then the reference voltage $V_{r3}$ is produced so that the oscillator 701 produces an oscillation output having a relatively long period corresponding to this low voltage. This oscillation output is applied to the speed control terminal 305 shown in FIG. 16B to act as a speed control pulse TC. Since the voltage generated by the variable resistor 952 is lower than the reference value $V_{r3}$, all comparators 703, 704 and 705 produce signals "0". The "0" output signal of the comparator 703 is supplied to the key code shift control terminal 301 shown in FIG. 16B to act as a tone pitch variable control signal. Consequently, the operation circuit 303 of the key code converting unit 300 repeats the addition or substraction operations described above until the key code KC corresponding to the firstly operated key comes to coincide with the key code KC corresponding to the secondly depressed key. As has been discussed hereinabove, the operation speed at this time is determined by the speed control pulse TC generated by the oscillator 701. In this case, the control speed is extremely low. By this operation, the key code KC' generated by the second key code memory circuit 302 gradually increases or decreases.

As above described, the key code KC' produced by the second key code memory circuit 302 is calculated each time a speed control pulse TC having an extremely long period is generated by oscillator 701 and exhibits a key code KC' representing an upper adjacent note. The key code KC' which varies slowly is sampled by the sampling circuit 401 of the tone pitch voltage converting unit 400 and then converted into a tone pitch voltage KV by the digital-analogue converting circuit 403. The tone pitch voltage KV is supplied to one of the tone pitch voltage control circuits $501_a$–$501_h$ assigned to a specific key code. In the following description, it is assumed that the key code is assigned to a first channel.

Under these circumstances, the tone pitch voltage KV produced by the digital-analogue converter 403 increases stepwisely each time the speed control pulse TC is generated. When the depressed key state memory circuit 204 detects the fact that a key code KC corresponding to the firstly operated key bas been assigned to the first channel, the output terminal $271_a$ (FIG. 15) corresponding to the first channel produces a key ON signal $KO_1$. This signal becomes "1" when a key is depressed and the inverted signal $\overline{KO_1}$ of this key ON signal $KO_1$ turns on the transistor 502 thereby producing a differentiated pulse at the juncture between the capacitor 505 and the resistor 504. This differentiated pulse is inverted into a positive pulse by the inverter 506. The inverted positive pulse is applied to the gate electrode of the field effect type transistor 507 thus momentarily turns ON the same. During the turned ON interval of the transistor 507, the tone pitch voltage KV corresponding to the firstly operated key and depressed upon the drain electrode of the transistor 507 rapidly charges the capacitor 508. Thereby producing a source signal corresponding to the terminal voltage of the capacitor 508 or the firstly depressed key, when a key ON signal $KO_1$ at "1" state is impressed upon one input from the terminal 271a of the depressed key state memory circuit 204, the inputs of the NAND gate circuit 513 becomes "1" and "0" thus producing a signal "1" which is applied to transistor 512 thus maintaining the same in an ON state while the key ON signal $KO_1$ is being supplied. The transistor 512 is ON only momentarily when the first key is depressed so that thereafter only transistor 512 continues its ON state. As a consequence, the tone pitch voltage KV which is supplied through the digital-analogue converting circuit 403 and varies stepwisely at a low speed charges capacitor 508 via a high value resistor 511. At this time, the charging time constant is very large so that the stepwisely varying tone pitch voltage KV is changed into a continuously varying tone pitch voltage KV' and then supplied to the musical tone forming circuit $601_a$ thus providing a portamento effect in which the tone pitch continuously increases at a slow speed from the tone pitch of the firstly operated key to that of the secondly operated key. When the operated key is released the key ON signal $KO_1$ changes from "1" to "0" so that the inputs to the NAND gate circuit 513 become "1" and "0" whereby the NAND gate circuit produces signal "0". Consequently, concurrently with the release of the key, charging of the capacitor 508 is stopped with the result that no portamento effect is provided for a sustain portion. When the transfer switch 955 of the control panel 950 is transfered to the side opposite to that shown in the drawing (sustain control side) signal "0" is applied to input of the NAND gate circuit 513 so that transistor 512 continues its ON state even when the key is released at which the inverted key ON signal $\overline{KO_1}$ becomes "1", thus providing the portamento effect also for the sustain portion.

When a voltage larger than the reference voltage $V_{r3}$ but smaller than the reference voltage $V_{r2}$ is produced by moving the sliding arm of the variable resistor 952 toward the side opposite the grounded terminal the period of the speed control pulse TC generated by the oscillator becomes shorter with the result that the operation period as well as the variation of the tone pitch voltage KV becomes faster. When a voltage larger than the reference voltage $V_{r3}$ is produced by the variable resistor 952, the output of the comparator 705 becomes "1" which is applied to one input of the AND gate circuit 515. Since the other input of this AND gate circuit is supplied with the output "1" of the NAND gate circuit 513 which is produced when the key ON signal $KO_1$ is applied, the AND gate circuit 515 is enabled to produce output "1". This output signal "1" turns ON transistor 510 thus charging capacitor 508 through resistor 509 having a medium resistance value with a tone pitch voltage KV which varies at a relatively fast speed. The terminal voltage KV' of this capacitor 508 is converted into a muscial tone signal by the musical tone forming circuit $601_a$ thus producing a musical tone through a loudspeaker, not shown, which is provided with a portamento effect continuously varying at a relatively high speed. The reason that the transistors are selectively turned ON so as to reduce the value of the charging resistor with the increase in the tone pitch voltage KV lies in that under a large charging time constant it is impossible to follow relatively fast variation in the tone pitch voltage KV.

When the variable resistor 952 of the control panel 950 is adjusted to produce a still higher voltage the outputs of both comparators 704 and 705 become "1". The output signal "1" from the comparator 704 is applied to one input of the AND gate circuit 514 while the output of the NAND gate circuit 513 which is produced when the key ON signal $KV_1$ is applied to the other input of the AND gate circuit 514 so that this AND gate circuit is enabled to produce signal "1" which is used to turn ON transistor 507 via OR gate circuit 516. As a consequence, when the tone pitch voltage KV varies rapidly, this tone pitch voltage KV directly charges capacitor 508 via transistor 507 thus providing a rapidly changing glissando like portamento effect.

As the output voltage of the variable resistor 952 is further increased, the oscillator 701 produces an extremely fast speed control pulse TC. When the voltage produced by the variable resistor 952 becomes higher than the reference voltage $V_{r1}$, the output of the comparator 703 changes to "1" from "0", Since the "0" output signal of the comparator 703 is applied to the key code shift control terminal 301 of the calculation circuit 303 shown in FIG. 16B to act as the tone pitch voltage variable control signal, when the output voltage of the variable resistor becomes higher than the reference voltage $V_{r1}$ the operation of the calculation circuit 303 is terminated to resume the normal operation.

Above description refers to the provision of a portamento effect. A glissando effect is provide in the following manner.

To obtain a glissando effect the transfer switch 954 of the control panel 950 is switched to the opposite side thus applying a signal "1" to one input of the OR gate circuit 708 whereby signal "1" is normally applied to one input of the AND gate circuit 514 is normally "1" as above described when a key ON signal $KO_1$ representing the selection of the first channel is applied to the input of the NAND gate circuit 513. As a consequence, the AND gate circuit 514 is enabled whenever a key ON signal $KO_1$ is supplied thus producing signal "1". This signal "1" turns ON transistor 507 via the OR gate circuit 516. Thus, when the output voltage of the variable resistor 952 of the control panel 950 is smaller than the reference voltage $V_{r1}$, in other words varies at a speed below a speed determined by the reference value $V_{r1}$, the capacitor 508 is directly charged by the tone pitch voltage KV via transistor 507 so that the voltage KV' across this capacitor 508 varies stepwisely as the tone pitch voltage KV varies stepwisely. Accordingly, the musical tone forming circuit $601_a$ produces a musical tone signal which varies stepwisely, just like a case wherein the keys of a piano are successfully played.

When the output of the variable resistor 954 is increased beyond the reference value $V_{r1}$ the operation of the operation circuit 303 is stopped in the same manner as in the case of providing the portamento effect thus resuming the normal operation. When the transfer switch 955 is switched to the sustain control side (to the upper side) the NAND gate circuit 513 will normally be supplied with signal "0" so that the AND gate circuit 514 is enabled by the output "1" from this NAND gate circuit and signal "1" supplied from transfer switch 706 via OR gate circuit 708 thus producing an output "1" which turns ON transistor 507. Consequently, also during sustain, a glissando effect can be provided. Thus, the variable resistor 952 which produces a variable voltage has two functions of the speed control of the portamento or glissando effect and the variable control of the tone pitch (glissando or portamento). This construction reduces the number of the operating elements thus making easy performance of a not yet skilled player. Of course, the reference value $V_{r1}$ is set at such voltage which varies so fast that no portamento or glissando effect can be provided.

In the above described embodiment the reason that a signal "1" is written in the respective stages of the shift register 205 of the first key code memory circuit 201 of the channel processor 200 by the initial clear signal IC is to precharge the capacitor by a tone pitch voltage to prepare for the first key operation. More particularly, where it is contemplated to provide the portamento or glissando effect starting from the first key the starting point can be set such that a tone pitch can be controlled by anyone of the keys.

Although in the foregoing embodiment, during the operational processing of the signals for producing a key code which varies stepwisely, [1] or [2] was added or substracted for producing key codes which sequentially vary according to the order of the notes in the musical scale on the assumption that the step be a semitone, it should be understood that the invention is not limited to the specific embodiment. For example, the invention is also applicable to a case wherein the key code is sequentially varied by using a desired interval as a unit or to only a portion of a musical scale for example not using black keys or to only medium tone.

Further more, in the foregoing embodiment a stepwisely varied key code was converted into an analogue quantity and then applied to a voltage controlled type variable frequency oscillator, but it is also possible to use the stepwisely varying key code signal to digitally select a sound signal for producing a musical signal.

Furthermore, in the embodiment described above, a key information was encoded and the encoded key code was processed digitally to produce a gradually varying tone pitch voltage, it will be clear that the tone pitch voltage can be produced by other methods.

As above described according to the electronic musical instrument of this invention, a key information is encoded into a key code signal which is subjected to addition and substraction calculations thereby forming a sequentially varying key code signal which is used to produce a corresponding musical tone. Accordingly, it is possible to readily and automatically provide a glissando effect in which the tone varies successively, and a portamento effect in which the tone varies continuously. Accordingly, the expression of a music is greatly enriched, and the musical instrument of this invention can readily be performed even by a not yet skilled player.

What is claimed is:

1. An electronic musical instrument comprising key coder means for delivering key code signals identifying depressed keys, said key code signals having values which only identify depressed keys and which are not proportional to tone frequencies represented by said depressed keys, key code memory means for storing said key code signals, comparator means connected to said key coder means and to said key code memory means for comparing a first key code received from said key code memory means with a second key code received from said key coder means, calculation means responsive to the result of comparison in said comparator means for adding to or subtracting from the content of said key code memory means a predetermined value defining a semitone step repetitively at a predetermined clock rate to change said first key code in said key code memory means by successive semitone steps one after another to the next key code until said first key code in said key code memory means becomes equal to said second key code, and tone forming means connected to said key code memory means for forming a musical tone having a pitch determined by said key code in said key code memory means.

2. An electronic musical instrument according to claim 1 which further comprises a variable frequency oscillator for producing a signal that determines said clock rate.

3. An electronic musical instrument comprising key coder means for delivering key code signals identifying depressed keys, said key code signals having values which only identify depressed keys and which are not proportional to tone frequencies represented by said depressed keys, key code memory means for storing said key code signals, comparator means connected to said key coder means and to said key code memory means for comparing a first key code received from said key code memory means with a second key code received from said key coder means, calculation means responsive to the result of comparison in said comparator means for adding to or subtracting from the content of said key code memory means a predetermined value defining a semitone step repetitively at a predetermined clock rate to change said first key code in said key code memory means until said first key code becomes equal to said second key code, tone forming means connected to said key code memory means for forming a musical tone having a pitch determined by said key code in said key code memory means, wherein said key coder means produces said key code signals on a time division basis, and said key code memory means comprises a plurality of memory stages for storing said key code signals on the time division basis.

4. An electronic musical instrument according to claim 3 wherein said key coder means comprises memory means for storing said key code signals at memory stages corresponding to time division channels.

5. An electronic musical instrument according to claim 4 wherein said key coder means further comprises first means for representing a time division channel to be secured, and second means responsive to the output of said first means for determining a stage of said memory means utilized to store said key code signal thereby storing key code signals at said stage and not yet secured stages.

6. An electronic musical instrument comprising key coder means for delivering key code signals identifying depressed keys, said key code signals having values which only identify depressed keys and which are not proportional to tone frequencies represented by said depressed keys, key code memory means for storing said key code signals, comparator means connected to said key coder means and to said key code memory means for comparing a first key code received from said key code memory means with a second key code received from said key coder means, calculation means responsive to the result of comparison in said comparator means for adding to or subtracting from the content of said key code memory means a predetermined value defining a semitone step repetitively at a predetermined clock rate to change said first key code in said key code memory means until said first key code becomes equal to said second key code, and tone forming means connected to said key code memory means for forming a musical tone having a pitch determined by said key code in said key code memory means, and wherein said tone forming means includes first means for producing a tone pitch voltage corresponding to the output of said key code memory means, a capacitor for storing said voltage, and a voltage controlled type variable frequency oscillator for generating an oscillation having a frequency determined by the voltage stored in said capacitor.

7. An electronic musical instrument according to claim 6 which further comprises second means for varying the charging time constant of said capacitor.

8. An electronic musical instrument according to claim 7 which further comprises a variable frequency oscillator for producing a signal that determines the clock rate for said calculation means.

9. An electronic musical instrument comprising key coder means for delivering key code signals identifying depressed keys, key code memory means for storing said key code signals, comparator means connected to said key coder means and to said key code memory means for comparing a first key code received from said key code memory means with a second key code received from said key coder means, calculation means responsive to the result of comparison in said comparator means for adding to or subtracting from the content of said key code memory means a predetermined value defining a semitone step repetitively at a predetermined clock rate to change said first key code in said key code memory means until said first key code becomes equal to said second key code, tone forming means connected to said key code memory means for forming a musical tone having a pitch determined by said key code in said key code memory means, first means for producing a tone pitch voltage corresponding to the output of said key code memory means, a capacitor for storing said voltage, a voltage controlled type variable frequency oscillator for generating an oscillation having a frequency determined by the voltage stored in said capacitor, second means for varying the charging time constant of said capacitor, a second variable frequency oscillator for producing a signal that determines the clock rate for said calculation means, and third means for controlling the oscillation frequency of said second variable frequency oscillator, said second means and said third means being so interrelated that said charging time constant becomes shorter as said oscillation frequency of said second variable frequency oscillator becomes higher, and vice versa.

10. An electronic musical instrument comprising key coder means for delivering key code signals identifying depressed keys, key code memory means for storing said key code signals, comparator means connected to said key coder means and to said key code memory means for comparing a first key code received from said key code memory means with a second key code received from said key coder means, calculation means responsive to the result of comparison in said comparator means for adding to or subtracting from the content of said key code memory means a predetermined value defining a semitone step repetitively at a predetermined clock rate to change said first key code in said key code memory means until said first key code becomes equal to said second key code, tone forming means connected to said key code memory means for forming a musical tone having a pitch determined by said key code in said key code memory means, first means for producing a tone pitch voltage corresponding to the output of said key code memory means, a capacitor for storing said voltage, a voltage controlled type variable frequency oscillator for generating an oscillation having a freqency determined by the voltage stored in said capacitor, means for generating a signal representing a released key state, a first gate means connected between said capacitor and said tone pitch voltage generating means, a second gate means for controlling said first gate means by said signal generated by said signal generating means, and a manual switch for controlling said second gate means.

11. An electronic musical instrument comprising key coder means for delivering key code signals identifying depressed keys, key code memory means for storing said key code signals, comparator means connected to said key coder means and to said key code memory means for comparing a first key code received from said key code memory means with a second key code received from said key coder means, calculation means responsive to the result of comparison in said comparator means for adding to or subtracting from the content of said key code memory means a predetermined value defining a semitone step repetitively at a predetermined clock rate to change said first key code in said key code memory means until said first key code becomes equal to said second key code, tone forming means connected to said key code memory means and forming a musical tone having a pitch determined by said key code in said key code memory means, a variable frequency oscillator for producing a signal that determines said clock rate, a variable voltage source which controls the oscillation frequency of said variable frequency oscillator, a comparitor which compares the voltage of said variable voltage source with a predetermined reference voltage, and means responsive to the output of said comparitor for rendering inoperative said calculation means thereby directly applying the newly supplied key code signal to said key code memory means.

12. An electronic musical instrument comprising key coder means for delivering key code signals identifying depressed keys, key code memory means for storing said key code signals, comparator means connected to said key coder means and to said key code memory means for comparing a first key code received from said key code memory means with a second key code received from said key coder means, calculation means responsive to the result of comparison in said comparator means for adding to or subtracting from the content of said key code memory means a predetermined value defining a semitone step repetitively at a predetermined clock rate to change said first key code in said key code memory means until said first key code becomes equal to said second key code, means connected to said key code memory means and forming a musical tone having a pitch determined by said key code in said key code memory means, said key coder means producing said key code signals on a time division basis and said key code memory means further comprising a plurality of memory stages for storing said key code signals on the time division basis, said key coder means further comprising memory means for storing said key code signals at memory stages corresponding to time division channels, means for generating a tone pitch voltage corresponding to the output of said key code memory means, a plurality of capacitors corresponding to a plurality of time division channels and adapted to store said tone pitch voltage, a plurality of variable frequency oscillators for generating oscillation frequencies respectively corresponding to the voltages of said capacitors, and switch means for assigning said tone pitch voltage to said capacitors on the time division basis.

* * * * *